US012748565B2

(12) United States Patent
Dontcheva et al.

(10) Patent No.: US 12,748,565 B2
(45) Date of Patent: Sep. 29, 2026

(54) TRANSCRIPT QUESTION SEARCH FOR TEXT-BASED VIDEO EDITING

(71) Applicant: Adobe Inc., San Jose, CA (US)

(72) Inventors: Lubomira Assenova Dontcheva, Seattle, WA (US); Anh Lan Truong, San Carlos, CA (US); Hanieh Deilamsalehy, Seattle, WA (US); Kim Pascal Pimmel, Seattle, WA (US); Aseem Omprakash Agarwala, Seattle, WA (US); Dingzeyu Li, Seattle, WA (US); Joel Richard Brandt, Venice, CA (US); Joy Oakyung Kim, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 18 days.

(21) Appl. No.: 17/967,714

(22) Filed: Oct. 17, 2022

(65) Prior Publication Data

US 2024/0134597 A1 Apr. 25, 2024

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G06F 3/0484* (2013.01); *G06F 16/735* (2019.01); *G06F 16/738* (2019.01)

(58) Field of Classification Search
CPC ...... G06F 3/167; G06F 3/0482; G06F 3/0484; G06F 16/735; G06F 16/738
See application file for complete search history.

(56) References Cited

U.S. PATENT DOCUMENTS 10,540,906 B1 * 1/2020 Fieldman ............ H04L 12/1822
11,410,038 B2 8/2022 Lin et al.
(Continued)

OTHER PUBLICATIONS

Bhattasali, S., Cytryn, J., Feldman, E., & Park, J. (2015). Automatic Identification of Rhetorical Questions (pp. 743-749). Association for Computational Linguistics. https://aclanthology.org/P15-2122.pdf (Year: 2015).*
(Continued)

*Primary Examiner* — Cesar B Paula
*Assistant Examiner* — David Tan
(74) *Attorney, Agent, or Firm* — Shook, Hardy & Bacon L.L.P.

(57) ABSTRACT

Embodiments of the present invention provide systems, methods, and computer storage media for a question search for meaningful questions that appear in a video. In an example embodiment, an audio track from a video is transcribed, and the transcript is parsed to identify sentences that end with a question mark. Depending on the embodiment, one or more types of questions are filtered out, such as short questions less than a designated length or duration, logistical questions, and/or rhetorical questions. As such, in response to a command to perform a question search, the questions are identified, and search result tiles representing video segments of the questions are presented. Selecting (e.g., clicking or tapping on) a search result tile navigates a transcript interface to a corresponding portion of the transcript.

17 Claims, 35 Drawing Sheets

(51) Int. Cl.
*G06F 3/0484* (2022.01)
*G06F 16/735* (2019.01)
*G06F 16/738* (2019.01)

(56) References Cited

U.S. PATENT DOCUMENTS

| | | | | |
|---|---|---|---|---|
| 11,907,315 | B1 * | 2/2024 | Cui | H04L 67/535 |
| 2008/0126191 | A1 * | 5/2008 | Schiavi | G06Q 30/0258<br>707/999.107 |
| 2010/0260466 | A1 * | 10/2010 | Shima | H04N 5/147<br>386/278 |
| 2013/0018909 | A1 * | 1/2013 | Dicker | G06Q 10/10<br>707/758 |
| 2014/0161416 | A1 * | 6/2014 | Chou | H04N 21/6125<br>386/241 |
| 2016/0171003 | A1 * | 6/2016 | Ju | H04L 65/4015<br>715/721 |
| 2017/0011774 | A1 * | 1/2017 | Ju | G11B 27/28 |
| 2018/0359530 | A1 * | 12/2018 | Marlow | G06F 16/783 |
| 2019/0079918 | A1 * | 3/2019 | Thörn | G10L 15/05 |
| 2020/0167524 | A1 * | 5/2020 | Hunter | G09B 11/00 |
| 2020/0311164 | A1 * | 10/2020 | Golan | G06Q 10/10 |
| 2020/0357009 | A1 * | 11/2020 | Podgorny | G06Q 30/0203 |
| 2021/0051120 | A1 * | 2/2021 | Pottier | H04L 67/54 |
| 2022/0075513 | A1 | 3/2022 | Walker et al. | |
| 2022/0075820 | A1 | 3/2022 | Walker et al. | |
| 2022/0076023 | A1 | 3/2022 | Shin et al. | |
| 2022/0076024 | A1 | 3/2022 | Walker et al. | |
| 2022/0076025 | A1 | 3/2022 | Shin et al. | |
| 2022/0076026 | A1 | 3/2022 | Walker et al. | |
| 2022/0076424 | A1 | 3/2022 | Shin et al. | |
| 2022/0076705 | A1 | 3/2022 | Walker et al. | |
| 2022/0076706 | A1 | 3/2022 | Walker et al. | |
| 2022/0076707 | A1 | 3/2022 | Walker et al. | |
| 2022/0237637 | A1 * | 7/2022 | Susel | G06Q 30/0203 |

OTHER PUBLICATIONS

"Customizable Framework to Extract Moments of Interest", U.S. Appl. No. 17/452,626, filed Oct. 28, 2021.

Xiao, X., Kanda, N., Chen, Z., Zhou, T., Yoshioka, T., Chen, S., . . . & Gong, Y. (Jun. 2021). Microsoft speaker diarization system for the voxceleb speaker recognition challenge 2020. In ICASSP 2021-2021 IEEE International Conference on Acoustics, Speech and Signal Processing (ICASSP) (pp. 5824-5828). IEEE.

Liu, Y. C., Han, E., Lee, C., & Stolcke, A. (2021). End-to-end neural diarization: From transformer to conformer. arXiv preprint arXiv:2106.07167.(pp. 1-5).

"Speechmatics". https://docs.speechmatics.com/en/batch-container/speech-api/v6.3.0/#diarization, (30 pages).

Alcäzar, J. L., Caba, F., Mai, L., Perazzi, F., Lee, J. Y., Arbeläez, P., & Ghanem, B. (2020). Active speakers in context. In Proceedings of the IEEE/CVF Conference on Computer Vision and Pattern Recognition (pp. 12465-12474).

Descript, "Descript Storyboard", Retrieved From Internet on Sep. 21, 2022 from URL: < https://www.descript.com/video-editing>, 8 Pages.

Descript Storyboard, "Descript Storyboard—The Future of Video Editing", Retrieved From Internet on Sep. 22, 2022 from URL: <https://www.descript.com/storyboard>, 9 Pages.

TypeStudio, "Online Video Editor", Retrieved From Intemet on Sep. 22, 2022 from URL: <https://www.typestudio.co/tool/online-video-editor>, 9 pages.

Reduct Video, "Where your team and video work together", Retrieved From Internet on Sep. 21, 2022 from URL: <https://reduct.video/>, 10 Pages.

* cited by examiner

300

TRANSCRIPT QUESTION SEARCH FOR TEXT-BASED VIDEO EDITING

BACKGROUND

Recent years have seen a proliferation in the use of video, which has applications in practically every industry from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share video. With these new ways to capture and share video comes an increasing demand for video editing features.

Conventionally, video editing involves selecting video frames and performing some type of action on the frames or associated audio. Some common operations include importing, trimming, cropping, rearranging, applying transitions and effects, adjusting color, adding titles and graphics, exporting, and others. Video editing software, such as ADOBE® PREMIERE® PRO and ADOBE PREMIERE ELEMENTS, typically includes a graphical user interface (GUI) that presents a video timeline that represents the video frames in the video and allows the user to select particular frames and the operations to perform on the frames. However, conventional video editing can be tedious, challenging, and even beyond the skill level of many users.

SUMMARY

Some embodiments of the present invention are directed to video segment selection and editing using transcript interactions, including identification of candidate boundaries for video segments, video segment selection using those boundaries (e.g., dragging along transcript text), and corresponding video edits (e.g., text-based video editing). To facilitate selecting and performing operations on video segments corresponding to selected transcript text (text-based editing of audio and video assets), candidate boundaries for video segments are identified based on detected sentences and words in a transcript. In an example embodiment, an audio track from a video is transcribed, generating a transcript that identifies sentences, words, and timestamps representing when in the video each word is spoken. The transcript is used to identify boundaries for sentence segments, and if there are any non-speech segments (e.g., longer than a designated duration) between sentence segments, the boundaries for the sentence segments are retimed based on voice or audio activity. Each sentence segment is divided into word segments, and if there are any non-speech segments (e.g., longer than a designated duration) between word segments, the boundaries for the word segments are retimed based on voice or audio activity. As such, a transcript interface presents the transcript and accepts an input selecting individual sentences or words from the transcript (e.g., by clicking or tapping and dragging across the transcript), and the identified boundaries corresponding to the selected transcript text are used as boundaries for a selected video segment. In some embodiments, the transcript interface accepts commands that are traditionally thought of as text-based operations (e.g., instructions to cut, copy, paste, or delete selected transcript text), and in response, performs corresponding video editing operations using the selected video segment. As a result, a user can easily create video clips that contain just the parts of the transcript they want.

Some embodiments of the present invention are directed to a face-aware speaker diarization technique that facilitates text-based editing of audio and video assets, as it is often very helpful for the editor to know which parts of the content were spoken by different people. In an example embodiment, the face-aware speaker diarization technique initially applies an audio-only speaker diarization technique that considers voice identities detected from the audio track of the video to compute a first speaker diarization (e.g., identifying speakers in the audio track as "speaker 1", "speaker 2", etc.). Furthermore, an audio-visual speaker diarization technique that considers face and voice identities (detected from the audio and video tracks, respectively) is applied to compute a second speaker diarization. As such, the faces in the video that correspond to the active voice at each moment in the video are identified by the second speaker diarization and used to refine the first speaker diarization (e.g., the start/end times assigned to different speakers) by ensuring consistent correspondence between the active voice and the face seen in the video. In some embodiments, the first and second speaker diarizations are combined using the Hungarian algorithm to find the optimal assignment of speaker identity from one diarization to the other. Embodiments that rely on this hybrid diarization technique avoid or reduce the conventional problem with over-segmentation by leveraging a video signal in conjunction with the audio signal, while retaining the accuracy benefits of the audio-only speaker diarization. As such, in some embodiments, faces are linked to voices, so that instead of "speaker 1", "speaker 2", etc., the transcript interface that displays the diarized transcript can show the faces of each speaker.

To accommodate videos with small faces that appear pixelated, a cropped image of any given face is extract from each frame, and the size of the cropped image is used to select a corresponding face-aware speaker diarization model to process the cropped image. An example implementation includes one model trained on small images of (pixelated) faces and another model trained on larger images of faces, and the appropriate model is selected based on the size of a cropped image extracted from a given frame.

Some embodiments of the present invention are directed to speaker thumbnail selection and speaker visualization in diarized transcripts for text-based video editing. Generally, selecting the best image of a particular speaker's face in a video facilities speaker visualization in a diarized transcript. To help the user identify what parts of the transcript to select, in some embodiments, the transcript interface displays each paragraph of the transcript with a visual representation of the speaker (e.g., a speaker thumbnail) and/or a video frame (e.g., a video thumbnail) from the portion of the video corresponding to the paragraph, for example, forming a column of speaker thumbnails, video thumbnails, and transcript text for corresponding paragraphs. In some embodiments, the best image of a particular speaker's face is selected from a video based on image quality, facial emotion (e.g., using an emotion classifier that generates a happiness score), a size factor (e.g., favoring larger images), and/or penalizing images that appear towards the beginning or end of a face track. As such, the transcript interface displays each paragraph of the transcript with the best image of the speaker who spoke that paragraph, and/or the transcript interface accepts input changing the speaker thumbnail associated with each speaker (e.g., to correct diarization errors).

Some embodiments of the present invention are directed to a music-aware speaker diarization that facilitate text-based editing of audio and video assets, as it is often very helpful for the editor to know which parts of the content were spoken by different people. In an example embodiment, the music-aware speaker diarization technique uses audio auto-tagging to remove transcription and speakers that overlap in time with detected music-only regions and/or to present a visualization of detected audio classifications in the transcript. In some embodiments, an audio classifier applied during ingestion detects speech and music independently of each other, which facilitates detecting regions in the audio track that contain music but do not contain speech. In some implementations, these music-only regions are compared to the transcript, and any transcription and speakers that overlap in time with the music-only regions are removed from the transcript. As such, embodiments such as these avoid the conventional inaccuracies with transcribed singing by identifying and removing text that overlaps with detected music from the transcript. In some embodiments, rather than having the transcript display the text from this detected music, a visual representation of the audio waveform is included in the corresponding regions of the transcript. In some implementations, a visual representation of an audio waveform is spatially condensed to take up less space in the transcript, put in its own row of the transcript, and/or annotated with a label identifying a corresponding detected audio class (e.g., music, particular classes of audio events such as laugher or crying).

Some embodiments of the present invention are directed to a transcript paragraph segmentation technique for segmenting a transcript into paragraphs to make the transcript easier to read, understand, and interact with. In some cases, a speaker diarization is used to segment the transcript each time a new speaker speaks. However, there are many scenarios in which a single speaker talks for a long time, resulting in what might appear as a long and unwieldy paragraph in the transcript. As such, at a high level, some embodiments start a new paragraph whenever there is a long pause (silent times in between sentences) and/or break up paragraphs that are longer than a designated length or duration (e.g., 50 or 100 words), evaluating different candidate paragraphs based on the length and semantic coherency of the segments of text in each candidate paragraph. In an example implementation, different candidate segmentations that break a long paragraph into multiple smaller paragraphs at sentence boundaries are identified and evaluated using a cost function that penalizes candidate segmentations based on divergence from a target paragraph length and/or encourages segmentations that group semantically similar sentences into a common paragraph. More specifically, for each candidate segmentation (a set of candidate sentence boundaries) that define a set of candidate paragraphs, a cost is assigned to each candidate paragraph, and dynamic programming is used to choose the candidate segmentation that minimizes the sum of the costs for the candidate paragraphs in that candidate segmentation. As such, embodiments such as these identify paragraphs with a flexible paragraph length and provide a balance between a desired length of paragraph and coherence of topic in each paragraph.

Some embodiments of the present invention are directed to techniques for annotating transcript text with video metadata and including thumbnail bars in the transcript to help users select a desired portion of a video through transcript interactions. In an example embodiment, a video editing interface includes a transcript interface that presents a transcript of a loaded video, and user input selecting transcript text (e.g., clicking or tapping and dragging along the transcript) serves to identify a corresponding video segment with boundaries that correspond to the selected transcript text. Transcript text is annotated to indicate corresponding portions of the video where various features were detected, for example, by stylizing (e.g., underlining, highlighting) corresponding transcript text and/or labeling corresponding transcript text with a label or tag that identifies a corresponding detected feature (e.g., detected video objects or actions, detected audio events, detected audio classifications). In some cases, the transcript interface displays a visual representation of detected non-speech audio or pauses (e.g., as sound bars), for example, in line with the transcript text or in a separate row. In some cases, the transcript interface displays video thumbnails corresponding to each line of transcript text in a timeline view below each line of text in the transcript (e.g., as a thumbnail bar). In some embodiments, the thumbnail bar is selectable such the transcript interface accepts input selecting a segment of thumbnails from one or more thumbnail bars in the transcript (e.g., clicking or tapping and dragging along one or more thumbnail bars in the transcript), which serves to serves to identify a corresponding video segment with boundaries that correspond to the selected thumbnails.

Some embodiments of the present invention are directed to a visual/text search interface used to navigate a transcript. In an example embodiment of visual search, one or more machine learning models (e.g., one or more neural networks) are trained to encode text and visual modalities (e.g., a freeform query and individual image frames) into a common embedding space. As such, each video frame of the video is encoded into a corresponding frame embedding, the search interface accepts a freeform textual query, the freeform textual query is encoded into a query embedding, and a nearest neighbor search is performed to identify video frames with corresponding frame embeddings that best match the query embedding (e.g., within a threshold similarity). Additionally or alternatively, the search interface searches for segments of transcript text that match a textual query and/or for detected features tags that match the textual query. In some embodiments that include both visual and textual search, visual search results are displayed in a first portion of the search interface (e.g., a row of tiles that can be scrolled to the left and right, where each tile shows a video thumbnail, the time in the video, and/or a match score for the matching video segment), and textual search results are displayed in a second portion of the search interface (e.g., a column of tiles that can be scrolled up and down where each tile shows a video thumbnail, a speaker thumbnail, and/or transcript text for the matching video segment). In some embodiments, the transcript text reproduced in a search result tile is annotated to indicate the corresponding region in the video from which a feature tag that matched the textual query was detected (e.g., by underling the corresponding transcript text, labeling the transcript text with a tag or label that identifies a corresponding detected feature). In an example implementation, selecting (e.g., clicking or tapping on) a search result tile in the search interface navigates the transcript interface to a corresponding portion of the transcript, the transcript interface highlights matching transcript text, and/or the transcript interface annotates text to indicate the corresponding region in the video from which a feature tag that matched the textual query was detected.

Some embodiments of the present invention are directed to a question search for meaningful questions that appear in a video transcript. Many videos include conversations among people, such as videos of interviews, meetings, interactive presentations, or other scenarios. Navigating a video by questions is a helpful way to navigate a video. As such, in some embodiments, a search interface accepts a command to perform a question search, and the search interface identifies and displays matching video segments with meaningful questions that appear in the transcript. In an example embodiment, an audio track from a video is transcribed, generating a transcript that identifies sentences and punctuation (e.g., periods and question marks), and the transcript is parsed to identify sentences that end with a question mark. Depending on the embodiment, one or more types of questions that may not be as helpful in navigating a video are filtered out, such as short sentences (e.g., what?) that are shorter than some minimum length or duration, logistical questions (e.g., Can you see my screen? Can you hear me now? Are we waiting for anyone?), and/or rhetorical questions. As such, in response to a command to perform a question search, in some embodiments, the search interface identifies (e.g., previously determined meaningful questions) and displays a representation of corresponding matching video segments in a portion of the search interface (e.g., a column of tiles that can be scrolled up and down, where each tile shows a video thumbnail, a speaker thumbnail, and/or transcript text for the matching video segment). In some embodiments, a search result tile for a particular search result question includes more transcript text than simply the question (e.g., grouped questions, transcript content through a designated length or duration until a speaker change). In an example implementation, selecting (e.g., clicking or tapping on) a search result tile in the search interface navigates the transcript interface to a corresponding portion of the transcript, and/or the transcript interface highlights a matching question.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1A:
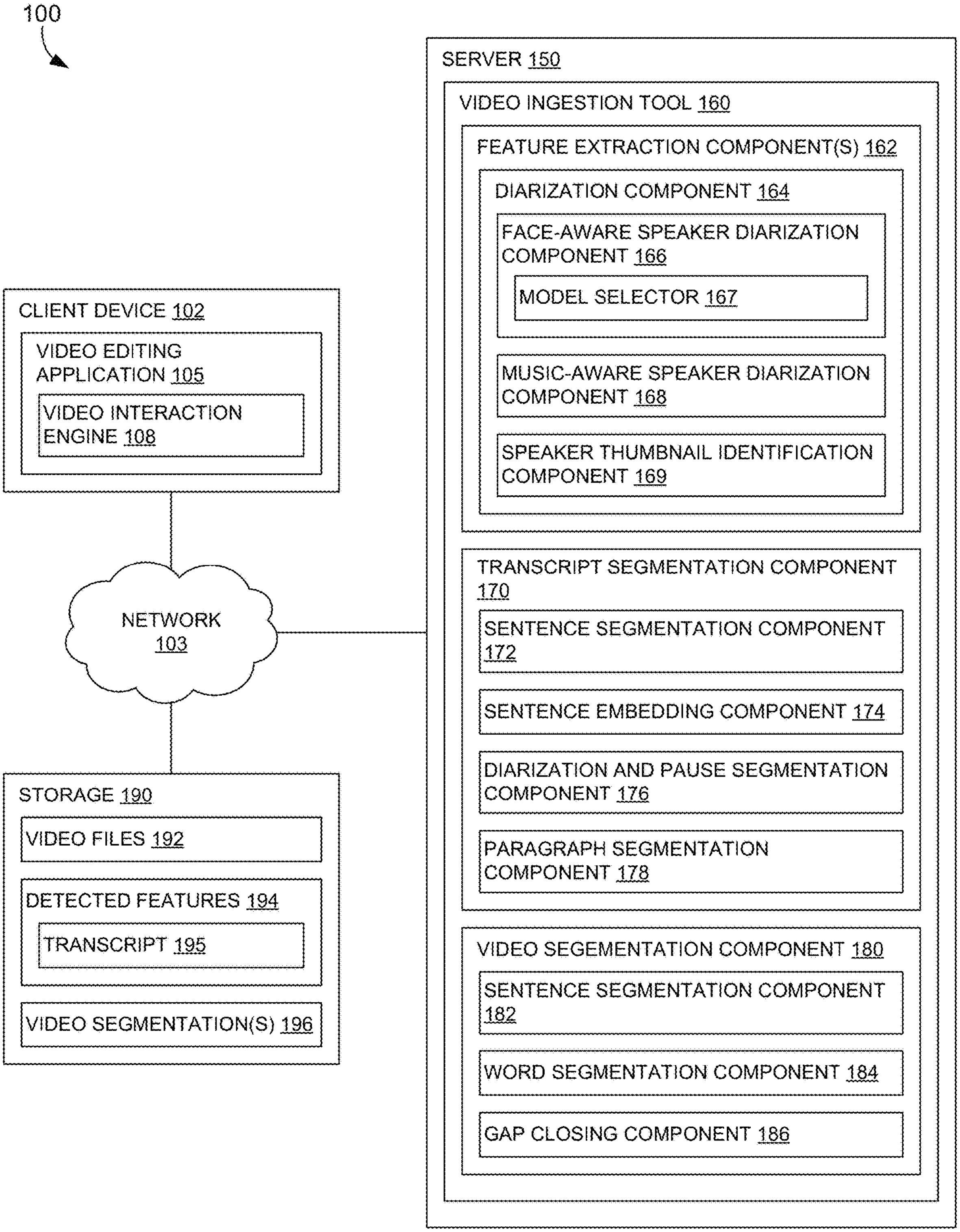
FIGS. 1A-1B are block diagrams of an example computing system for video editing or playback, in accordance with embodiments of the present invention.

A video file, clip, or project can usually be split up into visual and audio elements. For example, a video might encode or otherwise identify a video track comprising a sequence of still images (e.g., video frames) and an accompanying audio track comprising one or more audio signals. Conventional video editing interfaces allow users to select particular video frames through interactions with a video timeline that represents frames on the timeline linearly as a function of time and at positions corresponding to the time when each frame appears in the video. However, interaction modalities that rely on a selection of particular video frames or a corresponding time range are inherently slow and fine-grained, resulting in editing workflows that are often considered tedious, challenging, or even beyond the skill level of many users. In other words, time-based video editing that requires selecting particular video frames or time ranges provides an interaction modality with limited flexibility, limiting the efficiency with which users interact with conventional video editing interfaces. As such, there is a need for an improved interface and improved interaction modalities for video editing tools.

One feature that may be used to facilitate video editing is speaker diarization, which involves taking in audio, transcribing the speech content in the audio into text, and assigning different portions of the text to different speakers based on who was speaking. Essentially, speaker diarization recognizes when the speaker changes (or repeats), as well as what each speaker said. There are few, if any, commercially available video editing tools that provide a diarized transcript in a video editing interface. In many cases, it would be extremely helpful for the person doing the editing to know which parts of the content were spoken by different people. As such, and as explained in more detail, some embodiments leverage speaker diarization to provide a diarized transcript that facilitates video editing.

However, when applied to an audio track from a video, conventional audio-based speaker diarization techniques that only consider an audio signal suffer from various drawbacks. First, audio-based speaker diarization does not associate voices (speakers) to the people seen in the video, meaning an image of the speaker cannot be displayed next to their sentences, which would be helpful in video editing applications. Furthermore, by only considering audio, such approaches tend to over-segment the content (i.e., divide into more speakers than there really are). Moreover, conventional speaker diarization techniques often produce poor results when analyzing content that contains music with singing. Note that in speaker diarization, speech (i.e., spoken words) and singing are considered different phenomena. The automatic speech recognition (ASR) systems used as the basis for conventional speaker diarization attempts to transcribe all human voice in the audio, including sung lyrics. Since ASR is poor at transcribing singing, it often results in garbled or other inaccurate text in the transcript. Furthermore, there are a number of scenarios that may be relevant to video editing transcripts where it may be undesirable to assign a speaker to certain audio content, but conventional speaker diarization techniques would nevertheless attempt to do so. For example, conventional speaker diarization algorithms would attempt to assign a speaker to transcribed singing, even though there is a high likelihood that the singing is part of a background music track or part of a music video clip used to enhance unrelated video footage (e.g., in film, games, etc.), and it may not be helpful or desirable to assign a speaker to those sung words in a transcript. As such, there is a need for an improved speaker diarization techniques for video editing tools.

Furthermore, conventional transcription techniques have some drawbacks that would limit their usefulness in various applications. For example, existing transcription services transcribe speech content in audio into text, but simply presenting transcribed text for the entire audio track can limit the readability and understandability of the transcribed text. As such, there is a need for an improved transcription techniques as well as improved techniques for interacting with a transcript.

Accordingly, embodiments of the present invention are directed to video segmentation, speaker diarization, transcript paragraph segmentation, and/or various interaction modalities for video navigation, video editing, transcript editing, and/or video playback. In an example embodiment, a video is ingested by detecting various features (e.g., a transcript), identifying boundaries for a video segmentation based on detected sentences and words, detecting active speakers using audio and/or video tracks and assigning detected speakers to corresponding portions of the transcript, and segmenting the transcript by paragraph. In some embodiments, when a user loads the ingested video in a video editing interface, a transcript interface presents the diarized, segmented transcript and provides various visualizations and interaction modalities that allow a user to select a video segment by selecting corresponding transcript text, and to perform a video editing operation in response to an input interacting with selected transcript text. In some embodiments, a search interface accepts a textual query and performs a visual search for matching frame embeddings, accepts a textual query and performs a text search for matching words in the transcript or detected feature tags, and/or performs a question search for meaningful questions that appear in the video. As such, the search and/or transcript interfaces provide users with the ability to navigate within a video, select video segments, and perform editing operations on selected video segments through transcript interactions. As such, the present techniques provide new ways to create, edit, and consume video, giving creators and consumers a more intuitive structure for interacting with video.

In some embodiments, to facilitate selecting and performing operations on video segments corresponding to selected transcript text (text-based editing of audio and video assets), candidate boundaries for video segments are identified based on detected sentences and words in a transcript. In an example embodiment, an audio track from a video is transcribed, generating a transcript that identifies sentences, words, and timestamps representing when in the video each word is spoken. The transcript is used to identify boundaries for sentence segments, and if there are any non-speech segments (e.g., longer than a designated duration) between sentence segments, the boundaries for the sentence segments are retimed based on voice or audio activity. Each sentence segment is divided into word segments, and if there are any non-speech segments (e.g., longer than a designated duration) between word segments, the boundaries for the word segments are retimed based on voice or audio activity. As such, a transcript interface presents the transcript and accepts an input selecting individual sentences or words from the transcript (e.g., by clicking or tapping and dragging across the transcript), and the identified boundaries corresponding to the selected transcript text are used as boundaries for a selected video segment. In some embodiments, the transcript interface accepts commands that are traditionally thought of as text-based operations (e.g., instructions to cut, copy, paste, or delete selected transcript text), and in response, performs corresponding video editing operations using the selected video segment. As a result, a user can easily create video clips that contain just the parts of the transcript they want.

In some embodiments, speaker diarization is applied to facilitate text-based editing of audio and video assets, as it is often very helpful for the editor to know which parts of the content were spoken by different people. In an example embodiment, a face-aware speaker diarization technique initially applies an audio-only speaker diarization technique that considers voice identities detected from the audio track of the video to compute a first speaker diarization (e.g., identifying speakers in the audio track as "speaker 1", "speaker 2", etc.). An audio-visual speaker diarization technique that considers face and voice identities detected from the audio and video tracks, respectively, is applied to compute a second speaker diarization. As such, the faces in the video that correspond to the active voice at each moment in the video are identified by the second speaker diarization and used to refine the first speaker diarization (the start/end times assigned to different speakers) by ensuring consistent correspondence between the active voice and the face seen in the video. In some embodiments, the first and second speaker diarizations are combined using the Hungarian algorithm to find the optimal assignment of speaker identity from one diarization to the other. Since audio-only approaches tend to over segment (detect more speakers than there actually are in the audio, assigning portions spoken by the same person to two different speakers), leveraging the correspondence between voices and faces in the video reduces this over segmentation, producing a more accurate diarization. Furthermore, embodiments that rely on this hybrid diarization technique avoid or reduce the conventional problem with over-segmentation by leveraging a video signal in conjunction with the audio signal, while retaining the accuracy benefits of the audio-only speaker diarization. As such, in some embodiments, faces are linked to voices, so that instead of "speaker 1", "speaker 2", etc., the transcript interface that displays the diarized transcript can show the faces of each speaker, which significantly improve s the user (editing) experience.

In some embodiments, to accommodate videos with small faces that appear pixelated, a cropped image of any given face is extracted from each frame, and the size of the cropped image is used to select a corresponding face-aware speaker diarization model to process the cropped image (e.g., assign an active speaker score to that face). An example implementation includes one model sized for and trained on small images of (pixelated) faces and another model sized for and trained on larger images of faces, and the appropriate model is selected based on the size of a cropped image extracted from a given frame.

In another example embodiment, a music-aware speaker diarization technique uses audio auto-tagging to remove transcription and speakers that overlap in time with detected music-only regions (e.g., removes transcribed singing), and/or detected audio classifications are visualized in the transcript. In an example implementation, an audio classifier applied during ingestion detects speech and music independently of each other, which facilitates detecting regions in the audio track that contain music but do not contain speech. In some embodiments, these music-only regions are compared to the transcript, and any transcription and speakers that overlap in time with the music-only regions are removed from the transcript. As such, embodiments such as these avoid the conventional inaccuracies with transcribed singing by identifying and removing text that overlaps with detected music from the transcript. Furthermore, in some embodiments, rather than having the transcript display the text from this detected music, a hybrid transcript visualization that includes both speech (visualized as text) and music (visualized as, e.g., waveforms) is presented. In an example implementation, a visual representation of the audio waveform for detected music is included in the corresponding regions of the transcript. In some implementations, a visual representation of an audio waveform is spatially condensed to take up less space in the transcript, put in its own row of the transcript, and/or annotated with a label identifying a corresponding detected audio class (e.g., music, particular classes of audio events such as laugher or crying). Techniques such as these allow a user to navigate a transcript or a corresponding video more effectively, as they can easily distinguish speech content from music content.

In some embodiments, the transcript is segmented into paragraphs to make the transcript easier to read, understand, and interact with. In some cases, a speaker diarization is used to segment the transcript each time a new speaker speaks. However, there are many scenarios in which a single speaker talks for a long time, resulting in what might appear as a long and unwieldy paragraph in the transcript. As such, at a high level, some embodiments start a new paragraph whenever there is a long pause (non-speech segment between sentences) and/or break up paragraphs that are longer than a designated length or duration (e.g., 50 or 100 words), evaluating different candidate paragraphs based on the length and semantic coherency of the segments of text in each candidate paragraph. In an example implementation, different candidate segmentations that break a long paragraph into multiple smaller paragraphs at sentence boundaries are identified and evaluated using a cost function that penalizes candidate segmentations based on divergence from a target paragraph length, rewards candidate segmentations that group semantically similar sentences into a common paragraph, and/or penalizes candidate segmentations that include candidate paragraphs with long pauses (e.g., longer than a normalized length or duration). More specifically, for each candidate segmentation (a set of candidate sentence boundaries) that defines a set of candidate paragraphs, a cost is assigned to each candidate paragraph, and dynamic programming is used to choose the candidate segmentation that minimizes the sum of the costs for the candidate paragraphs in a given candidate segmentation. As such, embodiments such as these identify paragraphs with a flexible paragraph length and provide a balance between a desired length of paragraph and coherence of topic in each paragraph.

In some embodiments, a video selection interface allows a user to load one or more videos (e.g., ingested videos, videos shared by other users, previously created clips) into a video editing interface. In some implementations, the video selection interface presents a representation of a folder or library of videos, accepts selection of multiple videos from the library, creates a composite clip with the selected videos, and loads the composite clip into the video editing interface. In an example implementation, the video editing interface includes a playback interface that plays the loaded video, a transcript interface that visualizes a transcript of the video that is synchronized with playback, and a search interface that performs a visual, textual, and/or question search for matching video segments within the loaded video.

In some embodiments, the transcript interface presents a transcript of the loaded video (e.g., a diarized transcript segmented by speaker and paragraph) and provides various visualizations and interaction modalities that facilitates text-based editing of the video. In an example implementation, user input selecting transcript text (e.g., clicking or tapping and dragging along the transcript) serves to identify a corresponding video segment with boundaries that correspond to the selected transcript text, and the user performs any number or type of video editing operation on the video segment.

To help the user identify what parts of the transcript to select, in some embodiments, the transcript interface displays each paragraph of the transcript with a visual representation of the speaker (e.g., a speaker thumbnail) and/or a video frame (e.g., a video thumbnail) from the portion of the video corresponding to the paragraph, for example, forming a column of speaker thumbnails, video thumbnails, and transcript text for corresponding paragraphs. In some embodiments, the best image of a particular speaker's face is selected from a video based on image quality, facial emotion (e.g., using an emotion classifier that generates a happiness score), a size factor (e.g., favoring larger images), and/or penalizing images that appear towards the beginning or end of a face track. As such, the transcript interface displays each paragraph of the transcript with the best image of the speaker who spoke that paragraph, and/or the transcript interface accepts input changing the speaker thumbnail associated with each speaker (e.g., to correct diarization errors). In some embodiments, hovering a cursor over the transcript (e.g., hovering over transcript text) causes display of a preview of the corresponding portion of the video (e.g., by replacing a fixed video thumbnail representing that paragraph in the transcript with an animated preview of multiple frames from the portion of the video for that paragraph).

In some embodiments, transcript text is annotated to indicate corresponding portions of the video where various features were detected (e.g., using one or more machine learning models), for example, by stylizing the visual appearance of corresponding transcript text (e.g., underlining, highlighting, text color, text size, font) and/or labeling corresponding transcript text with a textual label or tag that identifies a corresponding detected feature (e.g., detected video objects or actions, detected audio events, detected audio classifications). In some cases, the transcript interface displays a visual representation of detected non-speech audio or pauses (e.g., as sound bars), for example, in line with the transcript text or in a separate row. In some cases, the transcript interface displays video thumbnails corresponding to each line of transcript text in a timeline view below each line of text in the transcript (e.g., as a thumbnail bar). In some embodiments, the thumbnail bar is selectable such that the transcript interface accepts input selecting a segment of thumbnails from one or more thumbnail bars in the transcript (e.g., clicking or tapping and dragging along one or more thumbnail bars in the transcript), which serves to identify a corresponding video segment with boundaries that correspond to the selected thumbnails.

In some embodiments, the transcript interface accepts input creating organizational headings within the transcript without editing the video, such that the transcript interface provides an outline view that navigates to corresponding parts of the transcript (and video) in response to input selecting (e.g. clicking or tapping on) a heading. These are just a few examples, and other transcript visualization and interaction techniques are contemplated within the scope of the present disclosure.

In some embodiments, a search interface is used to perform a visual search, a textual search, and/or a question search. In an example embodiment, one or more machine learning models (e.g., one or more neural networks) are trained to encode text and visual modalities (e.g., a freeform query and individual image frames) into a common embedding space. As such, each video frame of the video is encoded into a corresponding frame embedding, the search interface accepts a freeform textual query, the freeform textual query is encoded into a query embedding, and a nearest neighbor search is performed to identify video frames with corresponding frame embeddings that best match the query embedding (e.g., within a threshold similarity). Additionally or alternatively, the search interface searches for segments of transcript text that match a textual query and/or for detected features tags that match the textual query. In some embodiments that include both visual and textual search, visual search results are displayed in a first portion of the search interface (e.g., a row of tiles that can be scrolled to the left and right, where each tile shows a video thumbnail, the time in the video, and/or a match score for the matching video segment), and textual search results are displayed in a second portion of the search interface (e.g., a column of tiles that can be scrolled up and down where each tile shows a video thumbnail, a speaker thumbnail, and/or transcript text for the matching video segment).

In some embodiments, the transcript text reproduced in a search result tile is annotated to indicate the corresponding region in the video from which a feature tag that matched the textual query was detected (e.g., by underling the corresponding transcript text, labeling the transcript text with a tag or label that identifies a corresponding detected feature). In an example implementation, selecting (e.g., clicking or tapping on) a search result tile in the search interface navigates the transcript interface to a corresponding portion of the transcript, the transcript interface highlights matching transcript text, and/or the transcript interface annotates text to indicate the corresponding region in the video from which a feature tag that matched the textual query was detected.

In some embodiments, search interface accepts a command to perform a question search for meaningful questions that appear in the video, and the search interface identifies and displays matching video segments with meaningful questions that appear in the transcript. By way of motivation, many videos include conversations among people, such as videos of interviews, meetings, interactive presentations, or other scenarios. Navigating a video by questions is a helpful way to navigate a video. In an example embodiment, an audio track from a video is transcribed, generating a transcript that identifies sentences and punctuation (e.g., periods and question marks). As such, the transcript is parsed to identify sentences that end with a question mark.

Depending on the embodiment, one or more types of questions that may not be as helpful in navigating a video are filtered out, such as short sentences (e.g., what?) that are shorter than some minimum length or duration, logistical questions (e.g., Can you see my screen? Can you hear me now? Are we waiting for anyone?), and/or rhetorical questions. In an example involving logistical question filtering, a dataset of example logistical questions is encoded into logistical sentence embeddings, and the logistical sentence embeddings are combined (e.g., averaged) to generate a composite representation of example logistical questions. As such, transcript questions are encoded into corresponding sentence embeddings, the sentence embedding for each transcript question is compared to the composite representation of example logistical questions by calculating some measure of similarity (e.g., cosine similarity), and transcript questions within some threshold similarity are tagged as logical questions and/or filtered out.

In an example involving rhetorical questions, a diarized transcript is used to identify and/or filter out questions in which a speaker answers his or her own question (e.g., questions that are followed by a sentence spoken by the same speaker). In another example, diarized transcript is used to identify and/or filter out questions that are not answered by another speaker within some designated length or duration (e.g., questions that do not follow with a speaker change within some designated length or duration, such as 20 seconds). In some embodiments, a group of consecutive questions are grouped together, for example, based on a determination that the consecutive questions have some threshold similarity with one another (e.g., a threshold cosine similarity of each other), and the grouped questions are deemed a single question for the purposes of question search.

As such, in response to a command to perform a question search, in some embodiments, the search interface identifies (e.g., previously determined meaningful questions) and displays a representation of corresponding matching video segments in a portion of the search interface (e.g., a column of tiles that can be scrolled up and down where each tile shows a video thumbnail, a speaker thumbnail, and/or transcript text for the matching video segment). In some embodiments, a search result tile for a particular search result question includes more transcript text than simply the question (e.g., grouped questions, transcript content through a designated length or duration until a speaker change). In an example that filters out rhetorical questions where there is not a speaker change within some designated length or duration (e.g., 20 seconds), some of the questions that were not filtered out will include additional transcript text that was spoken after the end of the question by the same speaker through the designated length or duration until the speaker changed (e.g., up to 20 seconds of additional content after the question). As such, some embodiments display a representation of this question in a search result tile that includes not only the transcribed question, but also the additional transcript text spoken through the speaker change. These are just a few examples, and other variations are contemplated within the scope of the present disclosure. In an example implementation, selecting (e.g., clicking or tapping on) a search result tile in the search interface navigates the transcript interface to a corresponding portion of the transcript, and/or the transcript interface highlights a matching question.

As such, the present disclosure provides intuitive video interaction techniques that allow users to easily select and edit video segments, create composite clips with video segments that correspond to selected portions of a transcript, and navigate to parts of the transcript that correspond to visual, textual, and/or question search results. Accordingly, the present video interaction techniques provide a more flexible and efficient interaction modality, allowing users to quickly identify, select, and operate on parts of a video that are likely to be of interest to them. As such, editors can now work more quickly and jump to sections of interest without having to watch the video.

Example Video Editing Environment

Referring now to FIG. 1A, a block diagram of example environment 100 suitable for use in implementing embodiments of the invention is shown. Generally, environment 100 is suitable for video editing or playback, and, among other things, facilitates video segmentation, speaker diarization, transcript paragraph segmentation, video navigation, video or transcript editing, and/or video playback. Environment 100 includes client device 102 and server 150. In various embodiments, client device 102 and/or server 150 are any kind of computing device, such as computing device 3200 described below with reference to FIG. 32. Examples of computing devices include a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computer device.

In various implementations, the components of environment 100 include computer storage media that stores information including data, data structures, computer instructions (e.g., software program instructions, routines, or services), and/or models (e.g., machine learning models) used in some embodiments of the technologies described herein. For example, in some implementations, client device 102, server 150, and/or storage 190 comprise one or more data stores (or computer data memory). Further, although client device 102, server 150, and storage 190 are each depicted as a single component in FIG. 1A, in some embodiments, client device 102, server 150, and/or storage 190 are implemented using any number of data stores, and/or are implemented using cloud storage.

The components of environment 100 communicate with each other via a network 103. In some embodiments, network 103 includes one or more local area networks (LANs), wide area networks (WANs), and/or other networks. Such networking environments are commonplace in offices, enterprise-wide computer networks, intranets, and the Internet.

Figure 1B:
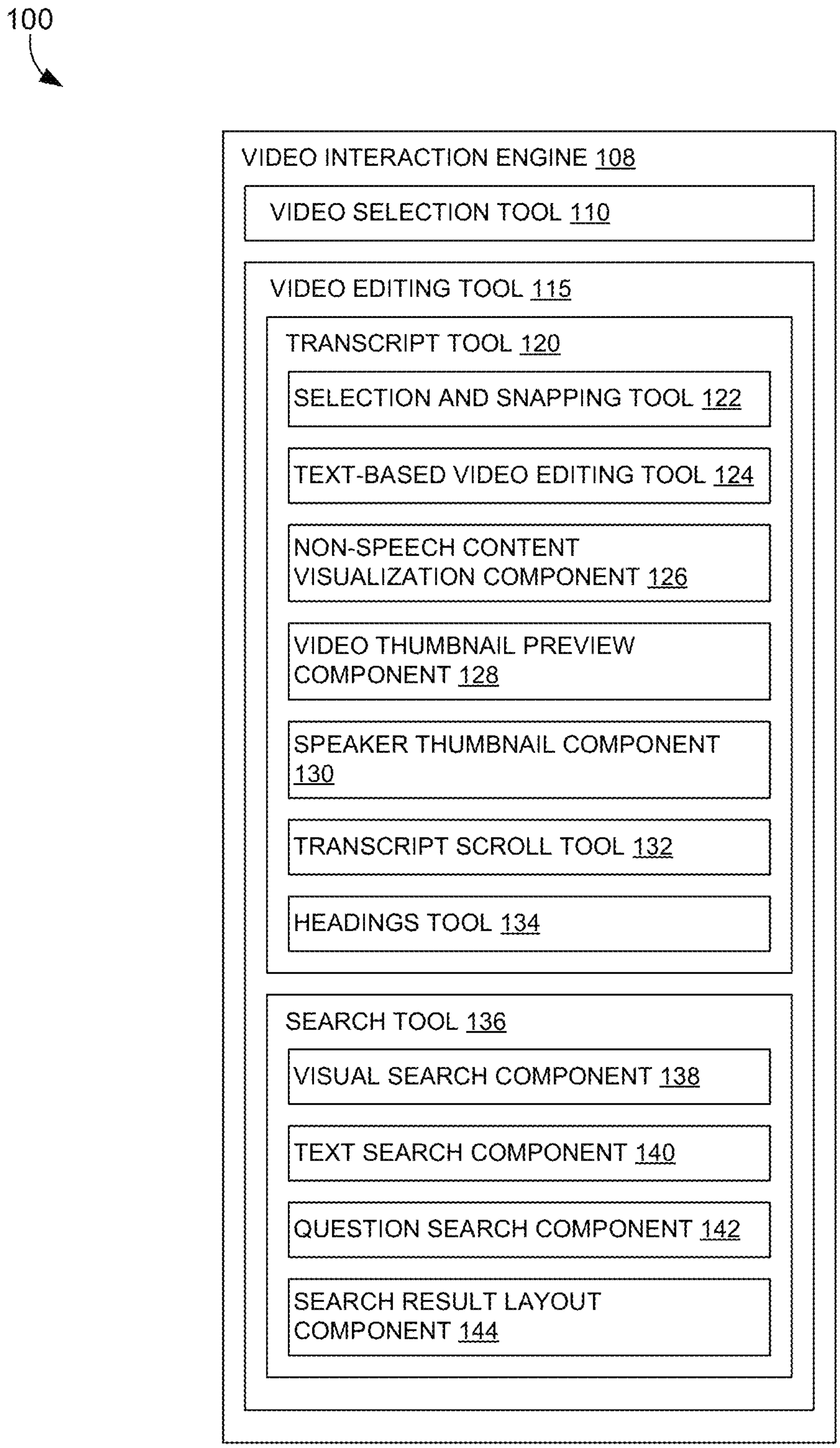

In the example illustrated in FIGS. 1A and 1B, client device 102 includes video interaction engine 108, and server 150 includes video ingestion tool 160. In various embodiments, video interaction engine 108, video ingestion tool 160, and/or any of the elements illustrated in FIGS. 1A and 1B are incorporated, or integrated, into an application(s) (e.g., a corresponding application on client device 102 and server 150, respectively), or an add-on(s) or plug-in(s) to an application(s). In some embodiments, the application(s) is any application capable of facilitating video editing or playback, such as a stand-alone application, a mobile application, a web application, and/or the like. In some implementations, the application(s) comprises a web application, for example, that is accessible through a web browser, hosted at least partially server-side, and/or the like. Additionally or alternatively, the application(s) include a dedicated application. In some cases, the application is integrated into an operating system (e.g., as a service). Example video editing applications include ADOBE PREMIERE PRO and ADOBE PREMIERE ELEMENTS. Although some embodiments are described with respect to a video editing application and a video interaction engine, some embodiments implement aspects of the present techniques in any type of applications, such as those involving transcript processing, visualization, and/or interaction.

In various embodiments, the functionality described herein is allocated across any number of devices. In some embodiments, video editing application 105 is hosted at least partially server-side, such that video interaction engine 108 and video ingestion tool 160 coordinate (e.g., via network 103) to perform the functionality described herein. In another example, video interaction engine 108 and video ingestion tool 160 (or some portion thereof) are integrated into a common application executable on a single device. Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

To begin with a high-level overview of an example workflow through the configuration illustrated in FIGS. 1A and 1B, client device 102 is a desktop, laptop, or mobile device such as a tablet or smart phone, and video editing application 105 provides one or more user interfaces. In some embodiments, a user accesses a video through video editing application 105, and/or otherwise uses video editing application 105 to identify the location where a video is stored (whether local to client device 102, at some remote location such as storage 190, or otherwise). Additionally or alternatively, a user records a video using video recording capabilities of client device 102 (or some other device) and/or some application executing at least partially on the device (e.g., ADOBE BEHANCE). In some cases, video editing application 105 uploads the video (e.g., to some accessible storage 190 for video files 192) or otherwise communicates the location of the video to server 150, and video ingestion tool 160 receives or access the video and performs one or more ingestion functions on the video.

In some embodiments, video ingestion tool 160 extracts various features from the video (e.g., transcript 195, linguistic features, speakers, faces, audio classifications, visually similar scenes, visual artifacts, objects appearing in the video, actions appearing in the video, audio events), and generates and stores a representation of the detected features, corresponding feature ranges where the detected features are present, and/or corresponding confidence levels (e.g., detected features 194). In an example implementation, video ingestion tool 160 includes diarization component 164 that generates a speaker diarization of the transcript 195 using audio and/or video tracks from the video, transcript segmentation component 170 that segments transcript 195 by paragraph, and video segmentation component 180 that generates and stores a representation of one or more segmentations of the video (e.g., video segmentation(s) 196), for example, based on transcript segments (e.g., adjusted based on voice or audio activity detected from the audio track). Although these functions are described as being performed at ingestion, in some cases, some or all of these functions are performed at some other time (e.g., on demand).

In some embodiments, diarization component 164 includes face-aware speaker diarization component 166, music-aware speaker diarization component 168, and/or speaker thumbnail identification component 169. Face-aware speaker diarization component 166 performs speaker diarization to detect face and voice identities from the audio and video tracks of the video, and/or combines multiple speaker diarization techniques (e.g., an audio-only and an audio-visual technique) to generate a hybrid speaker diarization that links detected faces from the video track to detected voices from the audio track. In some embodiments, face-aware speaker diarization component 166 uses one or more machine learning models to evaluate one or more cropped images of a face from one or more frames of the video and a corresponding window of audio to predict an active speaker score that quantifies a likelihood that the face represented in the cropped images is speaking in the window of audio. In some embodiments, face-aware speaker diarization component 166 uses different models depending on the size of the cropped images, and model selector 167 evaluates the size of the cropped images and selects and triggers the appropriate model (e.g., one to evaluate small images with less than a threshold number of pixels in one or more dimensions, and one to evaluate larger images). As such, face-aware speaker diarization component 166 updates transcript 195 to represent which detected speaker and/or detected face is saying which segments of transcript 195.

In some embodiments, music-aware speaker diarization component 168 updates transcript 195 by removing (or designating) transcription and speakers that overlap in time with detected music-only regions. Additionally or alternatively, speaker thumbnail identification component 169 identifies a representative cropped image of the face of each detected speaker, for example, based on image quality, facial emotion, size of the image, and/or penalizing images that appear towards the beginning or end of a face track. As such, speaker thumbnail identification component 169 stores a representation of the representative cropped image of the face for each detected speaker (e.g., a thumbnail), for example, in storage 190.

In some embodiments, transcript segmentation component 170 segments transcript 195 to make the transcript easier to read, understand, and interact with. In FIG. 1A, transcript segmentation component 170 includes sentence segmentation component 172 that identifies sentence segments from transcript 195, sentence embedding component 174 that generates sentence embeddings for each sentence segment (or accesses previously generated sentence embeddings), diarization and pause segmentation component 176 that segments transcript 195 at each speaker change (and optionally at speaker pauses, such as those longer than a designated length or duration), and paragraph segmentation component 178 breaks long paragraphs (e.g., longer than a designated length or duration) into multiple smaller paragraphs at sentence boundaries using dynamic programming to minimize a cost function that penalizes candidate segmentations based on divergence from a target paragraph length, that rewards candidate segmentations that group semantically similar sentences into a common paragraph, and/or that penalizes candidate segmentations that include candidate paragraphs with long pauses (e.g., longer than a normalized length or duration).

In some embodiments, video segmentation component 180 identifies candidate boundaries for video segments based on sentences boundaries and word boundaries in transcript 195. In FIG. 1A, video segmentation component 180 includes sentence segmentation component 182 that identifies sentence segments from transcript 195. In an example embodiment, video segmentation component 180 includes gap closing component 186 that retimes boundaries of the sentence segments based on voice or audio activity (e.g., closing non-speech silence gaps between sentences, expanding sentence boundaries to a location within a threshold duration where voice or audio activity is a minimum). Word segmentation component 182 segments the sentence segments into word segments based on transcript 195, and in some embodiments, gap closing component 186 retimes boundaries of the word segments based on voice or audio activity. The resulting boundaries can be thought of as audio cuts in embodiments in which they are derived at least in part using the audio track (e.g., the transcript is generated from the audio track, so the sentence and/or word boundaries are detected from the audio track).

In some embodiments, video segmentation component 180 stores a representation of the video segmentation defined by the boundaries of the word and/or sentence segments (e.g., video segmentation 196) using one or more data structures. As such, video ingestion tool 160 and/or video editing application 105 access a video (e.g., one of video files 192), generate a transcript (e.g., transcript 195), and generate and store a representation of one or more segmentation(s) of the video (e.g., video segmentation(s) 196), constituent video segments of the video segmentations(s) (e.g., video files 192), and/or some representation thereof in any suitable storage location, such as storage 190, client device 102, server 150, some combination thereof, and/or other locations.

In an example embodiment, video editing application 105 (e.g., video interaction engine 108) provides one or more user interfaces with one or more interaction elements that allow a user to interact with the ingested video, for example, using interactions with transcript 195 to select a video segment (e.g., having boundaries from video segmentation(s) 196 corresponding to a selected region of transcript 195). FIG. 1B illustrates an example implementation of video interaction engine 108 comprising video selection tool 110 and video editing tool 115.

In an example implementation, video selection tool 110 provides an interface that navigates a video and/or file library, accepts input selecting one or more videos (e.g., video files 192), and triggers video editing tool 115 to load one or more selected videos (e.g., ingested videos, videos shared by other users, previously created clips) into a video editing interface. In some implementations, the interface provided by video selection tool 110 presents a representation of a folder or library of videos, accepts selection of multiple videos from the library, creates a composite clip with multiple selected videos, and triggers video editing tool 115 to load the composite clip into the video editing interface. In an example implementation, video editing tool 115 provides a playback interface that plays the loaded video, a transcript interface (provided by transcript tool 120) that visualizes transcript 195, and a search interface (provided by search tool 136) that performs a visual, textual, and/or question search for matching video segments within the loaded video.

In some embodiments, transcript tool 120 includes a selection and snapping tool 122 accepts an input selecting individual sentences or words from transcript 195 (e.g., by clicking or tapping and dragging across the transcript), and identifies a video segment with boundaries that snap to the locations of previously determined boundaries (e.g., audio cuts) corresponding to the selected sentences and/or words from transcript 195. In some embodiments, transcript tool 120 includes text-based video editing tool 124 that accepts commands that are traditionally thought of as text-based operations (e.g., instructions to cut, copy, paste, or delete selected transcript text), and in response, performs corresponding video editing operations using the selected video segment. Depending on the embodiment, transcript tool 120 includes: non-speech content visualization component 126 that visualizes non-speech content in transcript 195 (e.g., audio waveforms representing music, text annotations representing corresponding locations of detected features 194 in the video); video thumbnail preview component 128 that displays each paragraph of transcript 195 with one or more corresponding video thumbnails (e.g., in response to input hovering over a portion of transcript 195); speaker thumbnail component 130 that associates and/or displays each paragraph of transcript 195 with a speaker thumbnail; transcript scroll tool 132 that auto-scrolls transcript 195 while the video plays back (e.g., and stops auto-scroll when the user scrolls transcript 195 away from the portion being played back, and/or resumes auto-scroll when the user scrolls back to a portion being played back); and/or headings tool 134 that accepts input creating organizational headings within the transcript without editing the video and provides an outline view that navigates to corresponding parts of the transcript (and video) in response to input selecting (e.g. clicking or tapping on) a heading.

In some embodiments, search tool 136 includes visual search component 138 that encodes a freeform query and performs a visual search for frame embeddings that match; text search component 140 that performs a text search for matching words in transcript 195 or tags of detected features 194; question search component 142 that searches for or identifies meaningful questions that appear in the video (e.g., filtering out rhetorical, logistical, and/or short questions shorter than a designated length or duration); and/or search result layout component 142 that presents search results (e.g., in a row or column of search result tiles, where each tile shows a representative video thumbnail, the time in the video, a match score for the matching video segment, speaker thumbnail, and/or transcript text for the matching video segment), and/or navigates a corresponding portion of transcript 195 in response to selection of a particular search result.

Depending on the implementation, video editing tool 115 and/or video interaction engine 108 performs any number and variety of operations on selected video segments. By way of non-limiting example, selected video segments are played back, deleted, trimmed, rearranged, exported into a new or composite clip, and/or other operations. Thus, in various embodiments, video interaction engine 108 provides interface functionality that allows a user to select, navigate, play, and/or edit a video based on interactions with transcript 195.

Example Video Ingestion Techniques

Returning to FIG. 1A, in some embodiments, video ingestion tool 160 performs one or more video ingestion functions, such as feature detection, transcript segmentation, and/or video segmentation. Although these functions are described as being performed at ingestion, in some cases, some or all of these functions are performed at any suitable time, such as when ingesting or initially processing a video, upon receiving a query, when displaying a video timeline, upon activing a user interface, and/or at some other time.

In the example illustrated in FIG. 1A, video ingestion tool 160 ingests a video (e.g., a video file, a portion of a video file, a video represented or otherwise identified by a project file, such as a video editing project file). In some embodiments, ingesting a video comprises extracting one or more features from the video and/or generating one or more segmentations of the video identifying corresponding video segments and/or segment boundaries. In the implementation illustrated in FIG. 1A, video ingestion tool 160 includes feature extraction component(s) 162, transcript segmentation component 170, and video segmentation component 180.

At a high level, video ingestion tool 160 (e.g., feature extraction component(s) 162) detects, extracts, or otherwise determines various features (e.g., transcript 195, linguistic features, speakers, faces, audio classifications, visually similar scenes, visual artifacts, video objects or actions, audio events) from a video, for example, using one or more machine learning models, natural language processing, digital signal processing, and/or other techniques. In some embodiments, feature extraction component(s) 162 include one or more machine learning models for each of a plurality of categories of feature to detect. As such, video ingestion tool 160 and/or corresponding feature extraction component(s) 162 extract, generate, and/or store a representation of detected features (e.g., facets) in each category, corresponding feature ranges where the detected features are present, and/or corresponding confidence levels.

In some embodiments, one or more feature categories (e.g., speakers, faces, audio classifications, visually similar scenes, etc.) have their own feature track that represents the instances of detected features (e.g., facets such as unique faces or speakers) in a feature category. By way of nonlimiting example, for each feature category, the representation of detected features (e.g., detected features 194) includes a list, array, or other representation of each instance of a detected facet (e.g., each unique face) in the feature category (e.g., detected faces). In an example implementation, each instance of a detected facet is represented with a feature range where the instance is detected (e.g., start and stop timestamps per instance), a unique value identifying the facet to which the instance belongs (e.g., a unique value for each unique face, speaker, visual scene, etc.), a corresponding confidence level quantifying prediction confidence or likelihood, and/or a representation of other characteristics.

In some embodiments, feature extraction component(s) 162 extract transcript 195 and/or linguistic features from an audio track associated with a video. In an example implementation, any known speech-to-text algorithm is applied to the audio track to generate a transcript of speech, detect speech segments (e.g., corresponding to words, sentences, utterances of continuous speech separated by audio gaps, etc.), detect non-speech segments (e.g., pauses, silence, or non-speech audio), and/or the like. In some embodiments, voice or audio activity detection is applied (e.g., to the audio track, to detected non-speech segments) to detect and/or categorize segments of the audio track with non-word human sounds (e.g., laughter, audible gasps, etc.). In some cases, transcript 195 and/or detected transcript segments are associated with the video's timeline, and transcript segments are associated with corresponding time ranges. In some embodiments, any known topical segmentation technique (semantic analysis, natural language processing, applying a language model) is used to partition or otherwise identify portions of the video likely to contain similar topics, and detected speech segments are associated with a score that represents how likely the speech segment ends a topical segment. Additionally or alternatively, transcript segmentation component 170 partitions or otherwise identifies paragraphs of transcript 195 as described in more detail below.

In some embodiments, feature extraction component(s) 162 include diarization component 164 that generates one or more speaker diarizations. For example, diarization component 164 includes one or more machine learning models that detect unique speakers from an audio and/or video track associated with a video. In an example implementation, voice recognition, speaker identification, or speaker diarization technique is applied to detect unique vocal prints (e.g., within a single video, across a collection of videos) and partition or otherwise identify portions of the audio track(s) based on speaker identity. Example techniques used in voice recognition, speaker identification, or speaker diarization use frequency estimation, pattern matching, vector quantization, decision trees, hidden Markov models, Gaussian mixture models, neural networks, and/or other techniques. Additionally or alternatively to using audio signatures to detect speakers, in some embodiments, one or more machine learning models are used to determine which detected face is speaking by detecting mouth movement on detected faces. In an example implementation, each instance of a detected speaker in a video is associated with a corresponding time range of the video where the speaker was detected, a corresponding confidence level quantifying prediction confidence or likelihood, and/or a thumbnail of the detected face of the detected speaker. Additionally or alternatively, detected speech segments (e.g., words, phrases, sentences) and/or other transcript features are associated with a representation of corresponding detected speaker to update transcript 195 to be a diarized transcript.

In an example diarization technique, face-aware speaker diarization component 166 initially performs ASR and audio-only speaker diarization, followed by face-aware refinement via Active Speaker Recognition. In some embodiments, face-aware speaker diarization component 166 uses any known audio-based ASR+diarization method to compute an initial speaker diarization. This diarization does not link speakers to faces, so it only identifies speakers as "speaker 1", "speaker 2", etc. It is likely to suffer from over-segmentation. Then, using an Active Speaker Recognition approach, such as that described in Juan Leon Alcazar, Fabian Caba, Long Mai, Federico Perazzi, Joon-Young Lee, Pablo Arbelaez, Bernard Ghanem; Active Speakers in Context, Proceedings of the IEEE/CVF Conference on Computer Vision and Pattern Recognition (CVPR), 2020, pp. 12465-12474 ("Active Speakers in Context"), face-aware speaker diarization component 166 identifies the faces in the video that correspond to the active voice at each moment in the video. This face-aware speaker diarization is used to refine the initial speaker diarization (e.g., start/end times assigned to different speakers) and to link faces to voices, so that instead of "speaker 1", "speaker 2", etc., different parts of transcript 195 are associated with the identifies of the faces that speak them.

More specifically, in some embodiments, face-aware speaker diarization component 166 performs face-track detection, active speaker detection, face-aware diarization, and diarization update. In an example implementation, to perform face track detection, given a video, face-aware speaker diarization component 166 detects all faces (e.g., identifies a bounding box for each detected face), tracks them over time (e.g., generates a face track), and clusters them into person/face identities (e.g., face IDs). More specifically, in some embodiments, face-aware speaker diarization component 166 triggers one or more machine learning models to detect unique faces from video frames of a video. In an example implementation, any known face detection technique (e.g., RetinaFace) is applied to detect unique faces in each video frame and/or across time. For example, each video frame is processed by segmenting each face from the background (e.g., using one or more neural network), aligning each face, detecting locations of facial landmarks (e.g., eyes, nose, mouth), and generating a (e.g., vector) representation of the detected facial landmarks. In some embodiments, detected faces from different frames (e.g., within a single video, across a collection of videos) and that have similar representations (e.g., separated by a distance within some threshold, clustered based on one or more clustering algorithms) are determined to belong to the same identity. In an example implementation, each instance of a detected face is associated with a corresponding time range that spans the video frames where the face was detected and/or a corresponding confidence level quantifying prediction confidence or likelihood. An example output of face-track detection is a set of K face tracks belonging to M different identities.

Figure 2:
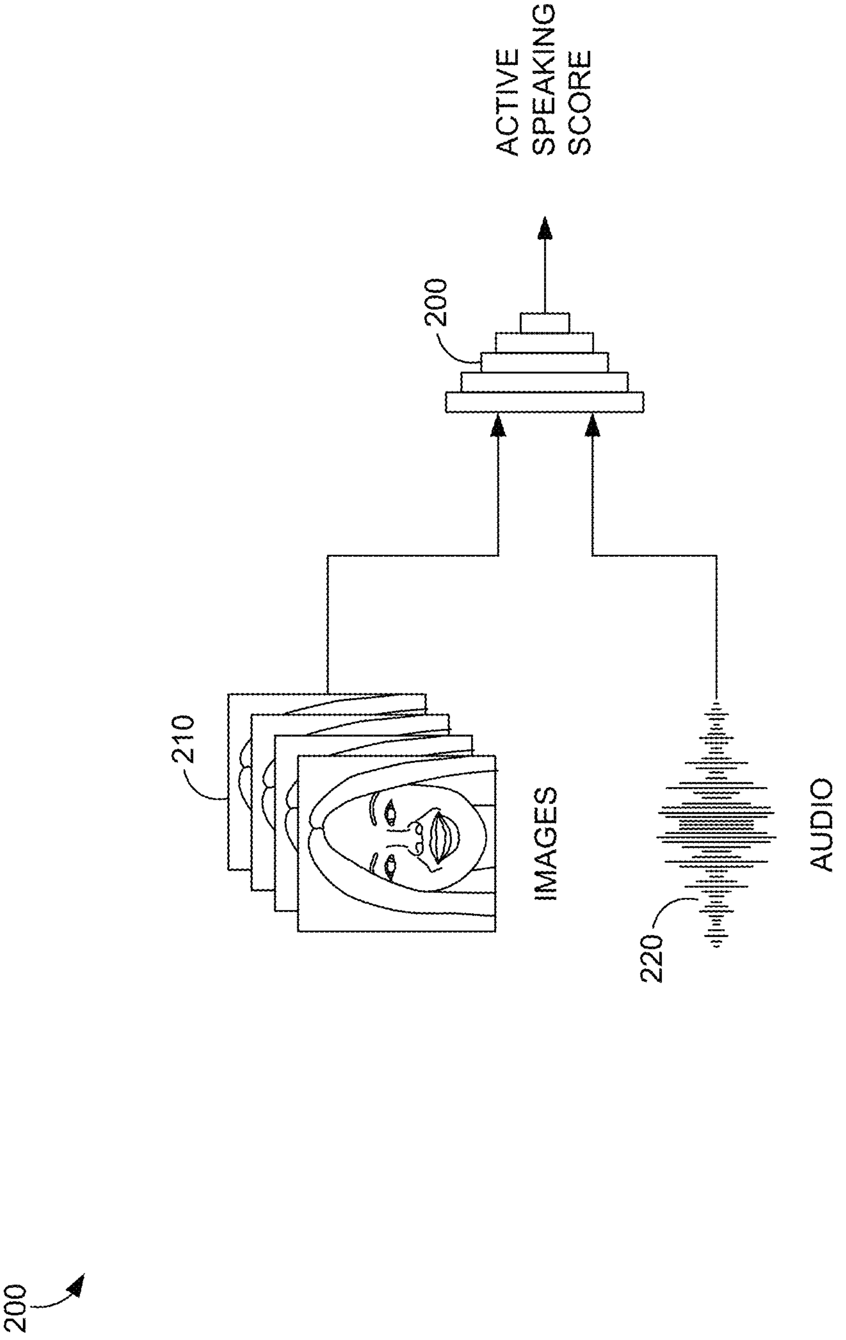
FIG. 2 illustrates an example active speaker detection model, in accordance with embodiments of the present invention.

In an example implementation, face-aware speaker diarization component 166 performs active speaker detection to assign an active speaking score (e.g., [0-1]) that quantifies a likelihood that each face track is the one speaking during a corresponding window of audio. Generally, there may be multiple faces present in any given video frame, and the person speaking might be one of those faces or even someone off-camera. Accordingly, in some embodiments, face-aware speaker diarization component 166 uses active speaker detection to predict if each face track is actively speaking. In an example embodiment, face-aware speaker diarization component 166 includes or triggers a machine learning model (such as the short-term encoder described in Active Speakers in Context, implemented via a two-tower convolutional neural network) that takes in a sequence of face images (e.g., a stack of N cropped face images from a sequence of N frames such as 15, normalized to have similar dimensions) and a corresponding window of the audio track, fuses the audiovisual information, performs a binary classification, and outputs an active speaking score. FIG. 2 illustrates an example active speaker detection model 200 that takes in a stack 210 of cropped face images and a corresponding window 220 of the audio track and predicts an active speaking score.

In some embodiments, face-aware speaker diarization component 166 generates an active speaking score for each instance in which a particular face appears in a sequence of a minimum number of frames (e.g., 15), and the face with the highest predicted active speaking score (e.g., above a threshold, such as 0.9) is taken as the active speaker. In some embodiments in which the machine learning model takes in a sequence of N (cropped) frames and corresponding window of audio, active speaking scores are computed for each window over a range (e.g., a continuous range where a particular speaker is speaking, such as one identified in the initial speaker diarization) and averaged for each face. For example, in some embodiments, given an initial (e.g., audio-only) diarization representing L temporal segments assigned to N speaker identities, face-aware speaker diarization component 166 assigns a face identity (face ID) to each of the L temporal segments and/or each of the N speaker identities from the initial diarization. In some embodiments, for each of the L temporal segments, face-aware speaker diarization component 166 identifies all face tracks contained within the temporal segment and chooses the corresponding face identity (face ID) with the largest predicted active speaking score throughout the temporal segment (e.g., computed by averaging the predicted active speaking scores for each window in the temporal segment). In some embodiments, predicted scores below a threshold (e.g., 0.5) are zeroed out prior to averaging to deemphasize low confidence predictions for parts of a continuous range. As such, the face ID with the largest (e.g., average) predicted active speaking score (e.g., greater than a threshold) is assigned to that temporal segment in a second (face-aware) diarization.

Figure 3:
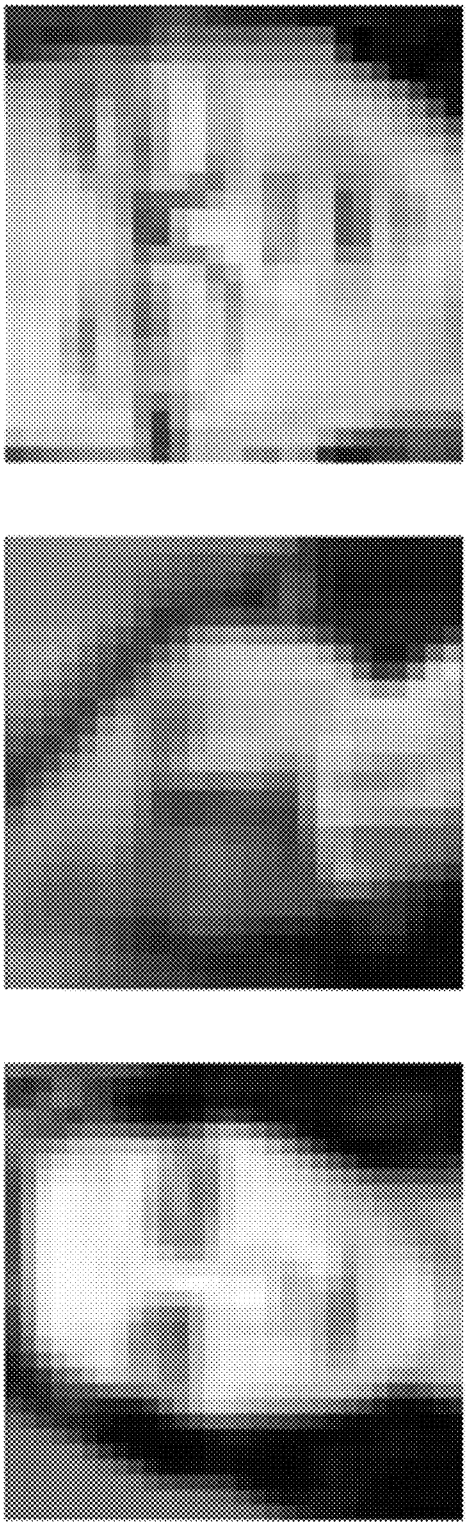
FIG. 3 illustrates examples of small or pixelated images of different faces, in accordance with embodiments of the present invention.

Depending on the video, the images of the detected faces can be small or pixelate d, examples of which are illustrated in FIG. 3. Situations like this can occur in various scenarios, like in a video meeting where video feeds from different participants are shown in different parts of the screen, a video with people who are far from the camera, or a video that has been downscale d for faster processing. In situations like this, an active speaker detection model may produce false negatives (e.g., low predicted speaker scores for faces that are actually speaking).

To address this problem, some embodiments use different active speaker detection model for different sized images. In some embodiments in which video ingestion tool 160 down-samples a video to facilitate faster processing, original or higher-resolution cropped face images are extracted and passed to the face-aware speaker diarization component 166 for processing. In some embodiments, model selector 167 of face-aware speaker diarization component 166 determines and compares the size of one or more cropped face images to an image size threshold (e.g., to identify images that are less than 47 pixels on one side), and based on the determination, routes the image(s) to a corresponding active speaker detection model (with correspondingly sized input channels) trained on images of a commensurate size or quality (e.g., extreme low-resolutions crops, crops from videos with low frames per second). In some embodiments in which active speaker detection model takes in a stack of N cropped face images extracted from N consecutive video frames (e.g., 15 frames), model selector 167 determines whether a representative cropped face image (e.g., from a middle frame in the range) or any of the cropped face images from those frames is smaller than the designated image size threshold. Additionally or alternatively to having a separate active speaker detection model for certain sized images, some embodiments use different confidence thresholds to assign faces to speakers. For example, since an active speaker detection model trained on small images may generate relatively lower predicted confidence scores due to the underlying images being pixelated, some embodiments apply a lower threshold to assign an active speaker based on confidence scores predicted by an active speaker detection model (e.g., 0.65) for smaller images than by an active speaker detection model for larger images (e.g., 0.9). As such, in some such embodiments, face-aware speaker diarization component 166 generates an active speaking score for each instance in which a particular face appears in a sequence frames (e.g., 15), using a model that depends on the size of one or more of the cropped images of the faces from the sequence, and the face with the highest predicted confidence score (e.g., above a threshold that depends on the selected model and/or the size of the cropped images) is taken as the active speaker.

In some embodiments, to identify potential off-camera speakers (or videos where people's faces are blurry), face-aware speaker diarization component 166 takes audio samples of the audio track (e.g., corresponding to detected speech), projects each audio sample into an embedding space (e.g., using any known technique), clusters the audio embeddings, and assigns face IDs from the detected face tracks to the clusters (e.g., based on some number or percentage of the audio embeddings in each cluster having a predicted active speaker score above a threshold). Each remaining unlabeled cluster of audio embeddings is assigned a unique face ID (for the purposes of the face-aware speaker diarization, even though those audio embeddings may not correspond to a detected face).

As such, in some embodiments, face-aware speaker diarization component 166 (or some other component) generates an initial (e.g., audio-only) speaker diarization hypothesis that assigns a first set of identities to corresponding segments of the audio track and/or transcript 195, and a second speaker diarization hypothesis (generated by linking the identity of the most likely speaking face tracks) that assigns a second set of identities (e.g., face IDs) to corresponding segments of the audio track and/or transcript 195.

As such, in some embodiments, face-aware speaker diarization component 166 combines these diarization hypotheses into a hybrid diarization. To illustrate the problem, suppose the initial speaker diarization contains the following sequence of speakers: [Speaker 2, Speaker 1, Speaker 2, Speaker 1, Speaker 3], and the second speaker diarization contains the following: [Speaker B, Speaker A, Speaker B, Speaker A, Speaker A]. In some embodiments, the goal is to find the most optimal identity mapping between the two hypotheses. For the example above, it would be: {Speaker 1→Speaker A, Speaker 2→Speaker B, Speaker 3→None}. In some embodiments, face-aware speaker diarization component 166 employs the Hungarian algorithm to find the optimal assignment. Additionally or alternatively, if there is a conflict between assigned speaker identifies between the two diarization hypotheses for a particular temporal segment, and the predicted active speaker score for the assigned speaker in the second speaker diarization is greater than a designated threshold, face-aware speaker diarization component 166 refines the identity assigned in the first speaker diarization to reflect the identity assigned by the second speaker diarization. In the example above, the identity of the first speaker diarization output would be updated by changing Speaker 3→Speaker 1.

Figure 4:
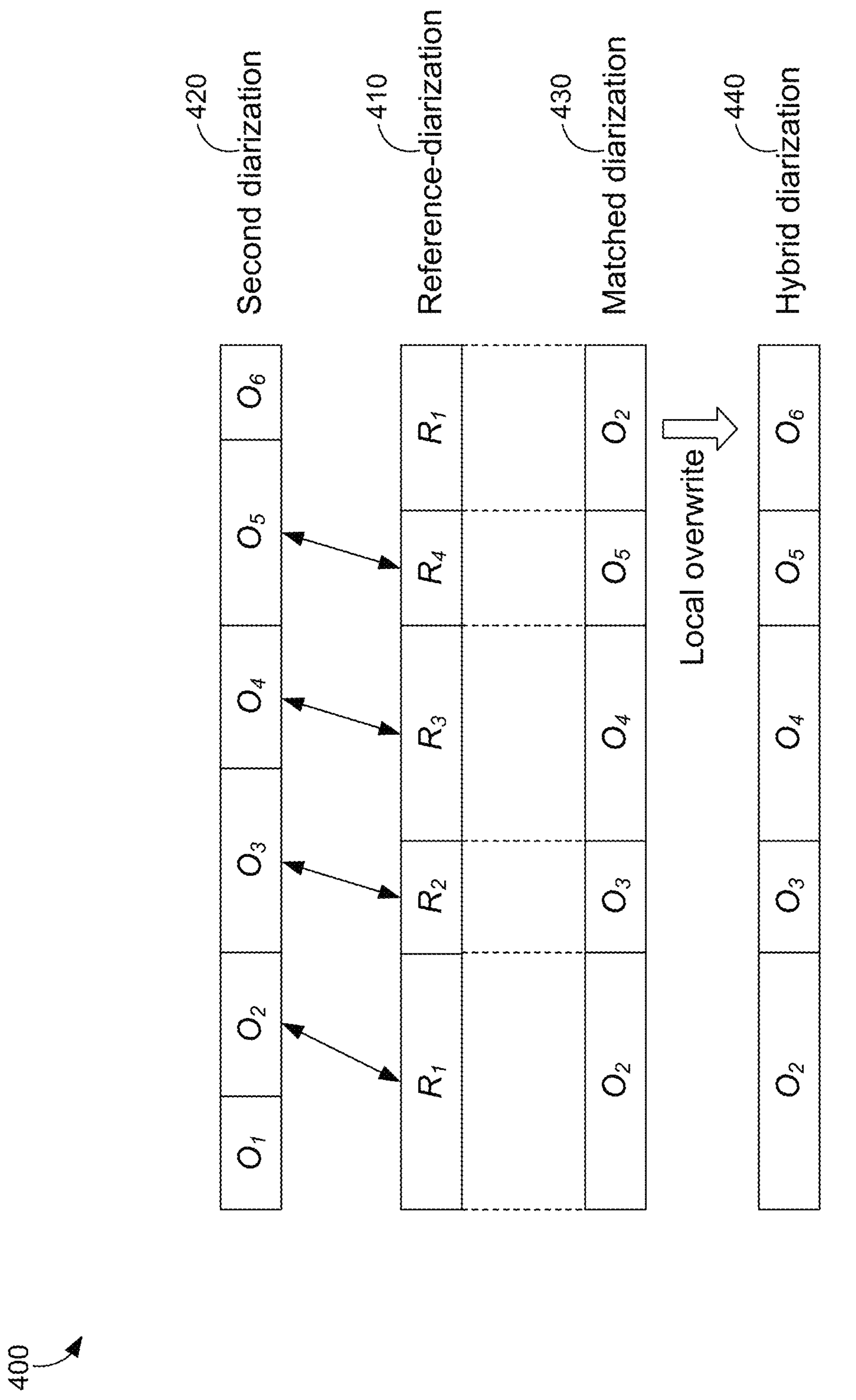
FIG. 4 illustrates an example hybrid speaker diarization, in accordance with embodiments of the present invention.

By way of illustration, consider the example illustrated in FIG. 4, which depicts a first or reference diarization 410 (e.g., an audio-only diarization) and second diarization 420 (a face-aware diarization). Assume reference diarization 410 contains N reference speakers, and second diarization 420 contains M refined speakers. In some embodiments, an optimal mapping between speakers is determined using the Hungarian algorithm so that each reference speaker is paired with at most one refined speaker, and each refined speaker with at most one reference speaker. For example, in FIG. 4, reference speaker $R_1$ has three potential refined speaker candidates: $O_1$, $O_2$, and $O_6$. Some embodiments select $O_2$ as it has the largest overlap with $R_1$. The Hungarian algorithm finds the assignment that optimizes over all reference speakers, as illustrated by the arrows between reference diarization 410 and second diarization 420. In embodiments in which second diarization 420 represents face identities, to preserve the face identities, the reference identities from reference diarization 410 are replaced with corresponding face identities from second diarization 420, as illustrated by matched diarization 430. Finally, if there is a conflict between the speaker assigned to a temporal segment in matched diarization 430 and one or more assigned speakers in a corresponding portion of second diarization 420, if one of the assigned speakers in the portion of second diarization 420 has a predicted active speaker score that is greater than a designated threshold, the speaker identity in matched diarization 430 is overwritten with the identity from second diarization 420 (e.g., $O_2$ is overwritten with $O_6$), resulting in hybrid diarization 440.

As such, and returning to FIG. 1A, face-aware speaker diarization component 166 generates a speaker diarization that assigns speaker and/or face identities to temporal segments of the audio track and/or corresponding segments of transcript 195. In some embodiments, since face identities are assigned to speakers using detected face tracks, each speaker is associated with one or more detected face tracks that contain, represent, or otherwise identity different images of that speaker's face. To facilitate visualizing the speaker (e.g., in a transcript interface that displays a diarized transcript, in a search interface that displays matching segments of a diarized transcript), in some embodiments, speaker thumbnail identification component 169 identifies a representative image of each speaker's face from candidate cropped images extracted from the video frames corresponding to the detected face track associated with that speaker.

Figure 5:
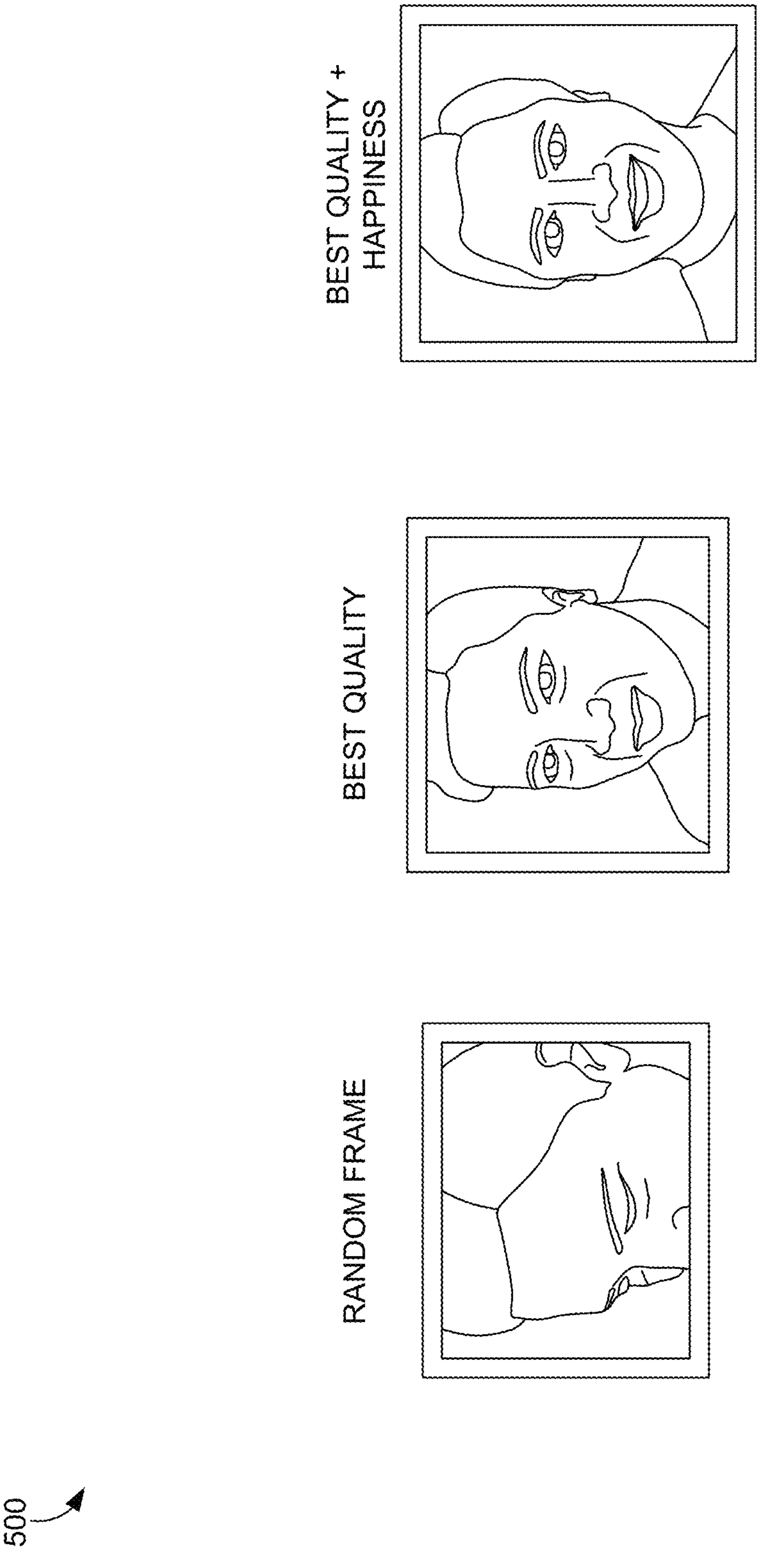
FIG. 5 illustrates example cropped images of the face of a particular speaker in a video, in accordance with embodiments of the present invention.

In some embodiments, one or more face tracks associated with a particular speaker store or identify a representation of the video frames in which the speaker's face appears, bounding box locations, and/or cropped images of the speaker's face. As such, there may be many candidate images that could be used to represent that speaker. FIG. 5 illustrates example cropped images of the face of a particular speaker in a video, in accordance with embodiments of the present invention. For example, in a randomly selected frame, the speaker might not be looking at the camera. As such, in some embodiments, a representative image for a speaker is selected based on image quality, facial emotion (e.g., using an emotion classifier that generates a happiness score), a size factor (e.g., favoring larger images), and/or penalizing images that appear towards the beginning or end of a face track.

In an example embodiment, each of the candidate images is assessed for image quality using any known technique, such as that described by U.S. Pat. No. 11,410,038, and the image with the highest quality is selected as the representative image for that speaker.

In some embodiments, each of the candidate images is assessed for a particular emotion, such as happiness (e.g., by applying each image to an emotion classifier to generate a measure of detected emotion, such as a happiness score), and the image with the highest predicted emotion score is selected as the representative image for that speaker.

In some embodiments, each of the candidate images is assessed based on image size, and the largest image (e.g., highest resolution) is selected as the representative image for that speaker.

In some embodiments, each of the candidate images is assessed based on the proximity of the frame from which the image was extracted to the beginning or end of a detected face track. Cross-fades are commonly used in video editing, and detected face tracks can pick up faces that are present during a cross-fade, in which case, the image of the face can appear transparent or semi-transparent. As such, some embodiments select a representative image that comes from a central temporal region of a detected face track.

In some embodiments, each of the candidate images is assessed based on any of the foregoing factors (and/or others) to generate corresponding factor scores, which are normalized and/or combined (e.g., in weighted sum) to generate a combined score for each candidate image. For example, some embodiments compute an image quality factor that represents an assessed measure of image quality and rewards higher quality images, a facial emotion factor that represents an assessed measure of facial emotion and rewards a desired emotion (e.g., happiness), a size factor that rewards larger images of faces (e.g., a score that grows linearly as the number of pixels in the image grows in either x or y dimension, and approaches upper and lower asymptotes as the size approaches upper and lower target sizes, respectively), and/or an edge factor that penalizes images that appear towards the beginning or end of a face track (e.g., 0 for frames on the edge of the face track, 1 from the center frame, and a transition between). In some embodiments, multiple individual factor scores are computed for each candidate image, the individual factor scores are combined (e.g., in a weighted sum), and the candidate image with the largest total score is selected as the representative image for the speaker. In an example embodiment that includes image quality, facial emotion factor, and a size factor, a weighted sum for a total score is given by: $\{quality+w_1 \cdot happiness+w_2 size\}$, where $w_1$ and $w_2$ are designated weights.

As such, and returning to FIG. 1A, speaker thumbnail identification component 169 identifies a representative image for each speaker (e.g., a speaker thumbnail) and/stores a representation of the image for each speaker (e.g., in detected features 194).

Turning now to music-aware speaker diarization component 168, in some embodiments, music-aware speaker diarization component 168 removes transcribed singing by identifying and removing text that overlaps with detected music from transcript 195. More specifically, in some embodiments, music-aware speaker diarization component 168 updates transcript 195 by removing (or designating) transcription and speakers that overlap in time with detected music-only regions. In an example implementation, feature extraction component(s) 162 extract audio classifications identifying likelihood over time that audio contains speech and music, and music-aware speaker diarization component 168 converts the audio classifications into events (contiguous regions that have a start and end time), merges adjacent events of the same type, identifies the times when music is present, but speech is not, removes these music-only events that are shorter than 3 seconds, detects sentences (e.g., of transcript 195) that overlap with the music-only events (e.g., by at least 50%), and identifies them as sentences that should not be included in transcript 195.

More specifically, in some embodiments, feature extraction component(s) 162 include one or more machine learning models (e.g., audio tagging models) that extract audio classifications from an audio track associated with a video. Any known sound recognition technique is applied to detect any number of audio classes (e.g., music, speech, other). In an example implementation, each frame of audio data from the audio track is encoded into a vector representation (e.g., using linear predictive coding) and classified by one or more neural networks to predict a likelihood (e.g., between 0-1) of different sound classes being present in the audio signal over time (e.g., 10 predictions per second). As such, detection curves for speech and music are generated, with each detection curve representing the likelihood over time that a corresponding audio classification is present.

Note that singing is not speech in this context. "Speech" is human voice saying words in a speaking tone, "Singing" is when words (or syllables) are produced in a musical fashion (i.e. as notes that represent a melody). As a result, using one or more example audio tagging models, speech (speaking) will be classified as speech, instrumental music will be classified as music, singing will be classified as music, music with singing will be classified as music, and speaking with music in the background will be classified as speech and as music (e.g., an example model produces multiple simultaneous labels).

In some embodiments, music-aware speaker diarization component 168 post-processes the predicted likelihoods to convert them into events that represent contiguous regions that have a start and end time (e.g., "music" from time 1 second to 12 seconds, "speech" from time 5.5 seconds to 20 seconds, "speech from time 30.1 seconds to 40.7 seconds", etc.). In an example implementation, to accomplish this, music-aware speaker diarization component 168 applies smoothing and thresholding to the detection curve for each sound class ("music" and "speech").

In some embodiments, music-aware speaker diarization component 168 merges adjacent events of the same type (e.g., two music events, or two speech events) if they are within a designated threshold temporal spacing of each other. In an example implementation, the threshold is tuned separately for speech (2 seconds) and music (5 seconds). Merging adjacent events (e.g., speech events) ensures that any short gaps (e.g., in speech) due to possible detection errors in the audio tagging model do not result in regions of missed classifications (e.g., speech).

In some embodiments, music-aware speaker diarization component 168 generates a representation of music-only regions by comparing the times of the music events against the times of the speech events to identify the times when music is present, but speech is not. These "music only" times are the temporal regions that we ultimately want to exclude from the diarization, as we only want to include speech content in the diarization output. Note that these "music only" regions can contain singing, as intended, since we do not want to include singing in the speaker diarization output.

In some embodiments, music-aware speaker diarization component 168 applies a duration filter to these detected music-only events, removing events that are shorter than a designated threshold duration (e.g., 3 seconds). In some embodiments, since music-only regions will later be excluded from transcript 195 (and, optionally, visualized as music in a transcript interface), removing very short musical segments avoids cluttering the visualized output with short music sections that are more likely to result from AI detection errors than real music content in the audio/video.

In some embodiments, music-aware speaker diarization component 168 takes the remaining detected music-only events, compares them against temporal ranges of detected sentences from transcript 195 (e.g., a diarized transcript), detects sentences that overlap with the music-only events (e.g., by at least 50%), and identifies them as sentences that should not be included in transcript 195 (e.g., marked as music-only, not displayed as transcript text).

Figure 6:
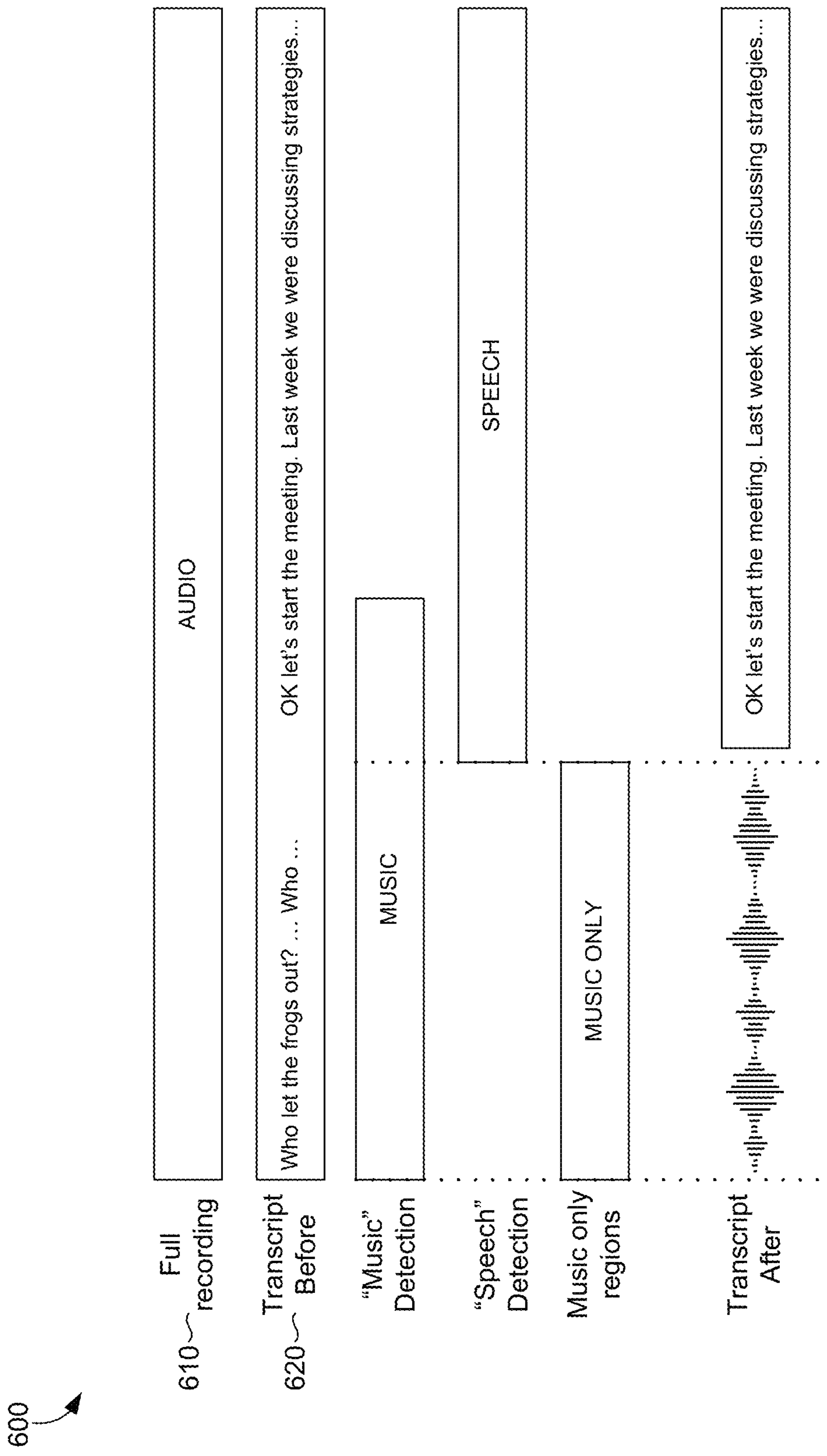
FIG. 6 illustrates an example music-aware speaker diarization technique that removes transcribed singing, in accordance with embodiments of the present invention.

FIG. 6 illustrates an example music-aware speaker diarization technique that removes transcribed singing, in accordance with embodiments of the present invention. In FIG. 6, the audio track of a video is represented by full recording 610 and a transcript of the audio track before removing transcribed singing is represented as transcript before 620. The illustrated portion of transcript before 620 includes transcribed singing with a transcription error, which is a common problem with conventional ASR techniques (e.g., which commonly assigns incorrect words and misses words entirely).

By way of example, assume full recording 610 is a 30 second recording that contains music from 0-15 seconds and speech from 10-30 seconds. Using techniques described herein, the region of 0-10 seconds is detected as music-only, since the "music" label is active in this region, whereas the "speech" label is not. The region between 10-15 seconds contains both music and speech, and therefore will not be labeled as music-only. The region from 15-30 only contains speech, and therefore will not be labeled as music-only either. In this example, the end result is that only one music-only region is detected, the first 10 seconds of the recording before the speech starts.

In this example, assume these first 10 seconds of music contain singing, as illustrated in FIG. 6. By default, conventional transcription and diarization algorithms attempt to transcribe the lyrics into sentences and assign them to a speaker. By contrast, using techniques described herein, the transcribed and/or diarized sentences are evaluated to identify whether they overlap with the music-only region. If they do (e.g., by at least a designated overlap threshold amount or percent, such as 50%), these sentences are identified as singing and/or are excluded from the transcript text and/or diarization. Note that the sentence times and music-only regions may not perfectly overlap, so imposing a designated overlap threshold that is less than 100% reduces the risk of keeping sentences of singing that should be discarded.

Turning now to transcript segmentation component 170 of FIG. 1, in some embodiments, transcript segmentation component 170 segments transcript 195 by paragraph to make the transcript easier to read, understand, and interact with. In an example embodiment, transcript segmentation component 170 segments transcript 195 into paragraphs based on paragraph length and/or semantic coherency of the segments of text in each paragraph. By way of motivation, some embodiments seek to create paragraphs of reasonable length (e.g., not too short but not too long either). Some embodiments additionally or alternatively break down the text in a way that each resulting paragraph is semantically coherent, and breaks down the text at the best point for a topic change.

In some embodiments, transcript 195 includes a representation of spoken text, corresponding speaker IDs, and/or word-level timings. In an example implementation, transcript segmentation component 170 extracts sentences, corresponding speaker IDs, and the start and end time of each sentence from transcript 195. In some embodiments, transcript segmentation component 170 uses the sentence start and end times to identify pauses between sentences, and segments the text of transcript 195 at each pause that is longer than a designated length (e.g., in words) or duration. Additionally or alternatively, transcript segmentation component 170 segments the text of transcript 195 at the beginning of each speaker change. In some embodiments, if any of the resulting paragraphs is longer than a designated length (e.g., in words) or duration, the paragraph is segmented using dynamic programming to choose the candidate segmentation that minimizes the sum of the costs for the resulting paragraphs in that segmentation.

Figure 7:
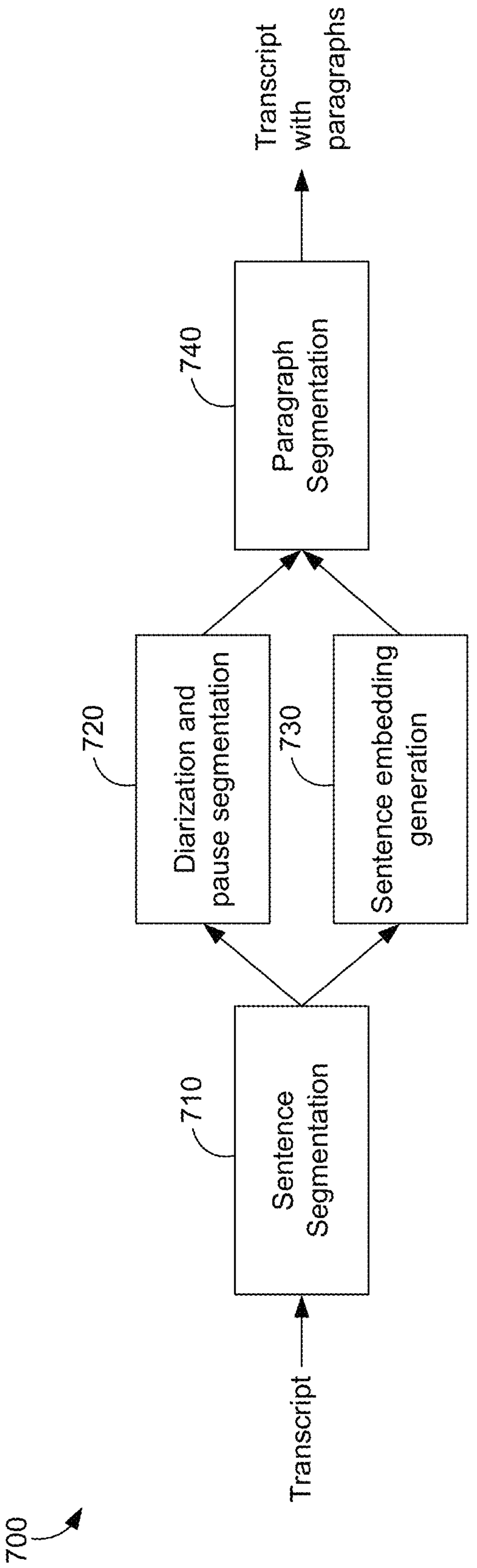
FIG. 7 is a flow diagram showing an example transcript segmentation technique, in accordance with embodiments of the present invention.

FIG. 7 is a flow diagram showing an example transcript segmentation technique 700 (e.g., implemented by transcript segmentation component 170 of FIG. 1), in accordance with embodiments of the present invention. Transcript segmentation technique 700 includes sentence segmentation 710, diarization and pause segmentation 720, sentence embedding generation 730, and paragraph segmentation 740.

In some embodiments, sentence segmentation 710 extracts sentences, corresponding speaker IDs, and the start and end time of each sentence from a transcript. Diarization and pause segmentation 720 breaks the transcript text based on speaker changes and long pauses. In an example implementation, diarization and pause segmentation 720 starts a new paragraph whenever there is a speaker change and/or whenever there is a long pause (e.g., non-speech segment that is longer than a designated length or duration, such as 3 seconds). In some embodiments, after segmentation based on speaker diarization and/or long pauses, if there are still paragraphs that are longer than a designated length or duration (e.g., 50 or 100 words), paragraph segmentation 740 is applied on each such paragraph to break it down into smaller paragraphs.

To facilitate paragraph segmentation based on semantic coherency, in some embodiments, sentence embedding generation 730 generates sentence embeddings for one or more sentences from transcript 195 (e.g., all sentences, just those in a paragraph being segmented), and paragraph segmentation 740 quantifies similarity between sentences in a candidate paragraph. Depending on the implementation, sentence embedding generation 730 uses any known technique to generate (or access previously generated) sentence embeddings. An example model for generating sentence embeddings is the Universal Sentence Encoder, which generates a vector (of size 512) representation of each sentence.

In some embodiments, paragraph segmentation 740 uses dynamic programming to find the globally optimal text segmentation of a paragraph, evaluating candidate segmentations that break the paragraph at candidate sentence boundaries and evaluate the resulting candidate paragraphs (and therefore the resulting candidate segmentation) based on sentence similarity and length of the candidate paragraphs. In an example implementation, paragraph segmentation 740 identifies each potential candidate segmentation of a paragraph using the boundaries of the sentences in the paragraph as candidate boundaries (e.g., to avoid breaking in the middle of a sentence). For each candidate segmentation and each candidate paragraph in the candidate segmentation, paragraph segmentation 740 assigns a cost that penalizes the candidate paragraph based on divergence from a target paragraph length and/or rewards candidate paragraphs that group semantically similar sentences into a common paragraph.

With respect to paragraph length, some embodiments designate a target paragraph length (e.g., in units of sentences or words). Depending on the implementation, transcribed sentences can be have widely variable length, so some embodiments assign an ideal (target) word length for a transcript paragraph. As such, in an example implementation, paragraph segmentation 740 assigns a length cost that uses a distance function to quantify the distance of the length of a candidate paragraph from one or more designated target lengths (e.g., minimum and maximum). An example length cost for a candidate paragraph is given by:

$$f(l) = \begin{cases} 0, & \min L \le l \le \max L \\ (\min(\text{abs}(l - \min L), \text{abs}(l - \max L)))^\wedge 2, & l > \max L \text{ or } l < \min L \end{cases}$$

where l is the length of the candidate paragraph (e.g., in words), minL is a designated minimum target length (e.g., in words), and maxL is a designated maximum target paragraph length (e.g., in words).

With respect to semantic coherency within a candidate paragraph, some embodiments quantify similarity of the sentences in each candidate paragraph. In an example implementation, paragraph segmentation 740 assigns a paragraph coherence cost that encourages grouping semantically similar sentences and discourages grouping semantically different sentences. In an example implementation, paragraph segmentation 740 calculates a measure of similarity of each pair of sentences in a candidate paragraph (e.g., by computing cosine similarity of their corresponding sentence embeddings). In some embodiments, if a candidate paragraph has N sentences, paragraph segmentation 740 generates an N*N similarity matrix, and combines (e.g., averages) the measure of similarity for each pair to generate a measure of paragraph similarity. Since this measure of similarity is larger for (and therefore penalizes) candidate paragraphs with more semantic coherency, in some embodiments, paragraph segmentation 740 takes its additive inverse to generate a paragraph coherence cost that penalizes candidate paragraphs with less semantic coherency (or subtracts the paragraph similarity in a weighted sum, as indicated below).

As such, in some embodiments, paragraph segmentation 740 combines the length cost and paragraph coherence cost for each candidate paragraph (e.g., as a weighted sum). In an example implementation, the weighted sum is calculated as:

$$\text{candidate paragraph cost}=w*f(1)-(1-w)*\text{paragraph similarity}$$

where w is a weight that determines whether there should be more emphasis on the length of the generated paragraphs or their similarity. An example weight in a non-limiting embodiment is w=0.01.

In some embodiments, additionally or alternatively to segmenting at long pauses, paragraph segmentation 740 includes a cost in a cost function that penalizes long pauses (e.g., longer than a normalized length or duration) in a candidate paragraph. In an example implementation, paragraph segmentation 740 identifies all pauses in speech in the paragraph being segmented (e.g., looking up start and stop times associated with audio classifications of speech pauses extracted by one or more audio classifiers of feature extraction component(s) 162 and stored in detected features 194, identifying pauses from differences in word or sentence timings in transcript 195). Given the durations of the pauses in a paragraph being segmented, paragraph segmentation 740 normalizes the durations (e.g., computes an average pause duration, an average duration of consecutive pauses by a particular speaker before a change in speaker), and computes a cost that penalizes candidate paragraphs with pauses that are longer than a normalized length/duration. As such, in some embodiments, paragraph segmentation 740 assigns a cost to candidate paragraphs based on duration of speaker pauses in the candidate paragraph, penalizing candidate paragraphs that include speaker pause(s) that are longer (e.g., total or average length/duration) than a normalized length/duration.

As such, for each candidate segmentation and each candidate paragraph in each candidate segmentation, paragraph segmentation 740 assigns a cost to the candidate paragraph and uses dynamic programming to choose the candidate segmentation that minimizes the sum of the costs for the candidate paragraphs. As such, embodiments such as these identify paragraphs with a flexible paragraph length and provide a balance among a desired length of paragraph, coherence of topic in each paragraph, and/or length of speaker pause(s) in each paragraph.

Turning now to video segmentation component 180 of FIG. 1A, in some embodiments, video segmentation component 180 identifies candidate boundaries for video segments based on sentences boundaries and word boundaries in transcript 195. In an example implementation, the boundaries will be used in a text-based video editing interface that presents a visualization of transcript 195, including transcript text (e.g., diarized, segmented by paragraph), and accepts text-based selections and editing operations (e.g., selecting transcript text, selecting a command such as cut, copy, paste, delete). In this example, user input selecting transcript text snaps a selection of transcript text to word and/or sentence boundaries identified by video segmentation component 180, and snaps a selection of a corresponding video segment to corresponding boundaries. As such, a text-based selection is used to define a corresponding video segment, and a text-based command (e.g., cut, copy, paste) is used to instruct a corresponding video edit on the video segment.

Figure 8A:
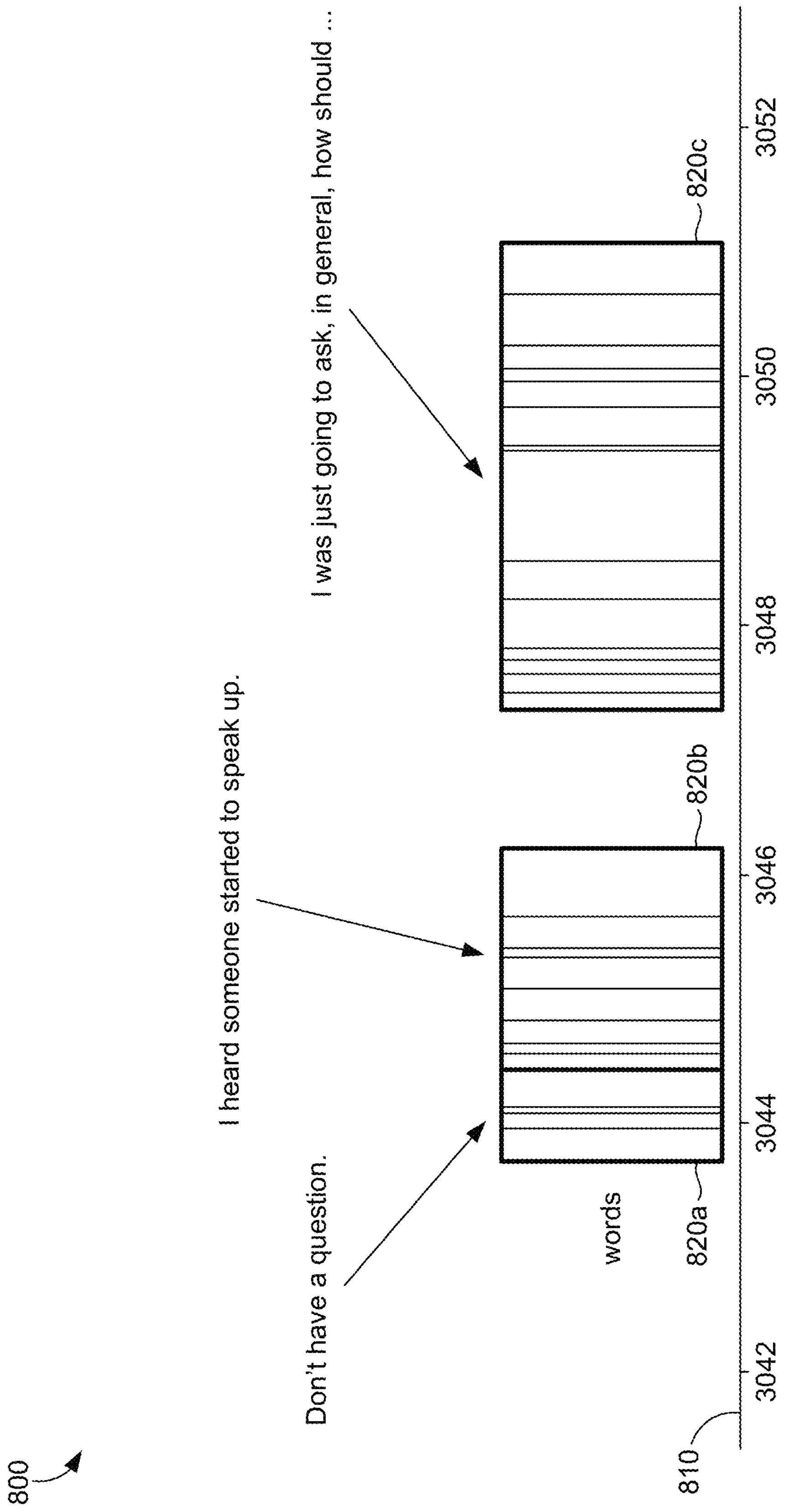
FIGS. 8A-8C illustrate an example segmentation technique using example word and sentence segments, in accordance with embodiments of the present invention.
Figure 8B:
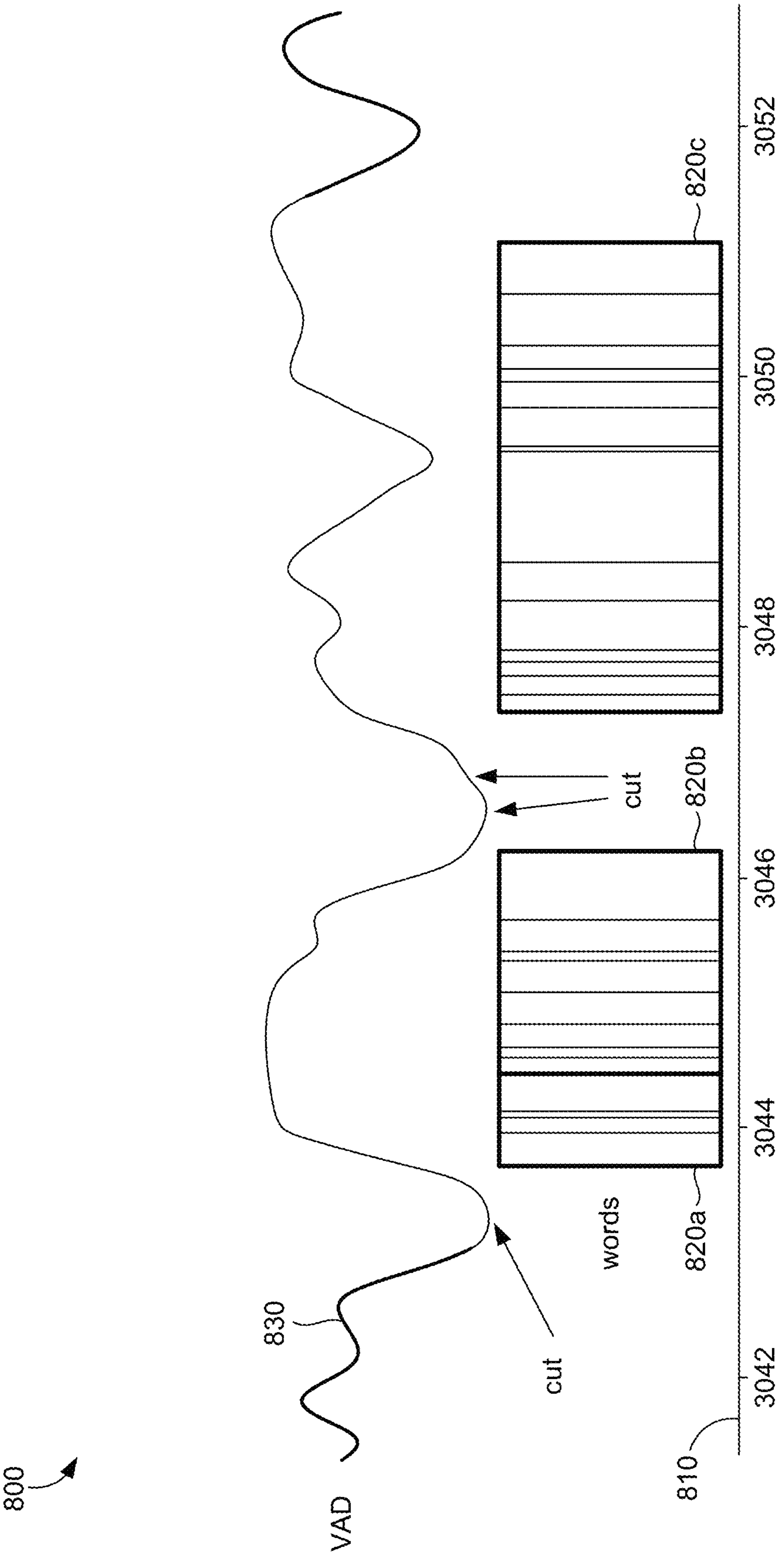
Figure 8C:
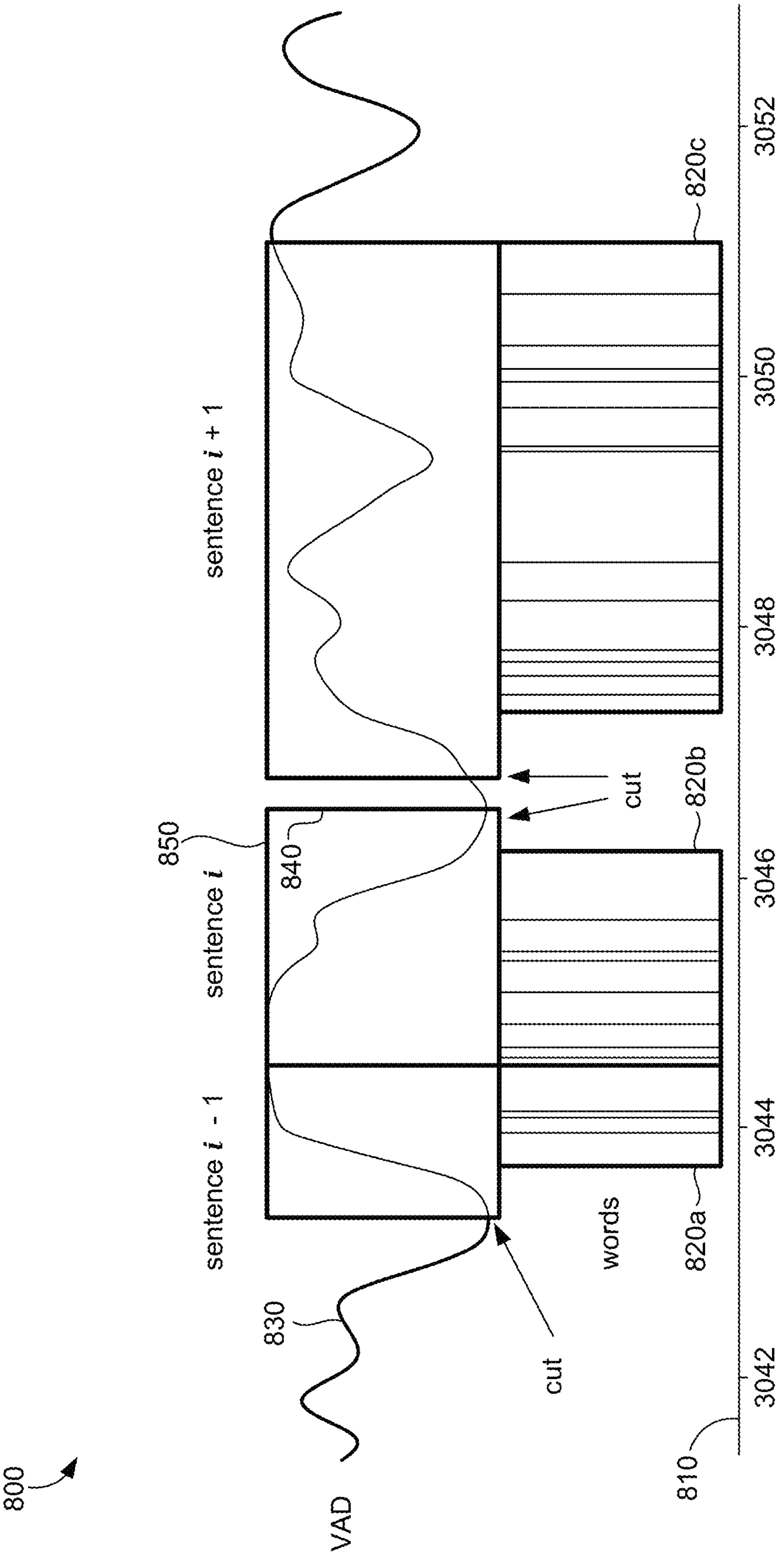

FIGS. 8A-8C illustrate an example segmentation technique using example word and sentence segments, in accordance with embodiments of the present invention. In an example implementation, a generated transcript identifies sentences, words, and timestamps indicating when in a corresponding audio track each sentence and/or word is spoken. FIGS. 8A-8C represent transcript segments (sentence and word segments) detected using a transcription service, as well as their durations (e.g., as length), on a timeline 810. In this example, the transcript includes three sentences represented as corresponding sentence segments 820*a-c* with each sentence segment 820*a-c* being subdivided into corresponding word segments. In some embodiments, a representation of sentence segments 820*a-c* are extracted from the transcript, as illustrated in FIG. 8A.

In some embodiments, the timestamps for the boundaries of the sentence segments 820*a-c* are used to detect whether there are any gaps between sentences segments (non-speech segments), and the boundaries for sentence segments that are adjacent to a gap are retimed into the gap based on voice or audio activity. For example, as illustrated in FIG. 8B, there is a gap between sentence segments 820*b* and 820*c*. As such, a corresponding voice or audio activity signal 830 is mapped onto timeline 810. Depending on the implementation, voice or audio activity signal 830 is any signal representing content in the audio track, such as amplitude of the audio waveform of the track, a representation of speech amplitude (e.g., a voice activity detection signal generated from the audio track), and/or otherwise. For each sentence segment (e.g., adjacent to a detected gap), a neighborhood of a designated length or duration (e.g., 0.5 seconds) (e.g. within an adjacent gap) is searched for the location at which voice or audio activity signal 830 is a minimum, and the boundary is adjusted to that location. As illustrated in FIG. 8C, sentence segment 820*b* has its outer boundary adjusted to a new location 840 where voice or audio activity signal 830 is a minimum, resulting in updated sentence segment 850. In some embodiments, short gaps that are less than a designated duration are closed, extending one or more of the adjacent sentence segment boundaries to a location in the gap where the voice or audio activity signal is a minimum.

In some embodiments, each sentence segment is mapped to its constituent word segments using timestamps from the transcript. In an example embodiments, the timestamps for the boundaries of the word segments are used to detect whether there are any gaps between word segments (non-speech segments), and the boundaries for word segments adjacent to a gap are retimed into the gap based on voice or audio activity. For each word segment (e.g., adjacent to a detected gap), a neighborhood of a designated length or duration (e.g., 0.1 seconds) (e.g. within an adjacent gap) is searched for the location at which voice or audio activity signal is a minimum, and the boundary is adjusted to that location. In some embodiments, short gaps that are less than a designated duration are closed, extending one or more of the adjacent word segment boundaries to a location in or across the gap where the voice or audio activity signal is a minimum.

As such, a representation of the resulting (e.g., retimed) sentence and/or word boundaries (e.g., video/audio timestamps) are stored and used to snap a selection to the closest corresponding boundaries. Returning to FIG. 1A, in some embodiments, video segmentation component 180 stores a representation of video segmentation 196 defined by the boundaries of the word and/or sentence segments using one or more data structures. In an example implementation, video segments of a video segmentation(s) 196 are identified by values that represent, or references to, timeline locations (e.g., boundary locations, IDs, etc.), segment durations, separations between boundaries (e.g., snap points), and/or other representations. In some cases, a single copy of a video and/or a representation of boundary locations for one or more segmentations are maintained. Additionally or alternatively, the video file is broken up into fragments at boundary locations of video segments from the (e.g., default) video segmentation for efficiency purposes.

Example Text-Based Video Editing Interface

The prior section described example techniques for generating a transcript of an audio track of a video, and segmenting the video based on transcript segments, for example, to prepare for video editing or other video interactions. As such, video ingestion tool 160 generates a structured representation of the video that provides an efficient and intuitive structure for interacting with the video, for example, via video interaction engine 108 of video editing application 105 in FIGS. 1A and 1B.

In an example implementation, video interaction engine 108 provides interface functionality that allows a user to select, navigate, play, and/or edit a video through interactions with a visualization of transcript 195 presented in a transcript interface controlled by transcript tool 120. In the example implementation in FIG. 1B, video interaction engine 108 includes video selection tool 110 that provides an interface that navigates a video and/or file library, accepts input selecting one or more videos (e.g., video files 192), and triggers video editing tool 115 to load one or more selected videos (e.g., ingested videos, videos shared by other users, previously created clips) into a video editing interface controlled by video editing tool 115. Generally, video selection tool 110 and/or video editing tool 115 present one or more interaction elements that provide various interaction modalities for selecting, navigating, playing, and/or editing a video. In various embodiments, these tools are implemented using code that causes a presentation of a corresponding interaction element(s), and detects and interprets inputs interacting with the interaction element(s).

Figure 9:
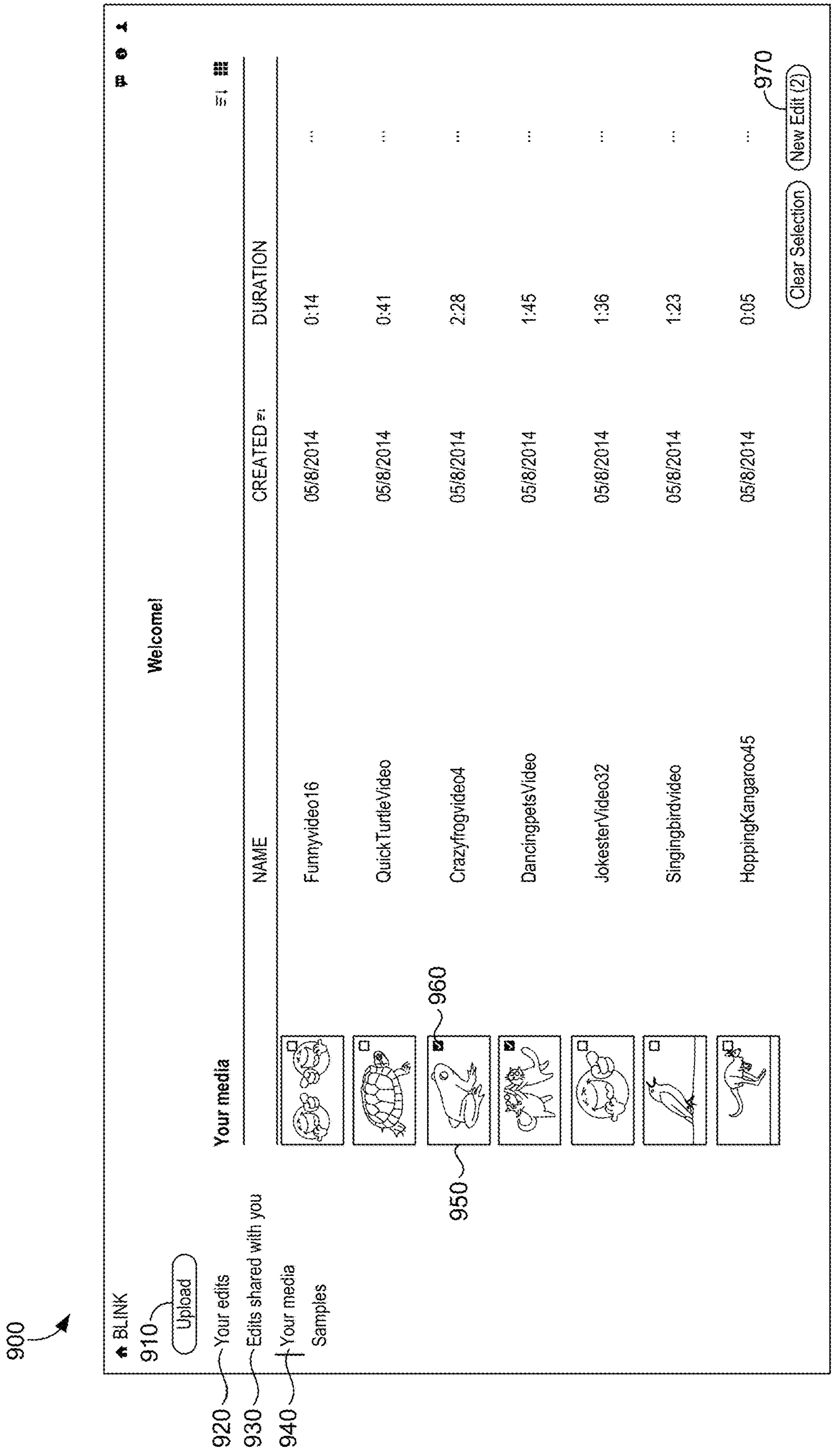
FIG. 9 illustrates an example video selection interface, in accordance with embodiments of the present invention.

FIG. 9 illustrates an example video selection interface 900, in accordance with embodiments of the present invention. In this example, video selection interface 900 includes a panel on the left with upload button 910, your edits button 920, edits shared with you button 930, and your media button 940. Upload button 910 opens up a navigational interface that accepts input identifying the location of a video to be uploaded into the user's media library. In an example implementation, uploading a video triggers various video ingestion processes (e.g., generating a transcript of the video's audio track, segmenting the video based on transcript segments). Your edits button 920 opens up an interface that lists various video clips created by a particular account, edits shared with you button 930 opens up an interface that lists various video clips shared with that particular account by other accounts, and your media button 940 opens up an interface that lists ingested media (e.g., ingested videos). In an example implementation, your media button 940 opens up an interface such as the one shown on the right side of video selection interface 900, listing each available (e.g., ingested) video in a corresponding row with a thumbnail from the video (e.g., thumbnail 950) and/or various video metadata (e.g., file name, date created, video duration).

Figure 10:
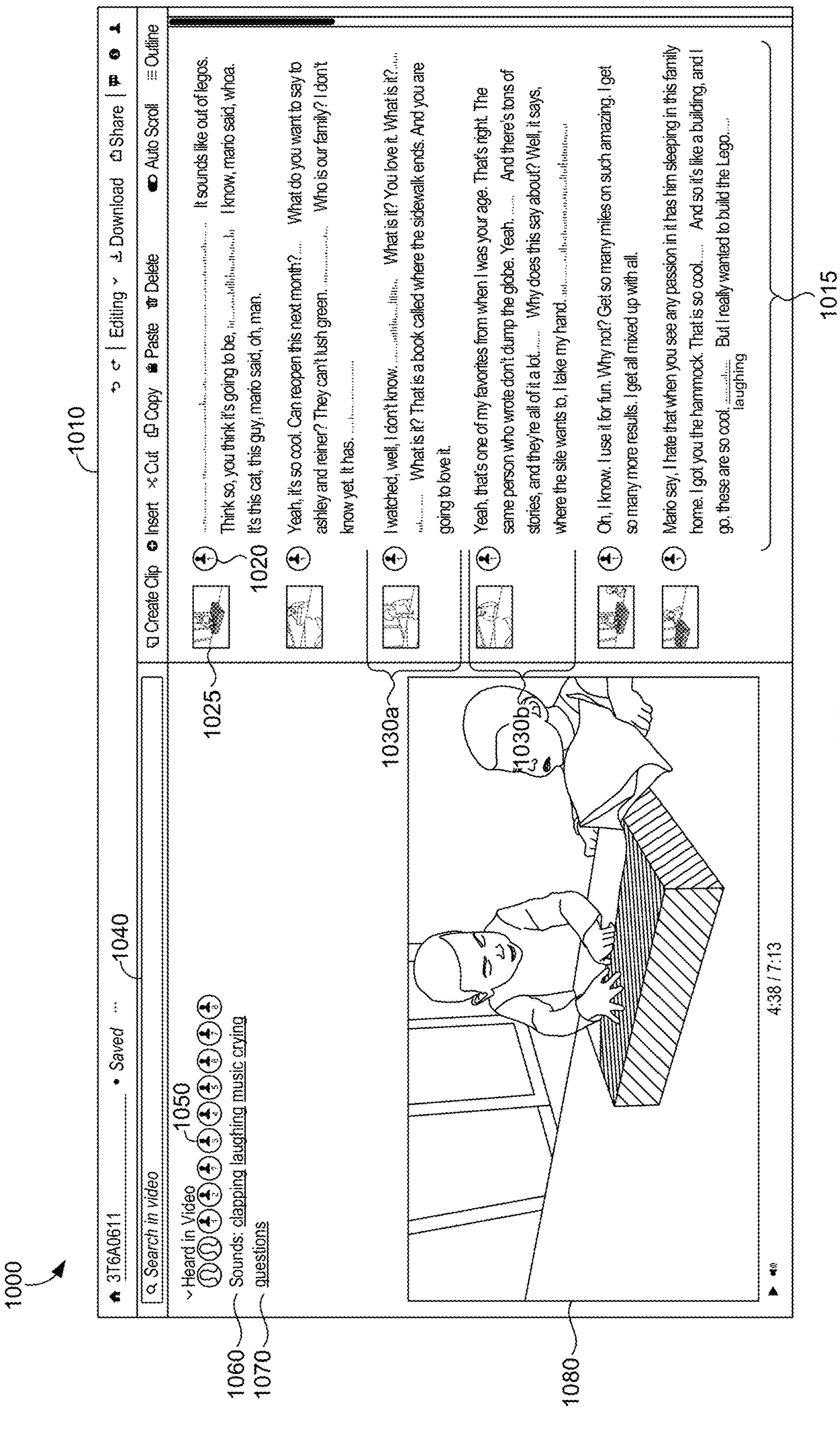
FIG. 10 illustrates an example video editing interface, in accordance with embodiments of the present invention.

In some embodiments, video selection interface 900 accepts a selection of one of the listed videos (e.g., via an interaction element such as check box 960), upon which the user selects New edit button 970 to create a new video editing project using the selected video and open the video in a video editing interface, such as the video editing interface 1000 of FIG. 10. In some embodiments, video selection interface 900 accepts a selection of multiple videos, upon which selection of New edit button 970 (or some other interaction element) serves to create a composite video combining the selected videos (and a composite transcript combining the transcripts of the selected videos), and opens up the composite video (and the composite transcript) in a new video editing project in a video editing interface (e.g., the video editing interface 1000 of FIG. 10). These are just meant as examples, and other ways of selecting one or more videos for editing are contemplated within the scope of the present disclosure.

FIG. 10 illustrates an example video editing interface 1000, in accordance with embodiments of the present invention. In this example, video editing interface 1000 includes transcript interface 1010 which presents a visualization of the loaded video's transcript, search bar 1040 which accept visual and/or text queries, and playback region 1080 which plays back the loaded video.

In FIG. 10, transcript interface 1010 presents a diarized transcript segmented into paragraphs (e.g., based on change in speaker, change in topic). Depending on the embodiment, transcript interface 1010 presents each paragraph of transcript text 1015 (e.g., paragraph 1030*a*, paragraph 1030*b*) with a representation of a visualization of the person speaking that paragraph (e.g., a representative speaker thumbnail for that speaker, such as speaker thumbnail 1020), and/or a visualization of one or more video thumbnails of the video segment corresponding to that paragraph (e.g., video thumbnail 1025). In some embodiments, transcript interface 1010 accepts input selecting some transcript text 1015 (e.g., clicking or tapping and dragging along the transcript), snaps the selected transcript text to word and/or sentence boundaries, and/or snaps a selection of a corresponding video segment to corresponding boundaries. As such, transcript interface 1010 uses a text-based selection to define a corresponding video segment. In some embodiments, transcript interface 1010 accepts input identifying a text-based command (e.g., cut, copy, paste), and in response, executes a corresponding video editing operation on the video segment, as described in more detail below with respect to FIG. 11. In some embodiments, transcript interface 1010 annotates transcript text with an indication of corresponding portions of the video where various features were detected, displays a visual representation of detected non-speech audio or pauses (e.g., as sound bars), and/or displays video thumbnails corresponding to each line of transcript text in a timeline view below each line of text in the transcript (e.g., as a thumbnail bar), as described in greater detail below with respect to FIGS. 11-13.

Depending on the implementation, transcript interface 1010 includes any combination of features. In some embodiments, an interaction element (e.g., associated with interaction with speaker thumbnail 1020) accepts input changing the speaker thumbnail associated with a particular speaker (e.g., selected from candidate cropped face images from a corresponding face track, an uploaded image), upon which, transcript interface 1010 updates each paragraph of the transcript spoken by that speaker to show the selected speaker thumbnail. In some embodiments, hovering a cursor over a particular paragraph in the transcript (or a portion thereof, such as hovering over transcript text) causes display of a preview of a corresponding portion of the video (e.g., by replacing video thumbnail 1025 with an animated preview of multiple frames from the portion of the video corresponding to that paragraph). In some embodiments, transcript interface 1010 auto-scrolls the transcript in sync with video playback in playback region 1080. Additionally or alternatively, transcript interface 1010 stops auto-scroll when the user scrolls the visualized transcript in transcript interface 1010 away from the portion being played back, and/or resumes auto-scroll when the user scrolls back to the portion being played back. In some embodiments (not illustrated in FIG. 10), transcript interface 1010 accepts input creating organizational headings within the transcript without editing the video and provides an outline view that navigates to corresponding parts of the transcript (and video) in response to input selecting (e.g. clicking or tapping on) a heading.

Continuing with the example illustrated in FIG. 10, video editing interface 1000 includes a search interface with search bar 1040 that accepts a textual query and performs a visual search for matching frame embeddings and/or a text search for matching words in the transcript or detected feature tags, as described in more detail below with respect to FIGS. 14-15. In some embodiments, the search interface visually represents the different detected speakers (e.g., speaker thumbnail 1050) with or as an associated interaction element that triggers a search for parts of the transcript spoken by a selected speaker. In some embodiments, the search interface visually represents detected feature classes, such as detected sound classes (e.g., sounds 1060), with or as an associated interaction element that triggers a search for parts of the transcript corresponding to parts of the audio track where a selected feature class was detected. In some embodiments, the search interface visually represents an option to perform a question search (e.g., question element 1070), selection of which triggers search and/or presentation of a representation of questions asked in the video and/or the transcript (e.g., questions of one or more designated classes), an example of which is described in more detail below with respect to FIG. 16.

Figure 11:
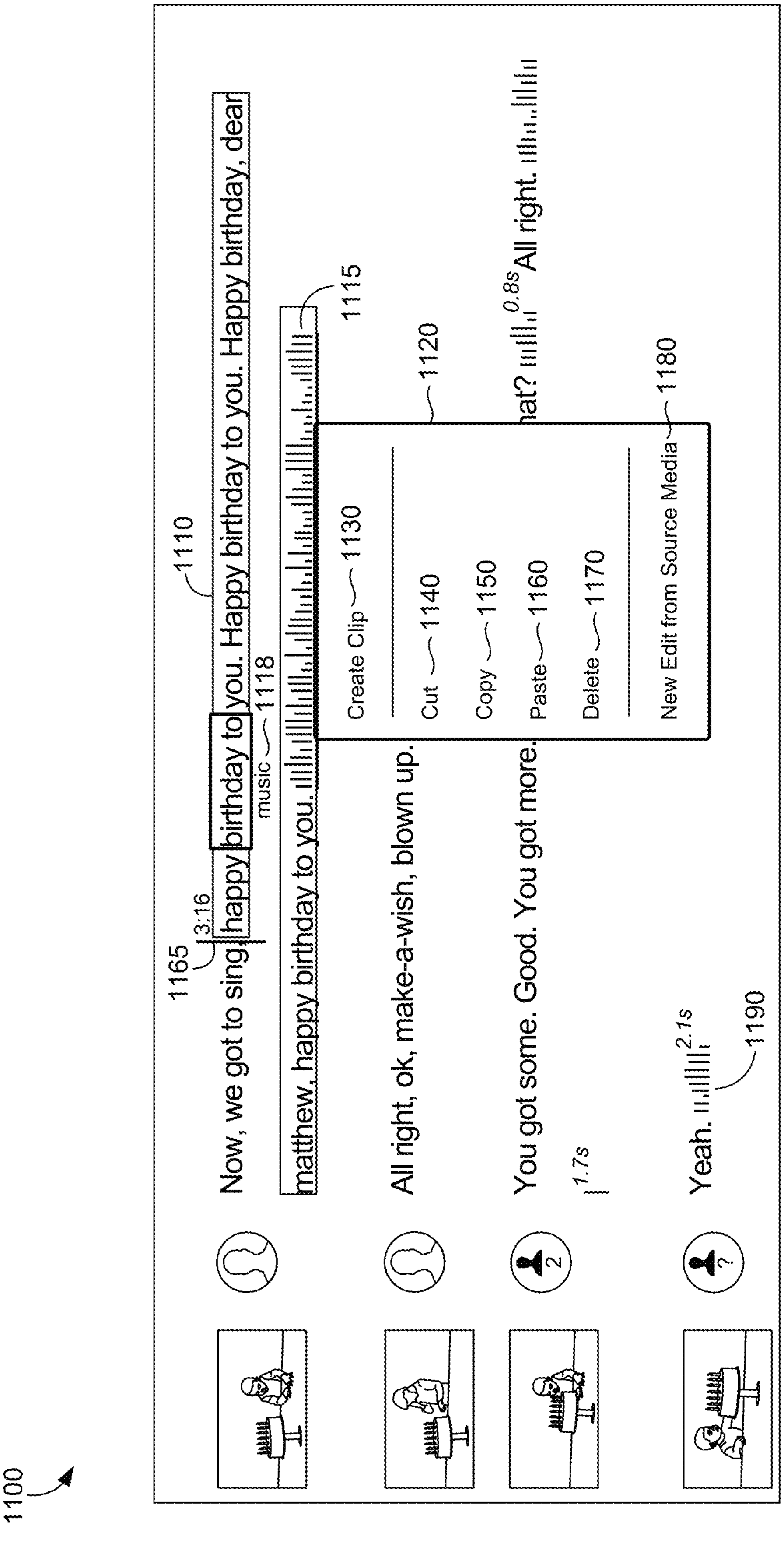
FIG. 11 illustrates an example transcript interface for text-based video editing, in accordance with embodiments of the present invention.

FIG. 11 illustrates an example transcript interface 1100 for text-based video editing, in accordance with embodiments of the present invention. In this example, transcript interface 1100 presents a portion of a diarized transcript segmented into paragraphs, with each paragraph including corresponding transcript text, a speaker thumbnail for the detected speaker for that paragraph, and a video thumbnail from the video segment corresponding to that paragraph.

FIG. 11 illustrates an example technique for selecting transcript text to identify a corresponding video segment, and executing a video editing operation based on a text-based command received through interaction with the selected transcript text. More specifically, FIG. 11 illustrates selection 1110 of a portion of the transcript (e.g., made by clicking or tapping and dragging along the transcript). In some embodiments, transcript interface 1100 snaps selection 1110 to corresponding word and/or sentence boundaries and/or snaps a selection of a corresponding video segment to boundaries that correspond to the beginning of the first word/sentence and the end of the last word/sentence of selection 1110.

In some embodiments, upon receiving selection 1110 (and/or some subsequent input such as a right click on selection 1110), transcript interface 1100 displays a menu 1120 of options that include video editing operations. For example, create clip option 1130 takes the selected portion of the transcript, splits the corresponding video segment (e.g., including a corresponding portion of the audio and video tracks) from the loaded video project into a separate video clip, and/or adds the video clip to the user's media library. Cut option 1140 removes the corresponding video segment from the loaded video project and places it in the clipboard. Copy option 1150 leaves corresponding video segment in the loaded video project and places it in the clipboard. Paste option 1160 pastes a previously copied video segment into a location of the loaded video project corresponding to position cursor 1165 in the transcript (and/or pastes over the video segment correspond to selection 1110). Note that position cursor 1165 is displayed with a timestamp of the corresponding position of the video. Delete option 1170 deletes the corresponding video segment from the loaded video project (e.g., removing a corresponding portion of the video track, audio track, and rescript). New edit from source media option 1180 opens up a new video project with the video segment corresponding to selection 1110.

As such, transcript interface 1100 provides an example text-based video editing interface in which selected transcript text is used to identify a corresponding video segment and editing commands received through interactions with transcript text are interpreted as instructions to perform a corresponding edit on the corresponding video segment.

Note that FIG. 11 also illustrates an example in which the transcript visualizes detected music and/or sound as an audio waveform in the corresponding region of the transcript where the music and/or sound was detected. For example, soundbar 1190 illustrates a detected pause in speech in line with the transcript text, helping the user to visualize non-speech within the transcript and determine where to place a selection boundary (e.g., before or after soundbar 1190). In the example illustrated in FIG. 11, selection 1110 includes the portion of the transcript represented by soundbar 1090 (e.g., detected music). In some embodiments, the transcript is annotated to indicate detected features in regions of the transcript corresponding to portions of the video/audio where the features where detected. For example, music tag 1118 and the underlined transcript text above it indicates that the underlined text corresponds to a region of the audio track where music was detected. This particular tag is just meant as an example, as various embodiments annotate portions of the transcript to indicate location and/or class any type of detected feature (e.g., linguistic features, speakers, faces, audio classifications, visually similar scenes, visual artifacts, video objects or actions, audio events).

Figure 12:
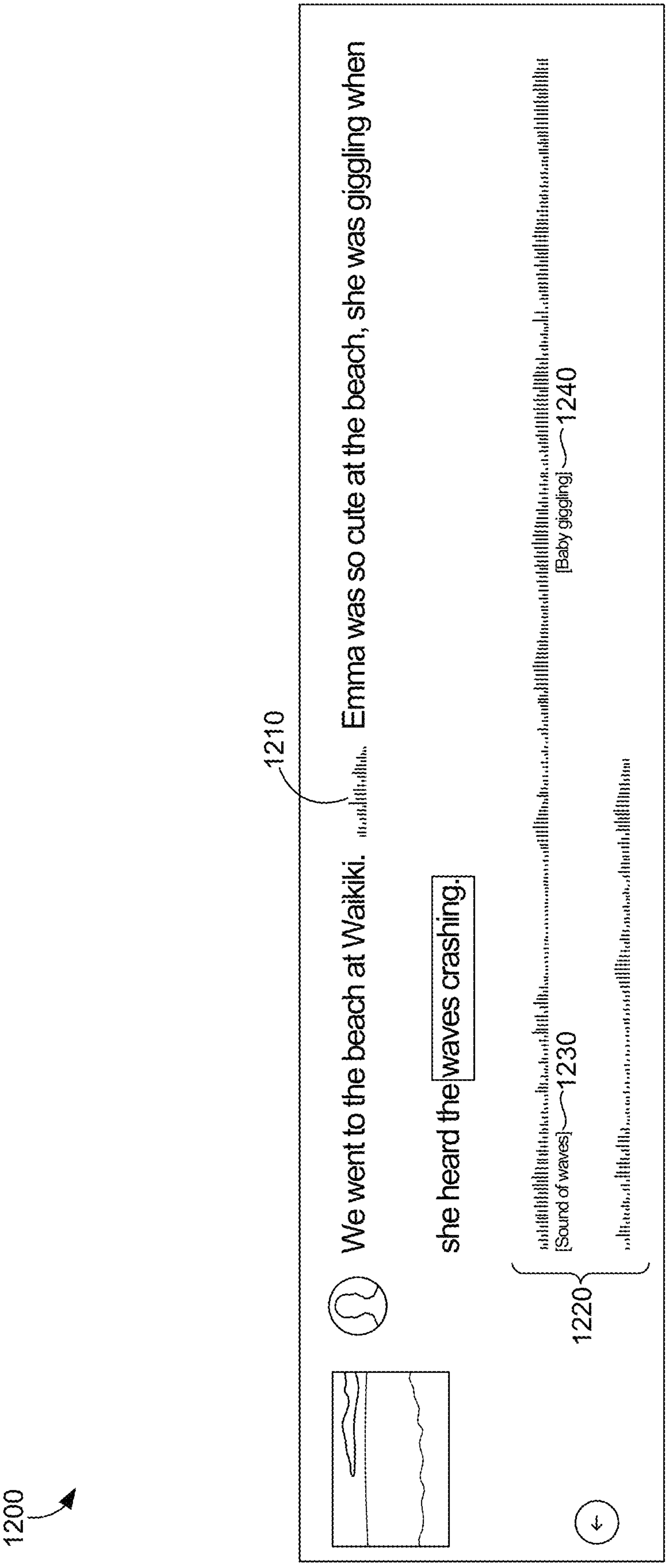
FIG. 12 illustrates an example transcript interface that visualizes non-speech audio, in accordance with embodiments of the present invention.

FIG. 12 illustrates an example transcript interface 1200 that visualizes non-speech audio, in accordance with embodiments of the present invention. In this example, transcript interface 1200 presents a portion of a diarized transcript (e.g., a segmented paragraph). In this example, the transcript visualizes detected music and/or sound as an audio waveform in the corresponding region of the transcript where the music and/or sound was detected. For example, soundbar 1210 illustrates a detected pause in speech in line with the transcript text, and soundbar 1220 illustrates a region of detected sounds in a portion of the loaded video/audio that follows the previous line of transcript text. Furthermore, soundbar 1220 is annotated with tags 1230 and 1240 to indicate the portions of soundbar 1220 that correspond to a detected sound of waves and a detected baby giggling, respectively.

Figure 13:
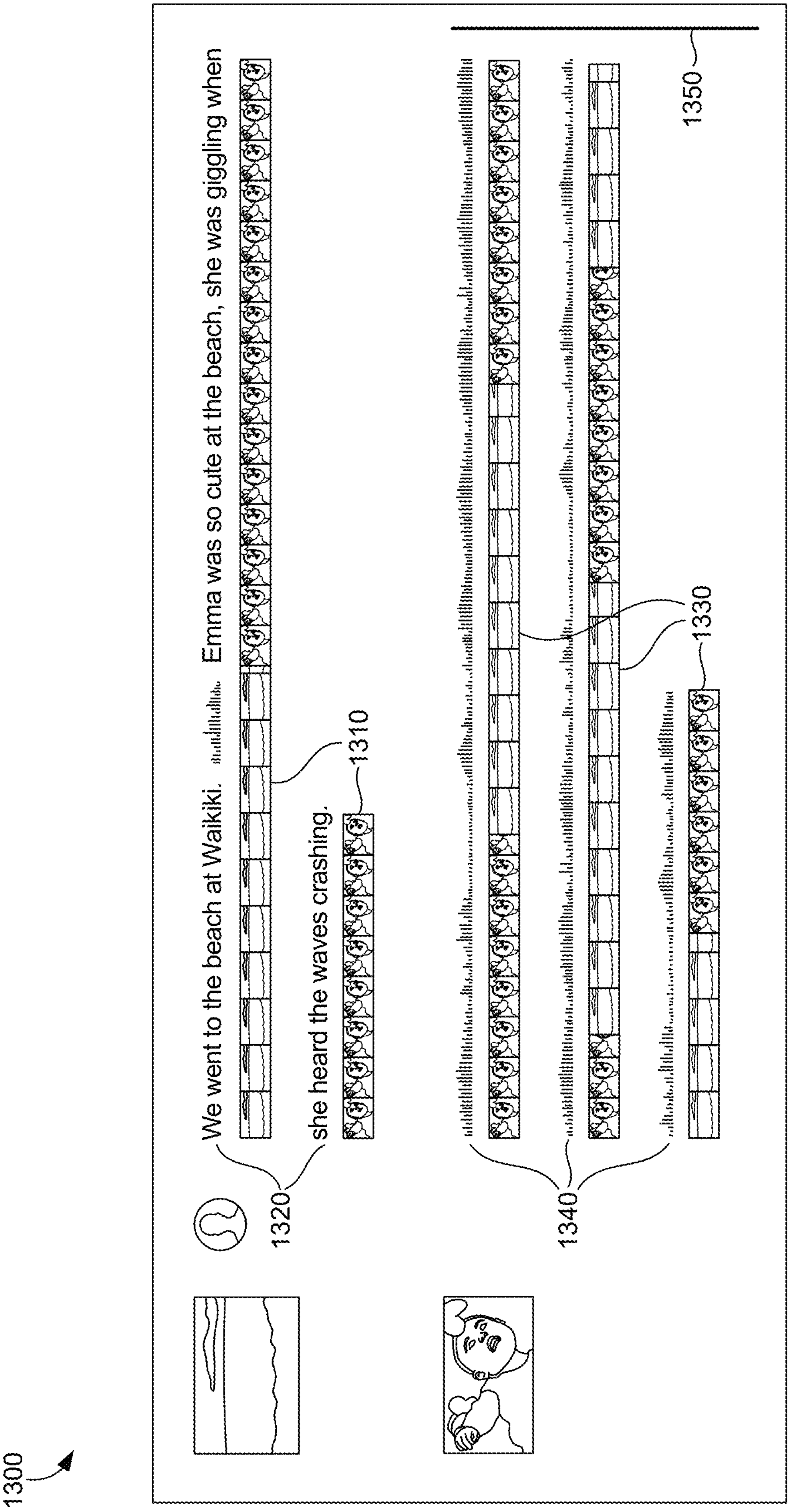
FIG. 13 illustrates an example transcript interface that includes thumbnail bars, in accordance with embodiments of the present invention.

FIG. 13 illustrates an example transcript interface 1300 that includes thumbnail bars, in accordance with embodiments of the present invention. In this example, transcript interface 1300 visualizes the portion of the diarized transcript (e.g., a segmented paragraph) illustrated in FIG. 12 in a different way. More specifically, transcript interface 1300 includes thumbnail bars 1310 interspersed between corresponding lines of transcript text 1015. In this example, thumbnail bars 1310 represent video thumbnails corresponding to each line of transcript text in a timeline view below each line of text in the transcript. In some embodiments, transcript interface 1300 illustrates non-speech sections with corresponding soundbars that visually represent corresponding non-speech portions of the audio track, and/or illustrates corresponding thumbnail bars that visually represent corresponding portions of the video track, respectively. For example, non-speech section 1350 includes thumbnail bars 1330 interspersed between corresponding soundbars 1340, helping the user to visualize non-speech section 1350 in the transcript.

In some embodiments, transcript text (e.g., transcript text 1320), thumbnail bars (e.g., thumbnail bars 1310, 1330), and/or soundbars (e.g., soundbars 1340) are selectable such that transcript interface 1300 accepts input selecting a segment of transcript text, a segment of one or more soundbars, and/or a segment of one or more thumbnail bars in the transcript (e.g., based on input clicking or tapping and dragging along one or more rows of transcript text, soundbars, and/or thumbnail bars), which serves to serves to identify a corresponding video segment with boundaries that correspond to the selection.

Figure 14:
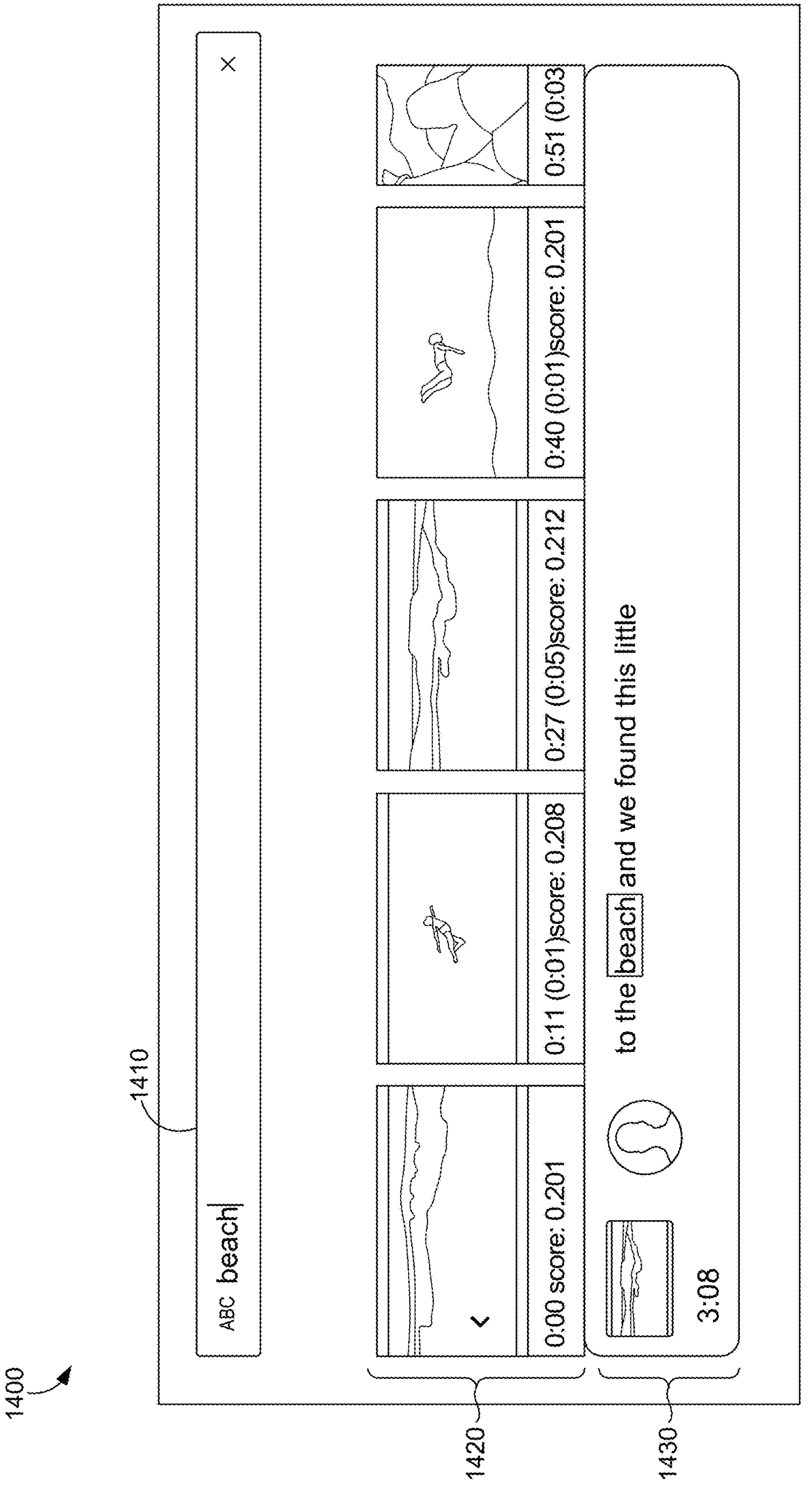
FIG. 14 illustrates an example search interface for visual and text search of video content, in accordance with embodiments of the present invention.

FIG. 14 illustrates an example search interface 1400 for visual and text search of video content, in accordance with embodiments of the present invention. Search interface 1400 includes search bar 1410 that accepts a freeform query, triggers a visual search for frames of a loaded video that match the freeform query (e.g., frame embeddings that match a corresponding embedding of the freeform query), and triggers a text search for matching words from a corresponding transcript or from tags of detected features from the loaded video. FIG. 14 illustrate s an example search for "beach," which returned visual search results 1420 and transcript search result 1430. In this example, visual search results 1420 are presented in a row of search result tiles, where each tile shows a representative video thumbnail (e.g., the matching video frame), the time in the video, and a match score for the matching video frame. Further, transcript search result 1430 is presented below the row of visual search results 1420, where the transcript search result 1430 is presented as a search result tile with matching transcript text (e.g., highlighted, with adjacent transcript text for context), a speaker thumbnail for the speaker who spoke the matching transcript text, and a representative video thumbnail from the corresponding matching video segment. In an example implementation, clicking on one of the search result tiles navigates the transcript (and/or video playback) to a corresponding part of the transcript (and/or video), enabling quick navigation to portions of the transcript of interest, facilitating quick and intuitive text-based video edits.

Figure 15:
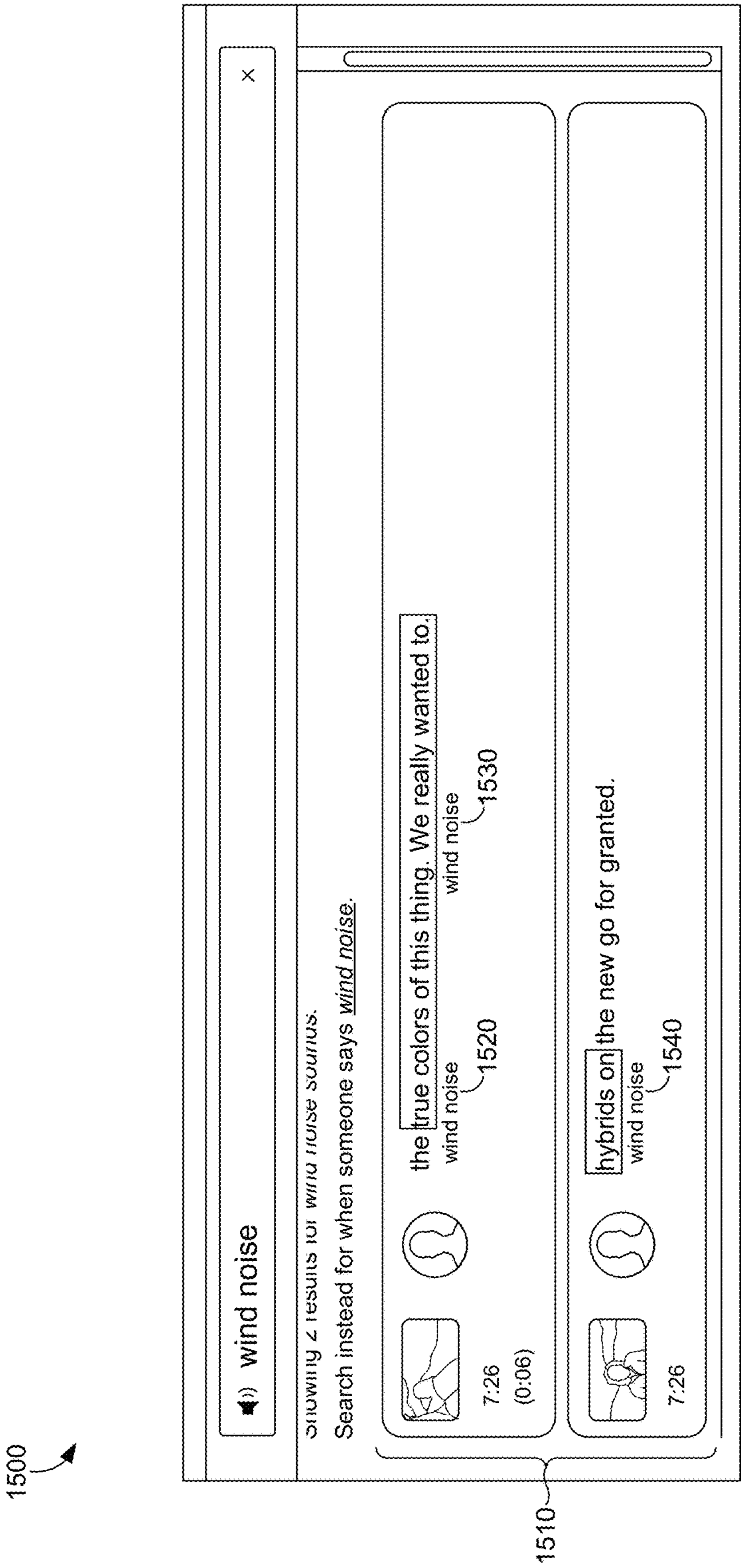
FIG. 15 illustrates an example search interface that annotates transcript text in search results, in accordance with embodiments of the present invention.

FIG. 15 illustrates an example search interface 1500 that annotates transcript text in search results, in accordance with embodiments of the present invention. Search interface 1500 illustrates a way of visualizing detected feature tags that match a textual query by annotating transcript text with an indication of the corresponding region of the video where the matching detected feature was detected. In FIG. 15, search interface 1500 illustrates a search for "wind noise," which matched audio tags extracted from the audio track. More specifically, the loaded video includes an audio track with segments where wind was detected using an audio classifier. As a result, search result tiles 1510 represent corresponding matching video segments with a visual representation of corresponding transcript text annotated (e.g., stylized such as via underling, with labeled with text of the matching tags 1520, 1530, 1540 displayed below the corresponding transcript text), a speaker thumbnail for the speaker who spoke the corresponding transcript text, and a representative video thumbnail from the corresponding matching video segment. Notice here how the query "wind noise" did not match the transcript text itself, but nevertheless returned the transcript text corresponding to the location in the video where wind was detected. Additionally or alternatively to annotating corresponding transcript text in search results, some embodiments annotate corresponding transcript text in the transcript interface.

Figure 16:
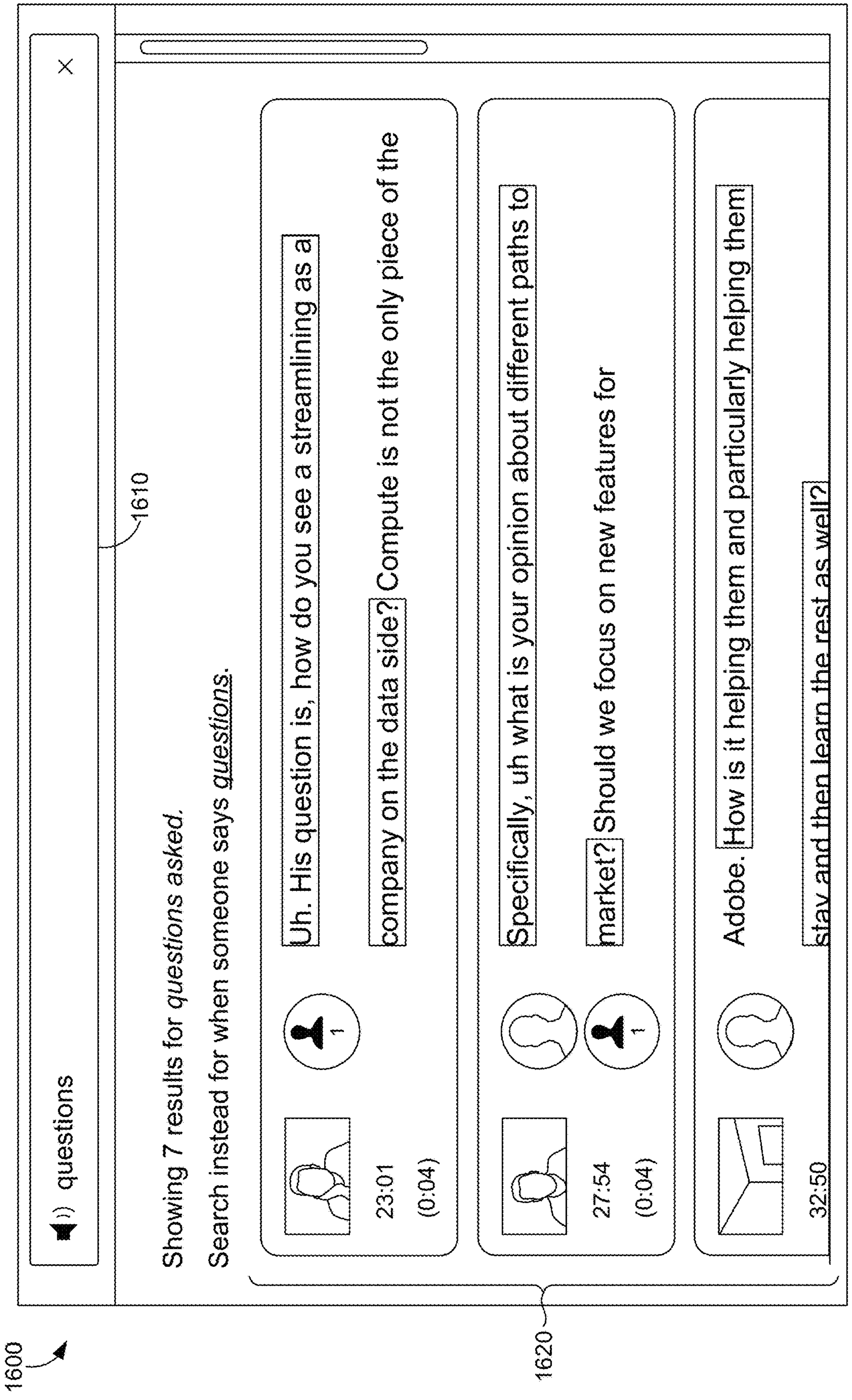
FIG. 16 illustrates an example search interface for questions in a video, in accordance with embodiments of the present invention.

In some embodiments, a question search is triggered using an interaction element, such as a "questions" link or button. Additionally or alternatively, a question search is triggered by entering in a query for the word "question" or "questions." FIG. 16 illustrates an example search interface 1600 for questions in a video, in accordance with embodiments of the present invention. In this example, a user enters the word "questions" in search bar 1610, which searches for or retrieves a representation of questions in the video and presents search result tiles 1620 representing video segments with detected questions. In this example, search result tiles 1620 represent corresponding matching video segments with a visual representation of corresponding transcript text (e.g., the matching question) annotated (e.g., stylized such as by highlighting), a speaker thumbnail for the speaker who spoke the corresponding transcript text, and a representative video thumbnail from the corresponding matching video segment. In an example implementation, clicking on one of the search result tiles navigates the transcript (and/or video playback) to a corresponding part of the transcript (and/or video). As such, a user can easily search for questions in a video, and navigate to corresponding portions of the transcript.

Example Flow Diagrams

With reference now to FIGS. 17-31, flow diagrams are provided illustrating various methods. Each block of the methods 1700-3100 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provide d by a standalone application, a service or hosted service (standalone or in combination with another hosted service), or a plug-in to another product, to name a few.

Figure 17:
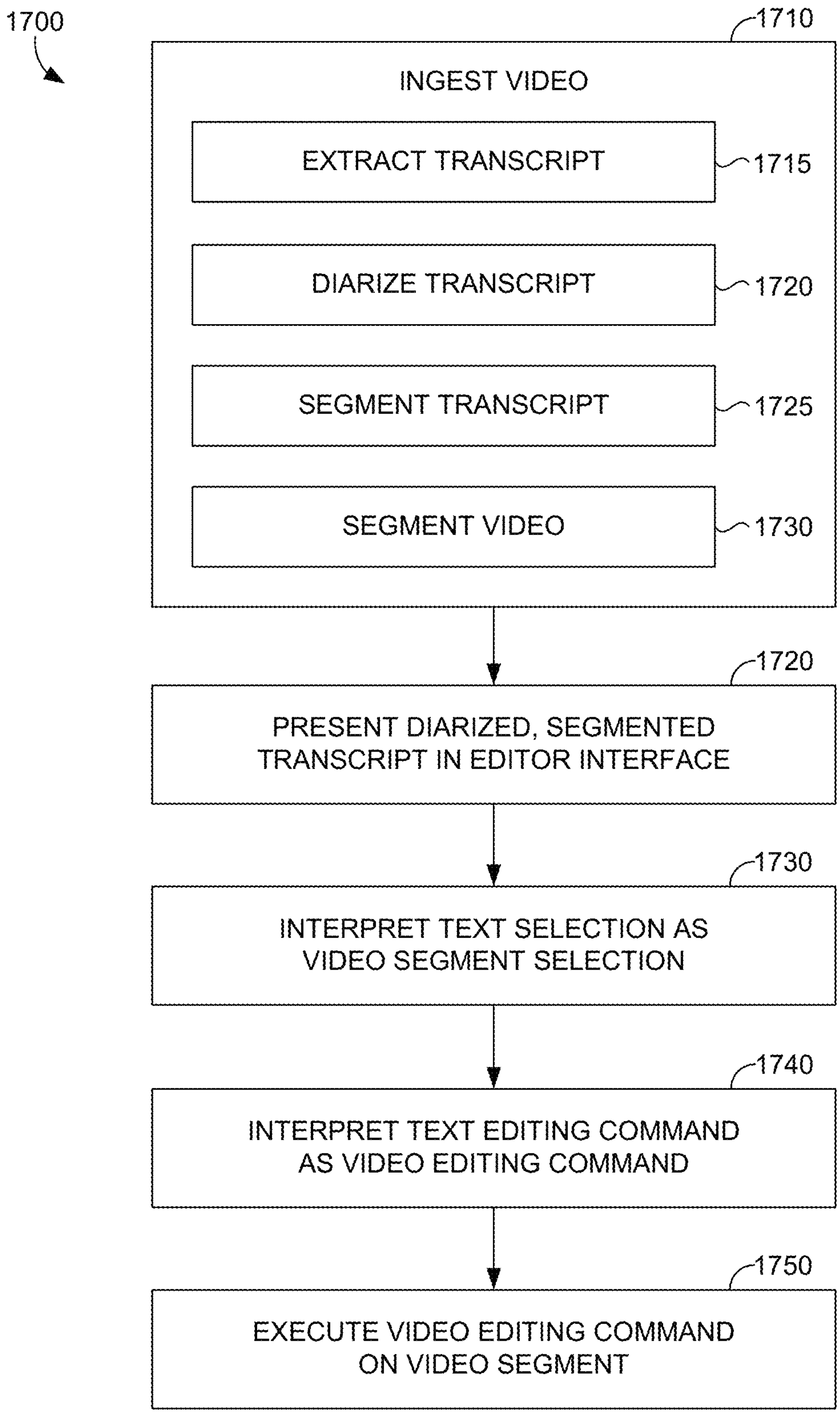
FIG. 17 is a flow diagram showing a method for text-based video editing, in accordance with embodiments of the present invention.

FIG. 17 is a flow diagram showing a method 1700 for text-based video editing, in accordance with embodiments of the present invention. Initially at block 1710, a video is ingested. Blocks 1715-1730 describe an example video ingestion process. At block 1715, a transcript of the video is extracted from an audio track of the video (e.g., using any known technique) to identify sentences, words, and timestamps representing when in the video each word is spoken. At block 1720, the transcript is diarized (e.g., by diarization component 164 of FIG. 1). At block 1725, the transcript is segmented (e.g., by transcript segmentation component 170 of FIG. 1). At block 1730, the video is segmented (e.g., video segmentation component 180 of FIG. 1).

At block 1740, the diarized, segmented transcript is presented in an editor interface (e.g., controlled by video editing tool 115 of FIG. 1). At block 1750, a text selection of transcript text displayed in the editor interface is interpreted as a video segment selection. In an example embodiment, the text selection serves to identify a video segment that has a start boundary corresponding to the beginning of the first word in the selected transcript text (or a start boundary corresponding to the end of the word immediately preceding a selected soundbar at the beginning of the transcript selection) and a stop boundary corresponding to the end of the last word in the selected transcript text (or a stop boundary corresponding to the beginning of the next word immediately following a selected soundbar at the end of the transcript selection). The start and stop boundaries for the video segment are selected from candidate boundaries stored or otherwise identified by a video segmentation generated in block 1730. As such, at block 1760, a text editing command (e.g., cut, copy, paste) is interpreted as a video editing command, and at block 1770, the video editing command is executed on the video segment.

Figure 18:
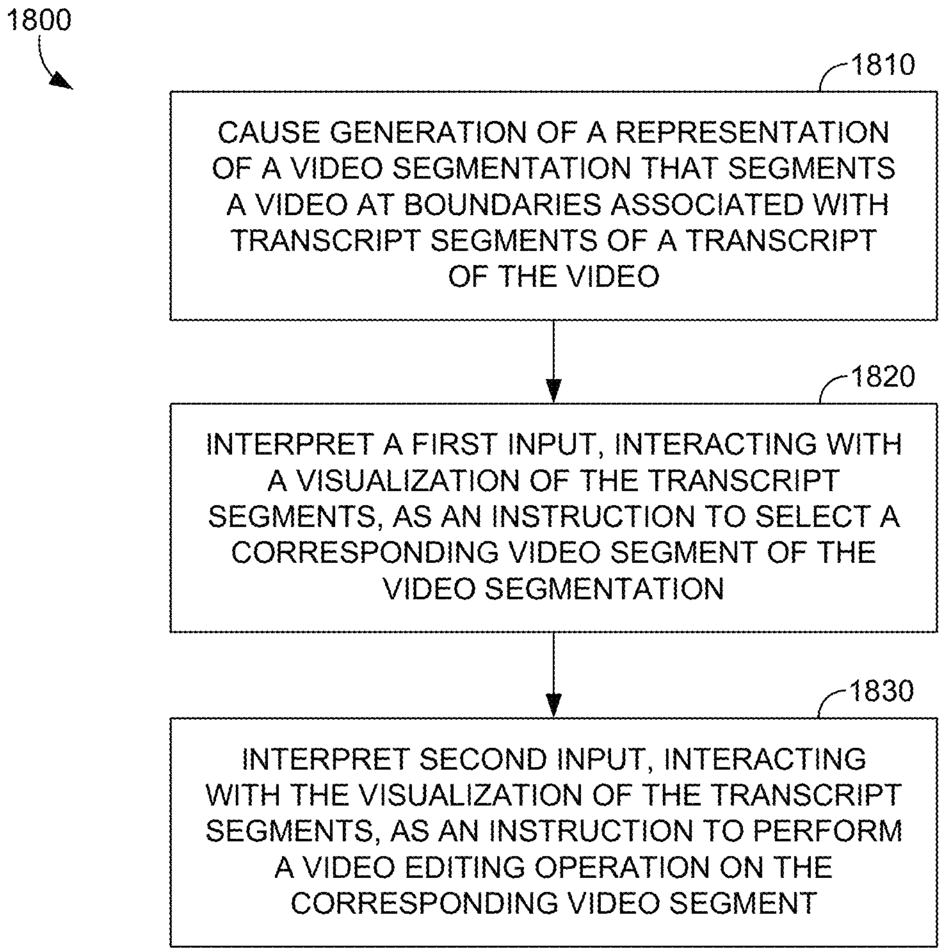
FIG. 18 is a flow diagram showing a method for video segmentation and video segment selection and editing, in accordance with embodiments of the present invention.

FIG. 18 is a flow diagram showing a method 1800 for video segmentation and video segment selection and editing, in accordance with embodiments of the present invention. At block 1810, generation is caused of a representation of a video segmentation that segments a video at boundaries associated with transcript segments of a transcript of the video. At block 1820, a first input interacting with a visualization of the transcript segments is interpreted as an instruction to select a corresponding video segment of the video segmentation. At block 1830, a second input interacting with the visualization of the transcript segments is interpreted as an instruction to perform a video editing operation on the corresponding video segment.

Figure 19:
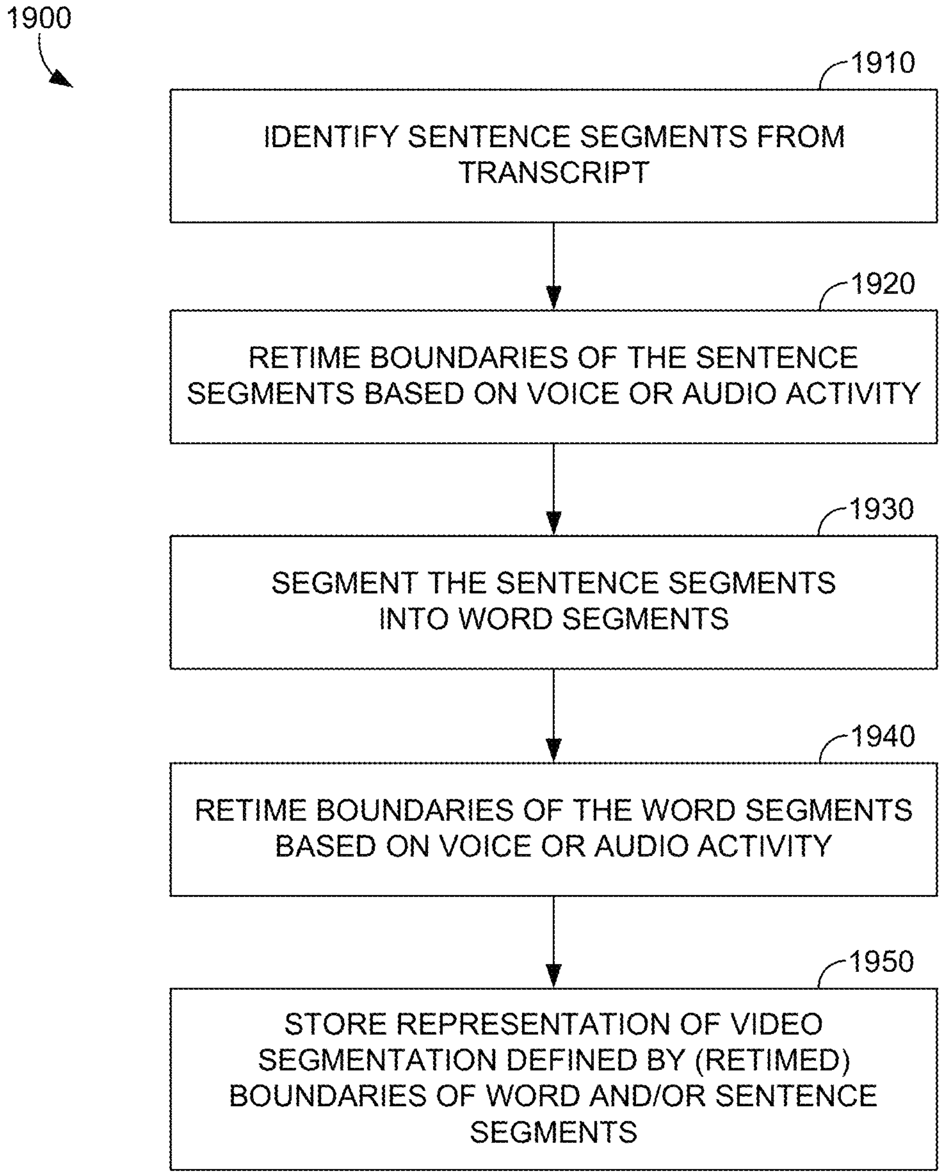
FIG. 19 is a flow diagram showing a method for video segmentation based on word and/or sentence segments, in accordance with embodiments of the present invention.

FIG. 19 is a flow diagram showing a method 1900 for video segmentation based on word and/or sentence segments, in accordance with embodiments of the present invention. Method 1900 is an example of a possible way to perform at least a portion of block 1730 of method 1700 or block 1810 of method 1800. Initially at block 1910, sentence segments are identified from a transcript. In an example implementation, a transcript is generated from an audio track (e.g., of a video) to identify sentences, words, punctuation, and timestamps representing when in the audio track each word is spoken, and sentence segments are identified using sentence markers and/or punctuation to extract sentence text and using timestamps to associate the extracted segment of text with corresponding times in the audio track. At block 1920, certain boundaries of the sentence segments are retimed based on voice or audio activity. In an example implementation, if there are any gaps in time between sentence segments or there are other extracted non-speech segments (e.g., longer than a designated duration), voice or audio activity in the audio track is evaluated to identify a location, within a search neighborhood of each boundary adjacent to a gap, where voice or audio activity is a minimum (e.g., only expanding into a gap, not shrinking sentence segments).

At block 1930, the sentence segments are segmented into word segments (e.g., using extracted word segments, timestamps, etc.). At block 1940, certain boundaries of the word segments are retimed based on voice or audio activity. In an example implementation, if there are any gaps in time between word segments or there are other extracted non-speech segments within the sentence segment (e.g., longer than a designated duration), voice or audio activity in the audio track is evaluated to identify a location, within a search neighborhood of each boundary that is adjacent to a gap, where voice or audio activity is a minimum (e.g., only expanding, not shrinking word segments). At block 1950, a representation of video (or audio) segmentation defined by (retimed) boundaries of word and/or sentence segments is stored for later use (e.g., selecting and editing corresponding video/audio segments).

Figure 20:
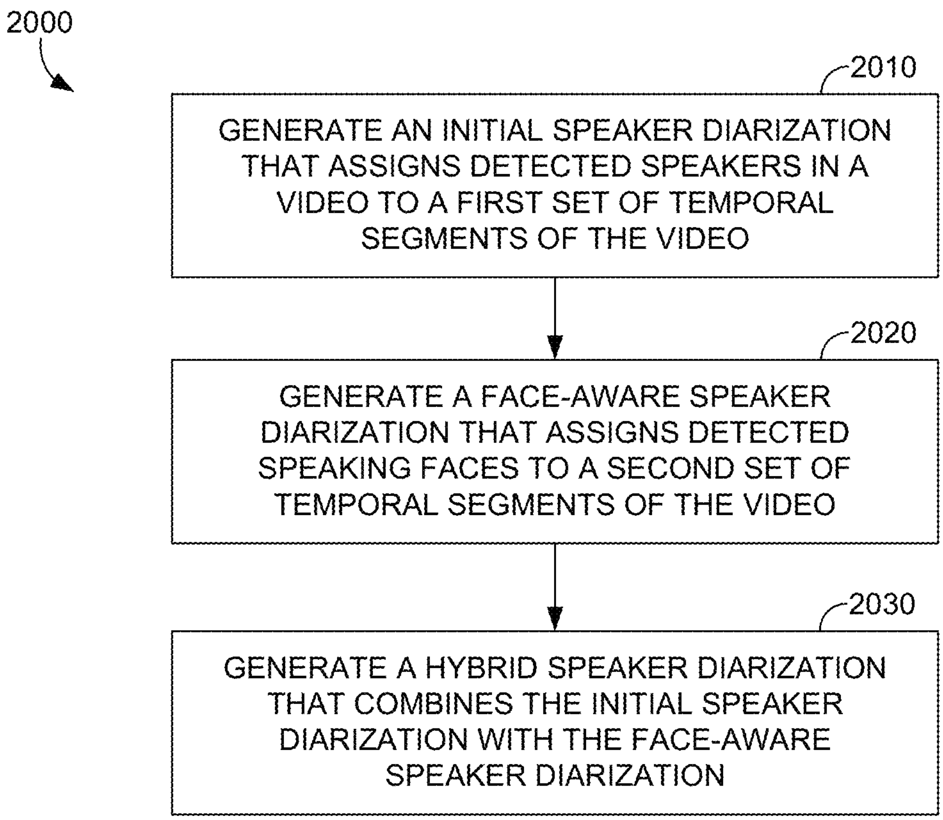
FIG. 20 is a flow diagram showing a method for face-aware speaker diarization, in accordance with embodiments of the present invention.

FIG. 20 is a flow diagram showing a method 2000 for face-aware speaker diarization, in accordance with embodiments of the present invention. Method 2000 is an example of a possible way to perform at least a portion of block 1720 of method 1700. At block 2010, an initial speaker diarization is generated that assigns detected speakers in a video to a first set of temporal segments of the video. In an example implementation, the initial speaker diarization is generated using any known audio-only diarization technique that evaluates an audio track without considering visual data from a video track. At block 2020, a face-aware speaker diarization is generated that assigns detected speaking faces to a second set of temporal segments of the video. An example way to perform at least a portion of block 2020 is described below in blocks 2120-2140 of FIG. 1. At block 2030, a hybrid speaker diarization is generated that combines the initial speaker diarization with the face-aware speaker diarization. An example way to perform at least a portion of block 2030 is described above with respect to FIG. 4.

Figure 21:
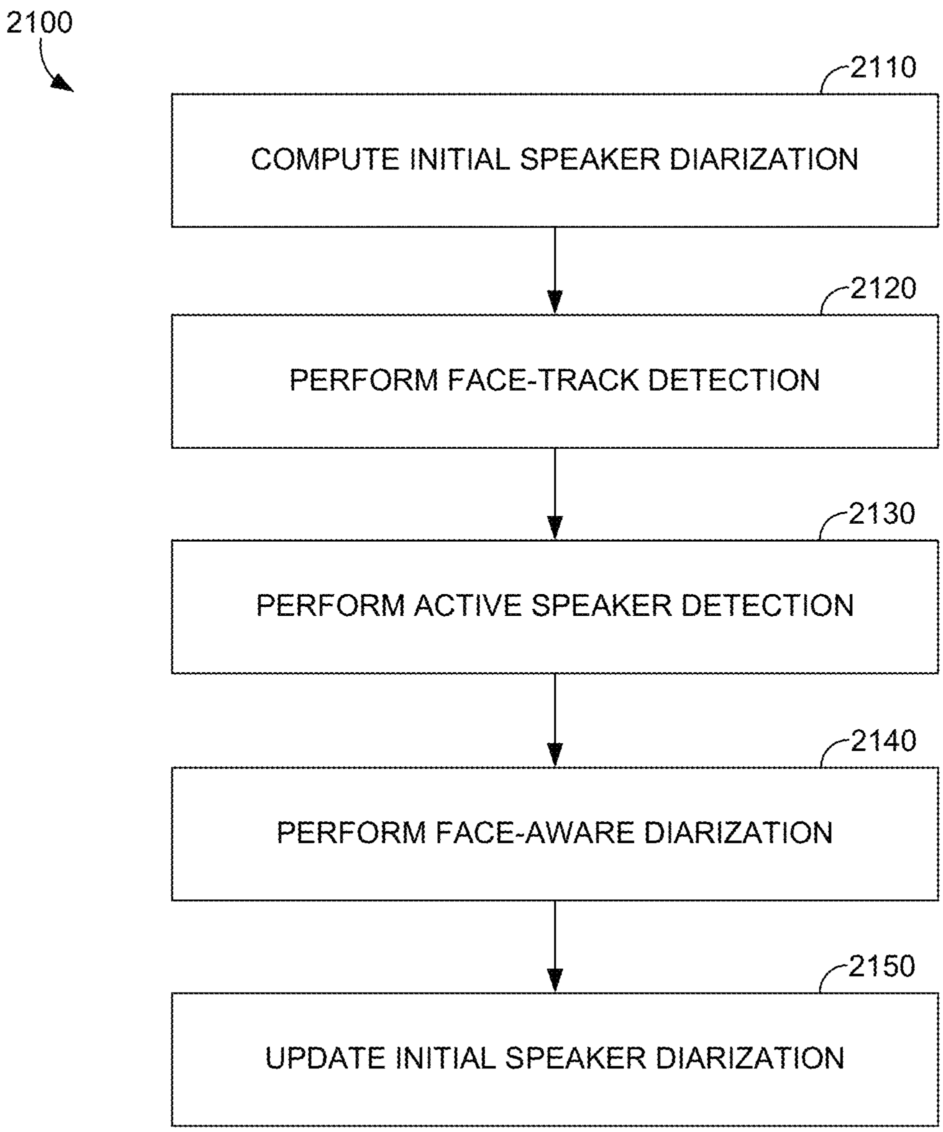
FIG. 21 is a flow diagram showing a method for updating an initial speaker diarization based on a face-aware speaker diarization, in accordance with embodiments of the present invention.

FIG. 21 is a flow diagram showing a method 2100 for updating an initial speaker diarization based on a face-aware speaker diarization, in accordance with embodiments of the present invention. Method 2100 is an example of a possible way to perform at least a portion of block 1720 of method 1700. At block 2110, an initial speaker diarization is computed. In an example implementation, the initial speaker diarization is generated using any known audio-only diarization technique that evaluates an audio track without considering visual data from a video track.

At block 2120, face-track detection is performed using any known technique to detect faces, track them over time, and cluster them into person/face identities (e.g., face ID). At block 2130, active speaker detection is performed. In an example implementation, one or more machine learning models (e.g., active speaker detection model 200 of FIG. 2, a model selected based on the size of input image(s) fed into the model) are used to predict and assign an active speaking score (e.g., [0-1]) that quantifies a likelihood that each face track is the one speaking during a corresponding window of audio, as described in more detail above with respect to face-aware speaker diarization component 166 of FIG. 1. In an example implementation, for each face appearing in one or more video frames, cropped images of the face from a sequence of consecutive video frames (e.g., 15) and a corresponding window of audio are fed into an active speaker detection model to generate an active speaking score for each sequence of consecutive frames in which the face appears.

At block 2140, face-aware diarization is performed. In example implementation, the face (e.g., the face identify) that has the highest predicted active speaking score for any given frame or sequence of frames (e.g., above a threshold, such as 0.9 for images that are larger than a designated size and 0.5 for images that are smaller than a designated size) is taken as the active speaker. In some embodiments, audio samples of the audio track are encoded into audio embeddings and clustered, and face IDs from the detected face tracks are assigned to clusters that include one or more audio embeddings (or a threshold number or percentage of audio embeddings in the cluster) that have predicted active speaker scores for a particular face ID above a designated threshold. In some embodiments, each remaining unlabeled cluster of audio embeddings is assigned a unique face ID.

At block 2150, the initial speaker diarization is updated using the face-aware diarization resulting from block 2140. An example way to perform at least a portion of block 2150 is described above with respect to FIG. 4.

Figure 22:
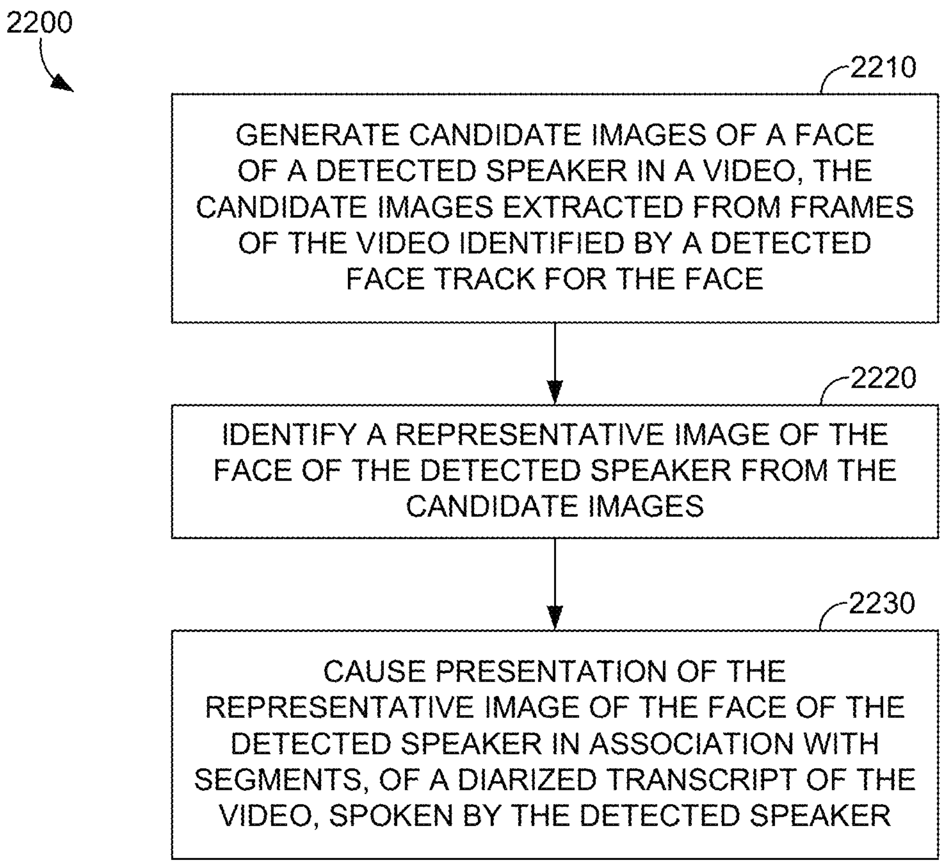
FIG. 22 is a flow diagram showing a method for identifying a representative image of a face of a detected speaker, in accordance with embodiments of the present invention.

FIG. 22 is a flow diagram showing a method 2200 for identifying a representative image of a face of a detected speaker, in accordance with embodiments of the present invention. At block 2210, candidate images of a face of a detected speaker in a video are generated. The candidate images are extracted from frames of the video identified by a detected face track for the face. At block 2220, a representative image of the face of the detected speaker from the candidate images is identified. An example way to perform at least a portion of block 2220 is described in greater detail below with respect to blocks 2330-2380 of FIG. 23. At block 2230, presentation is caused of the representative image of the face of the detected speaker in association with segments, of a diarized transcript of the video, spoken by the detected speaker.

Figure 23:
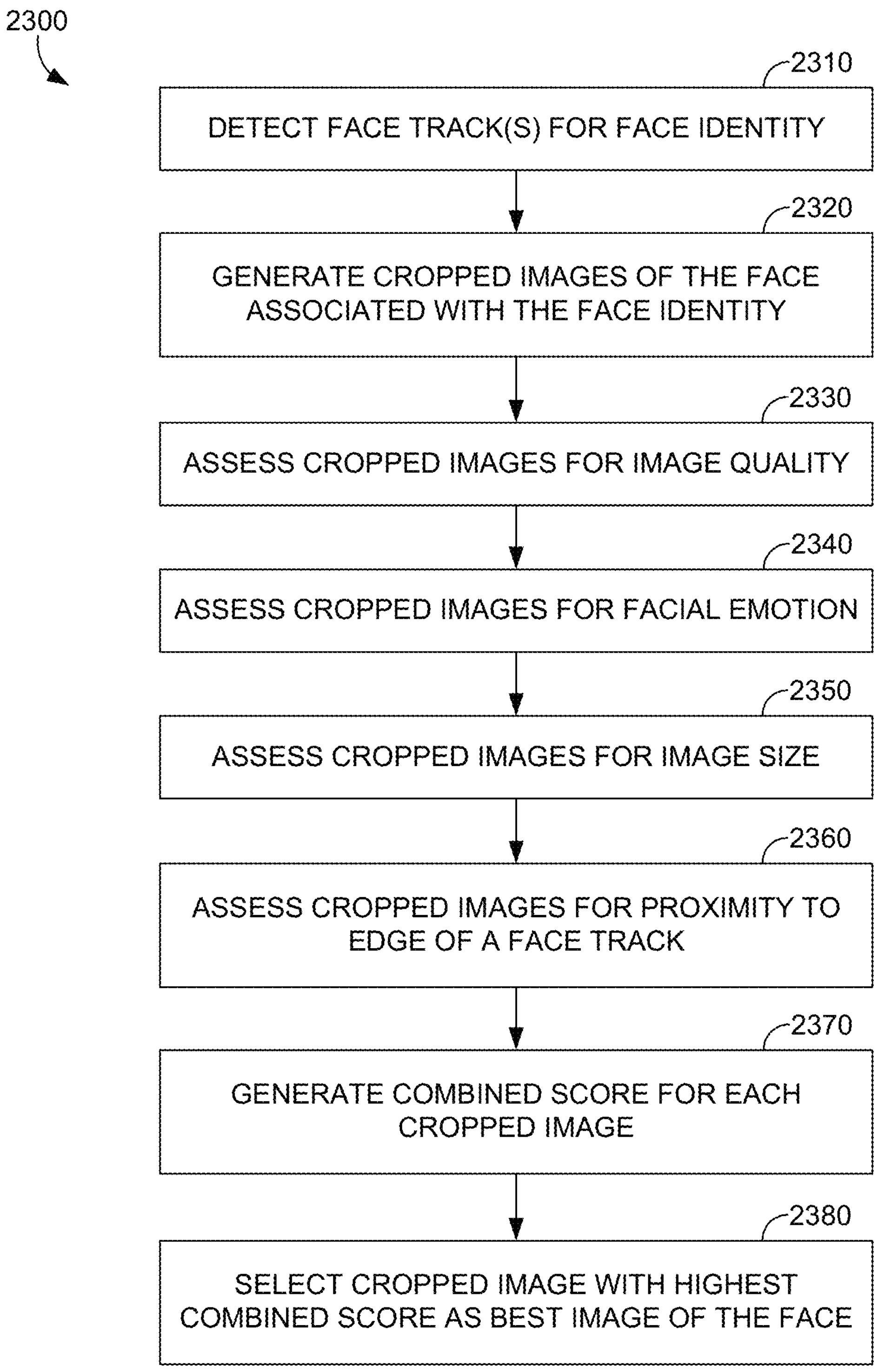
FIG. 23 is a flow diagram showing a method for identifying the best image of a face, in accordance with embodiments of the present invention.

FIG. 23 is a flow diagram showing a method 2300 for identifying the best image of a face, in accordance with embodiments of the present invention. At block 2310, face track(s) are detected for a particular face identity (e.g., using any known technique). At block 2320, cropped images of the face associated with the face identity are generated (e.g., by cropping out the face from a corresponding location of each frame identified by a corresponding face track). At block 2330, the cropped images are assessed for image quality (e.g., using any known technique). At block 2340, the cropped images are assessed for facial emotion (e.g., by applying an emotion classifier to quantify a measure of a designated emotion, such as happiness). At block 2350, the cropped images are assessed for image size (e.g., computing a size factor that rewards larger images of faces). At block 2360, the cropped images are assessed for proximity to an edge of a face track (e.g., computing an edge factor that penalizes images that were extracted from frames that appear towards the beginning or end of a face track). At block 2370, a combined score is generated for each cropped image. At block 2380, the cropped image with the highest combined score is selected as the best image of the face.

Figure 24:
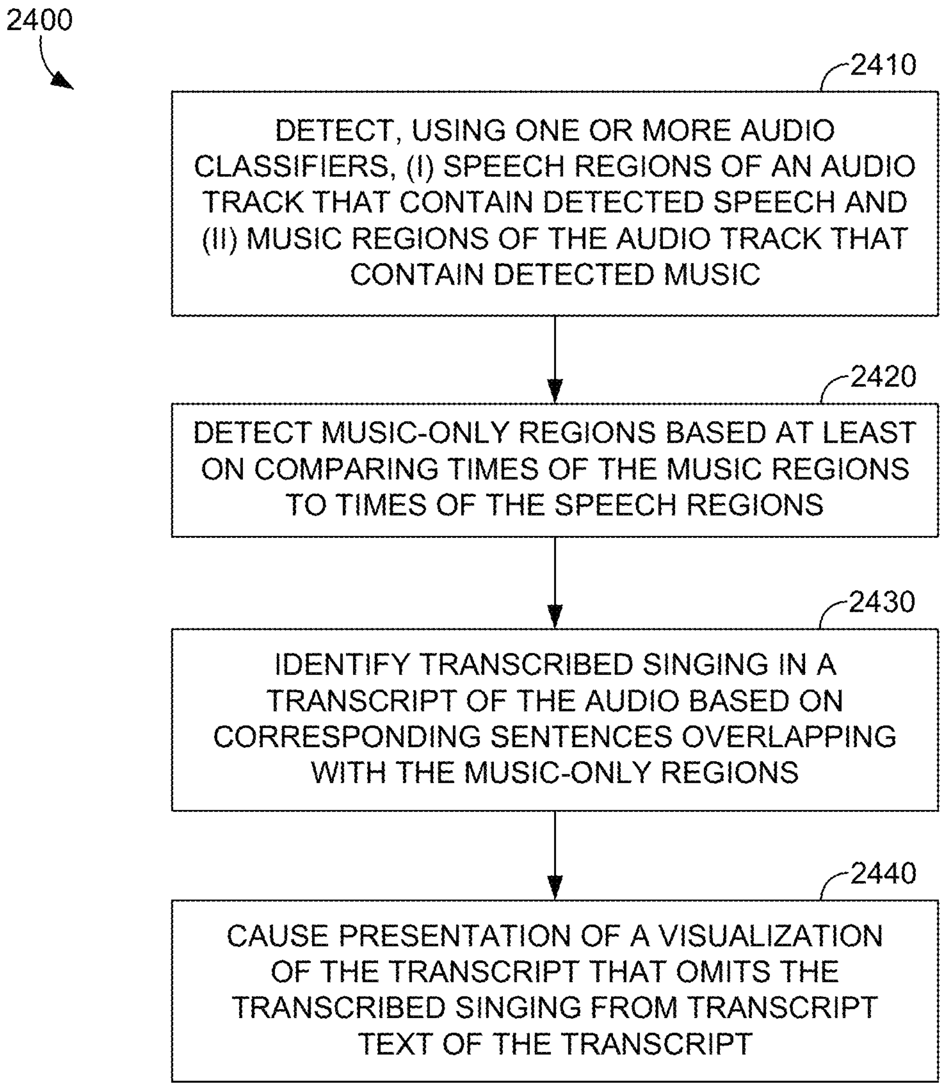
FIG. 24 is a flow diagram showing a method for omitting transcribed singing from transcript text, in accordance with embodiments of the present invention.

FIG. 24 is a flow diagram showing a method 2400 for omitting transcribed singing from transcript text, in accordance with embodiments of the present invention. Method 2400 is an example of a possible way to perform at least a portion of block 1720 of method 1700. At block 2410, using one or more audio classifiers, two things are detected: (i) speech regions of an audio track that contain detected speech and (ii) music regions of the audio track that contain detected music. At block 2420, music-only regions are detected based at least on comparing times of the music regions to times of the speech regions. At block 2430, transcribed singing is identified in a transcript of the audio based on corresponding sentences overlapping with the music-only regions (e.g., more than a threshold percentage such as 50%). At block 2440, presentation is caused of a visualization of the transcript that omits the transcribed singing from transcript text of the transcript.

Figure 25:
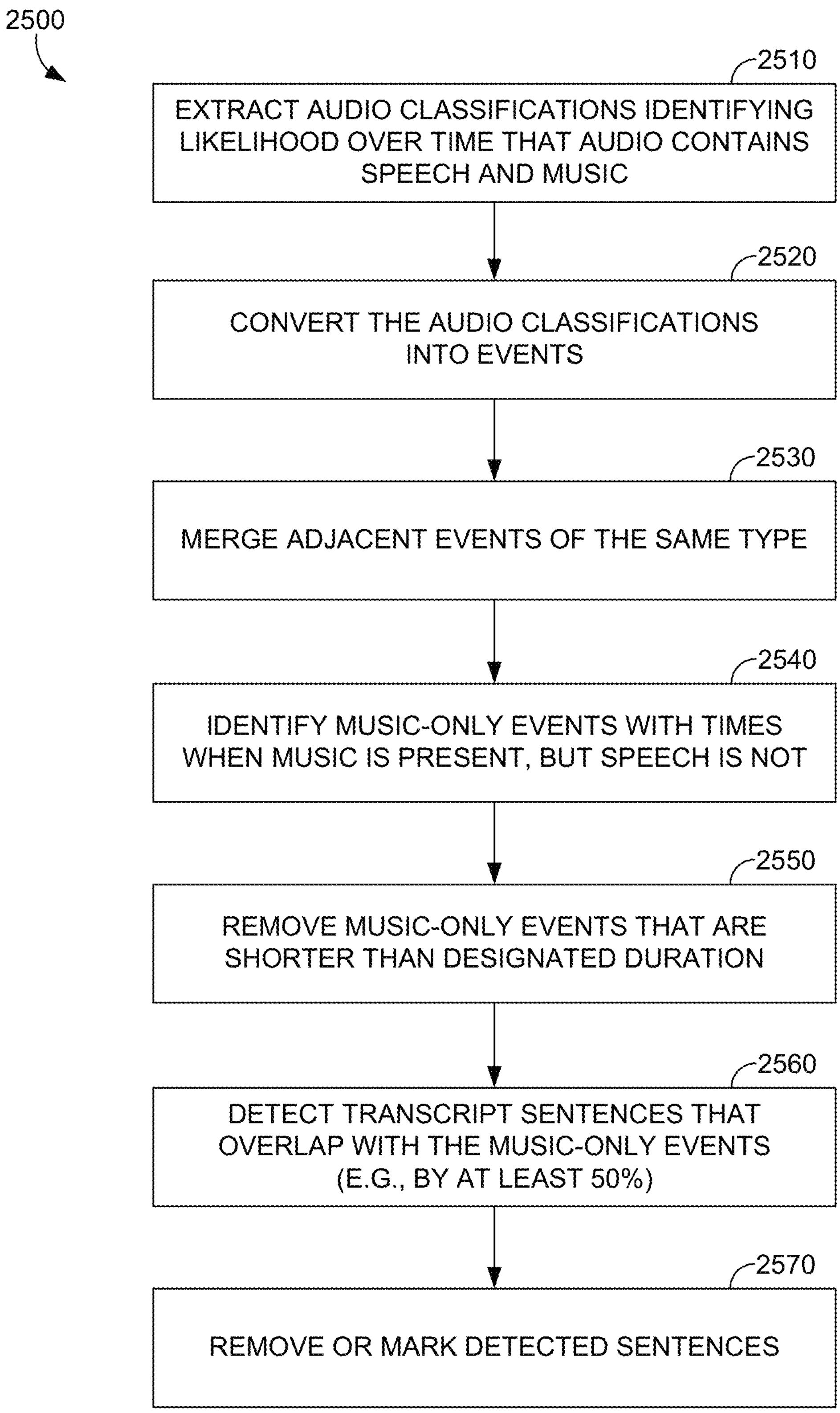
FIG. 25 is a flow diagram showing a method for music-aware speaker diarization, in accordance with embodiments of the present invention.

FIG. 25 is a flow diagram showing a method 2500 for music-aware speaker diarization, in accordance with embodiments of the present invention. Method 2500 is an example of a possible way to perform at least a portion of block 1720 of method 1700. At block 2510, audio classifications identifying a likelihood over time that audio contains speech and a likelihood over time that audio contains music are extracted. At block 2520, the audio classifications are converted into events (e.g. using thresholding and smoothing). At block 2530, adjacent events of the same type are merged. At block 2540, music-only events (continuous ranges when music is present, but speech is not) are identified. At block 2550, music-only events that are shorter than a designated duration are removed. At block 2560, transcript sentences that overlap with the music-only events (e.g., by at least 50%) are detected. At block 2570, detected sentences are removed from transcript text or marked as singing (e.g., to indicate not to present the transcribed singing in transcript text).

Figure 26:
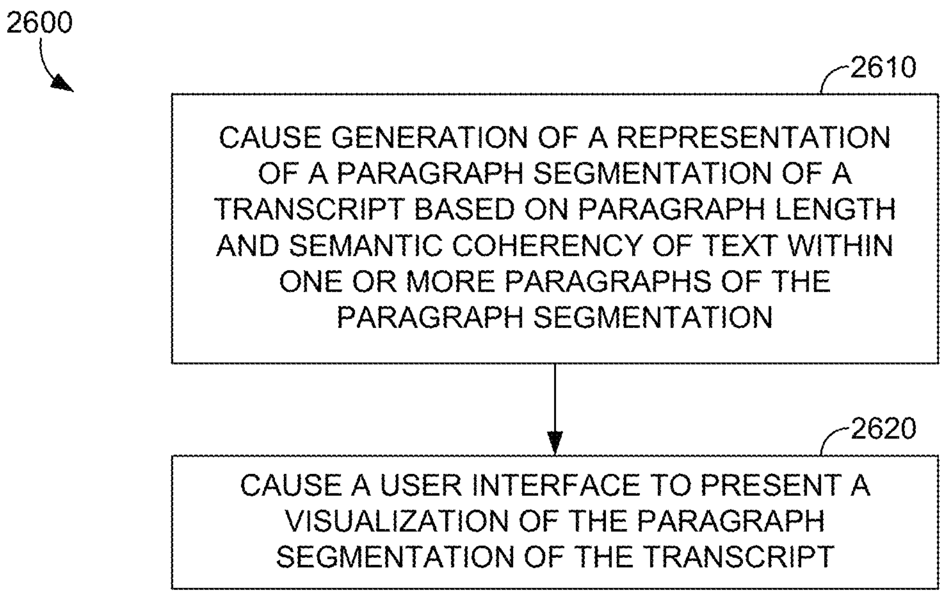
FIG. 26 is a flow diagram showing a method for transcript paragraph segmentation and visualization, in accordance with embodiments of the present invention.

FIG. 26 is a flow diagram showing a method 2600 for transcript paragraph segmentation and visualization, in accordance with embodiments of the present invention. Method 2400 (and transcript segmentation technique 700 of FIG. 7) are examples of possible ways to perform at least a portion of block 1725 of method 1700. At block 2610, generation of a representation of a paragraph segmentation of a transcript is caused. The paragraph segmentation is based on paragraph length and semantic coherency of text within one or more paragraphs of the paragraph segmentation. In an example implementation, different candidate segmentations that break a long paragraph into multiple smaller paragraphs at sentence boundaries are identified and evaluated using a cost function that penalizes candidate segmentations based on divergence from a target paragraph length, rewards candidate segmentations that group semantically similar sentences into a common paragraph, and/or penalizes candidate segmentations that include candidate paragraphs with long pauses (e.g., longer than a normalized length or duration), and dynamic programming is used to choose the candidate segmentation that minimizes the sum of the costs. At block 2620, a user interface is caused to present a visualization of the paragraph segmentation of the transcript (e.g., transcript text segmented at the identified sentence boundaries to form paragraphs).

Figure 27:
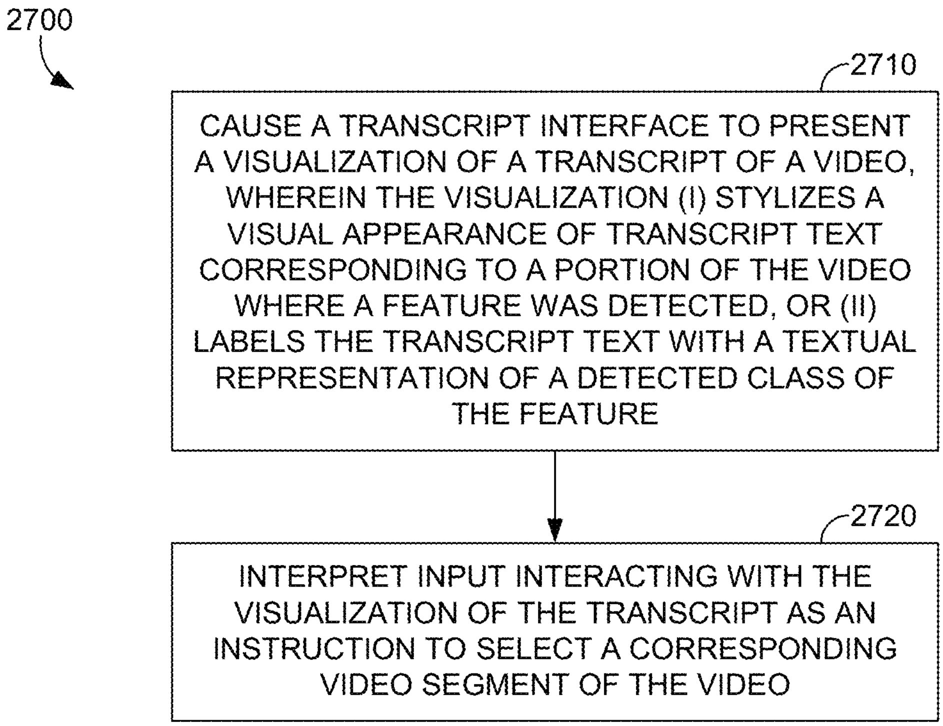
FIG. 27 is a flow diagram showing a method for visualizing a transcript, in accordance with embodiments of the present invention.

FIG. 27 is a flow diagram showing a method 2700 for visualizing a transcript, in accordance with embodiments of the present invention. At block 2710, a transcript interface is caused to present a visualization of a transcript of a video. The visualization (i) stylizes a visual appearance of transcript text corresponding to a portion of the video where a feature was detected, or (ii) labels the transcript text with a textual representation of a detected class of the feature. At block 2720, input interacting with the visualization of the transcript is interpreted as an instruction to select a corresponding video segment of the video.

Figure 28:
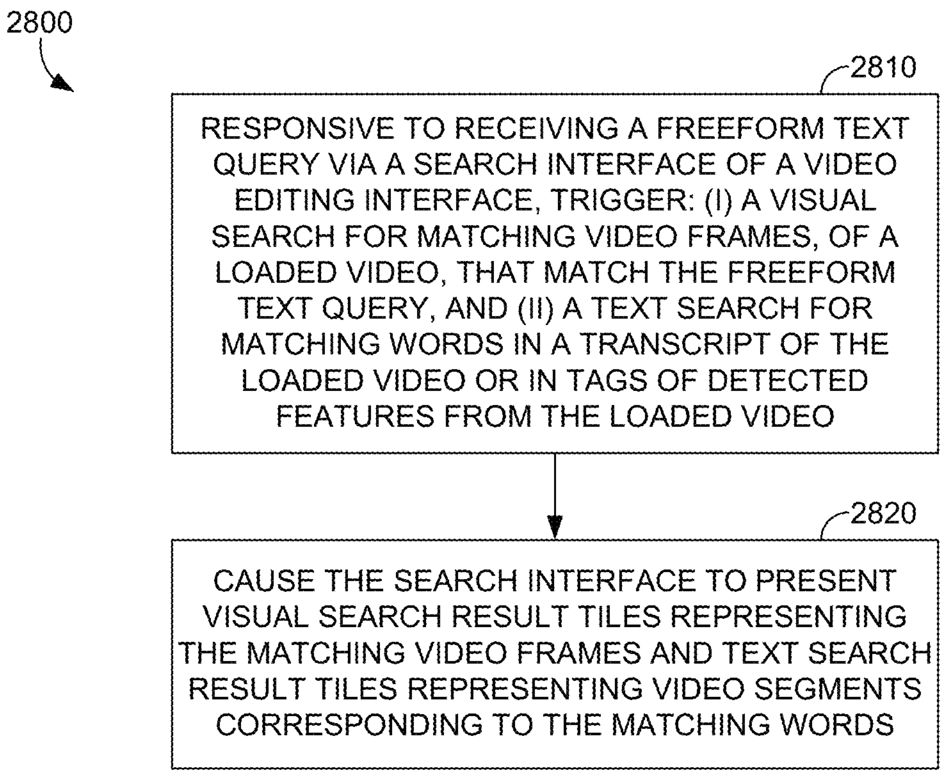
FIG. 28 is a flow diagram showing a method for triggering a visual and text search of a video, in accordance with embodiments of the present invention.

FIG. 28 is a flow diagram showing a method 2800 for triggering a visual and text search of a video, in accordance with embodiments of the present invention. At block 2810, responsive to receiving a freeform text query via a search interface of a video editing interface, two things are triggered: (i) a visual search for matching video frames, of a loaded video, that match the freeform text query, and (ii) a text search for matching words in a transcript of the loaded video or in tags of detected features from the loaded video. At block 2820, the search interface is caused to present visual search result tiles representing the matching video frames and text search result tiles representing video segments corresponding to the matching words.

Figure 29:
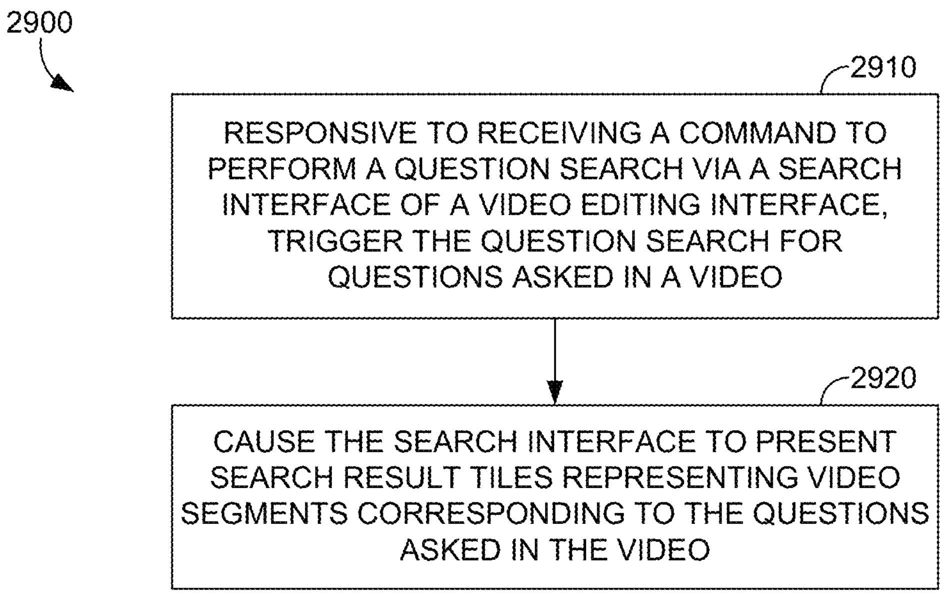
FIG. 29 is a flow diagram showing a method for triggering a search for questions appearing in a video, in accordance with embodiments of the present invention.

FIG. 29 is a flow diagram showing a method 2900 for triggering a search for questions appearing in a video, in accordance with embodiments of the present invention. At block 2910, responsive to receiving a command to perform a question search via a search interface of a video editing interface, the question search is triggered for questions asked in a video. Depending on the embodiment, the questions are identified prior to (e.g., during ingestion) or in response to the command. An example way to identify questions is described in more detail below with respect to FIG. 30. At block 2920, the search interface is caused to present search result tiles representing video segments corresponding to the questions asked in the video.

Figure 30:
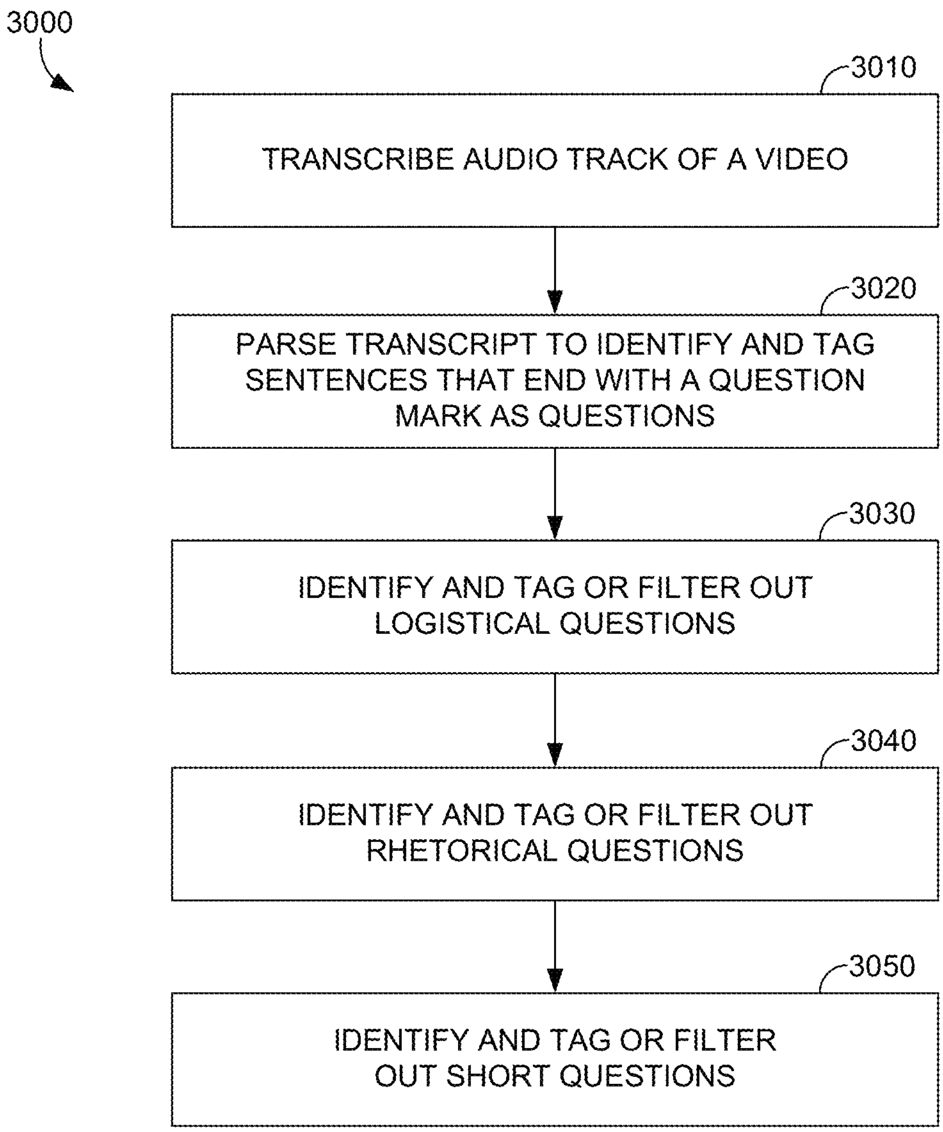
FIG. 30 is a flow diagram showing a method for identifying questions appearing in a video, in accordance with embodiments of the present invention.

FIG. 30 is a flow diagram showing a method 3000 for identifying questions appearing in a video, in accordance with embodiments of the present invention. Method 3000 (or a portion thereof) is an example of a possible way to identify questions prior to (e.g., during ingestion) or in response to the command referenced in block 2910 of method 2900. At block 3010, an audio track of a video is transcribed to generate a transcript. At block 3020, the transcript is parsed to identify and tag sentences that end with a question mark as questions. At block 3030, logistical questions are identified and tagged or filtered out. At block 3040, rhetorical questions are identified and tagged or filtered out. At block 3050, short questions less than a threshold length or duration are identified and tagged or filtered out. As such, depending on the embodiment, the remaining questions (or questions having a designated tag(s)) are presented or visualization (e.g., as search result tiles representing corresponding video segments) in response to a corresponding command.

Figure 31:
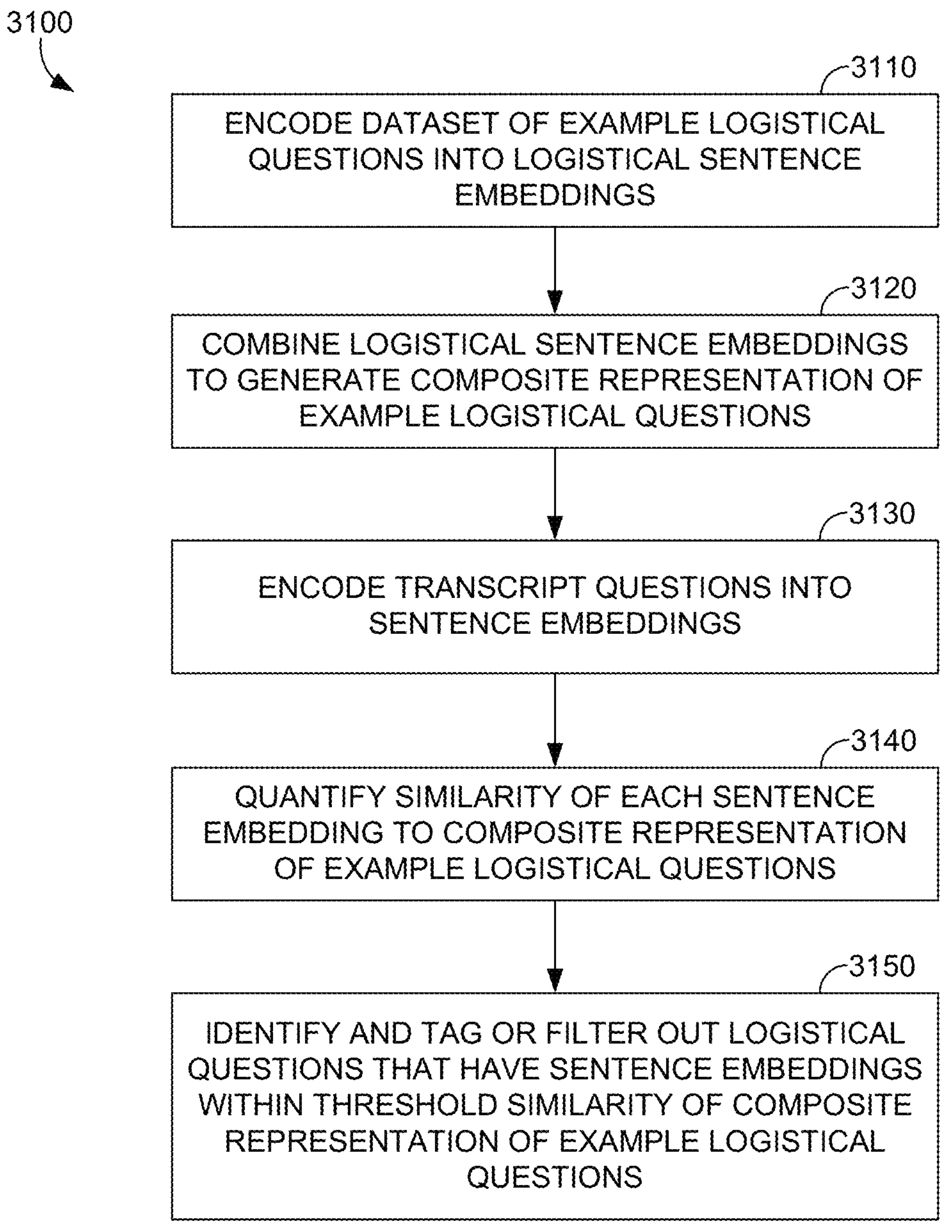
FIG. 31 is a flow diagram showing a method for identifying logical questions, in accordance with embodiments of the present invention.

FIG. 31 is a flow diagram showing a method 3100 for identifying logical questions, in accordance with embodiments of the present invention. Method 3100 is an example of a possible way to perform at least a portion of block 3030 of method 3000. At block 3110, a dataset of example logistical questions are encoded into logistical sentence embeddings. At block 3120, the logistical sentence embeddings are combined (e.g., averaged) to generate a composite representation of the example logistical questions. At block 3130, transcript questions are encoded into sentence embeddings. At block 3140, similarity of each sentence embedding to the composite representation of the example logistical questions is quantified (e.g., using cosine similarity). At block 3150, logistical questions that have sentence embeddings within a threshold similarity of the composite representation of the example logistical questions are identified and tagged or filtered out.

Example Operating Environment

Figure 32:
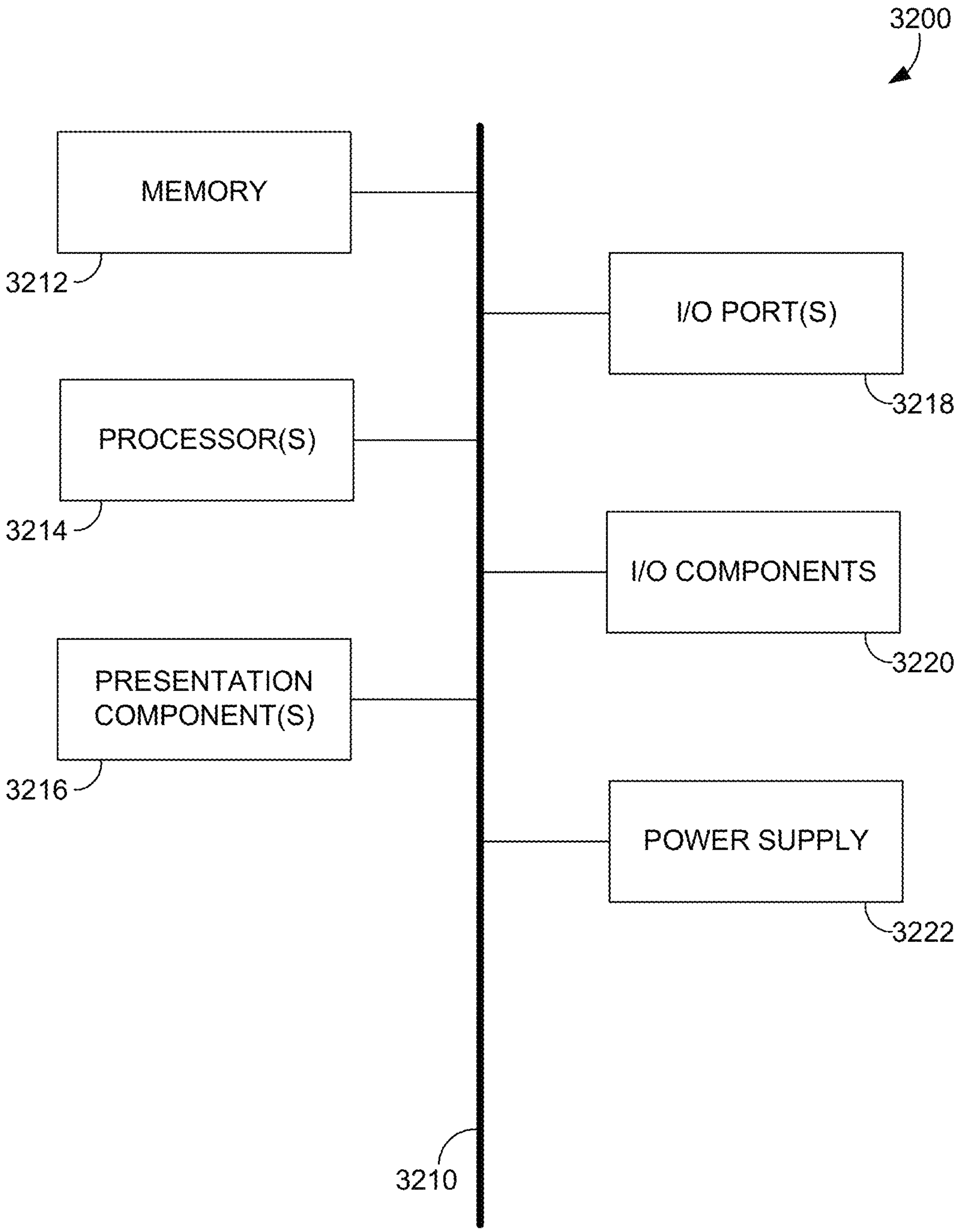
FIG. 32 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 32 in particular, an example operating environment for implementing embodiments of the present invention is shown and designated generally as computing device 3200. Computing device 3200 is but one example of a suitable computing environment and is not intended to suggest any limitation as to the scope of use or functionality of the invention. Neither should computing device 3200 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 32, computing device 3200 includes bus 3210 that directly or indirectly couples the following devices: memory 3212, one or more processors 3214, one or more presentation components 3216, input/output (I/O) ports 3218, input/output components 3220, and illustrative power supply 3222. Bus 3210 represents what may be one or more busses (such as an address bus, data bus, or combination thereof). Although the various blocks of FIG. 32 are shown with lines for the sake of clarity, in some cases, it is not possible to delineate clear boundaries for different components. In this case, metaphorically, the lines would be grey and fuzzy. As such, the diagram of FIG. 32 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 32 and a "computing device."

Computing device 3200 typically includes a variety of computer-readable media. Computer-readable media can be any available media that can be accessed by computing device 3200 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 3200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 3212 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 3200 includes one or more processors that read data from various entities such as memory 3212 or I/O components 3220. Presentation component(s) 3216 present data indications to a user or other device. Example presentation components include a display device, speaker, printing component, vibrating component, etc.

I/O ports 3218 allow computing device 3200 to be logically coupled to other devices including I/O components 3220, some of which may be built in. Illustrative components include a microphone, joystick, game pad, satellite dish, scanner, printer, wireless device, etc. The I/O components 3220 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 3200. In some cases, computing device 3200 is equipped with depth cameras, such as stereoscopic camera systems, infrared camera systems, RGB camera systems, touchscreen technology, and combinations of these, for gesture detection and recognition. Additionally or alternatively, the computing device 3200 is equipped with accelerometers or gyroscopes that enable detection of motion, and in some cases, an output of the accelerometers or gyroscopes is provided to the display of computing device 3200 to render immersive augmented reality or virtual reality.

Embodiments described herein support video segmentation, speaker diarization, transcript paragraph segmentation, video navigation, video or transcript editing, and/or video playback. In various embodiments, the components described herein refer to integrated components of a system. The integrated components refer to the hardware architecture and software framework that support functionality using the system. The hardware architecture refers to physical components and interrelationships thereof and the software framework refers to software providing functionality that can be implemented with hardware embodied on a device.

In some embodiments, the end-to-end software-based system operates within the components of the system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzinann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, cause the one or more computing devices to perform operations comprising:

responsive to receiving a command to navigate a video by searchable questions through a video editing interface, identifying the searchable questions asked in the video based on triggering:

identifying questions asked in the video by parsing a diarized transcript of the video;

identifying a subset of the questions asked and answered by a common diarized speaker from the diarized transcript;

encoding each question of the questions asked in the video into a corresponding vector representation of each question;

filtering out the subset from the questions and logistical questions from the questions to output the searchable questions, wherein filtering out the logistical questions is based on comparing the corresponding vector representation of each question to a sentence embedding generated by combining an encoded representation of example logistical questions into a composite representation of the example logistical questions; and combining, based on determining a group of consecutive questions of the searchable questions to be within a threshold cosine similarity, the group of consecutive questions into a single question of the searchable questions; and causing the video editing interface to present a plurality of tiles representing and configured to navigate the video to corresponding video segments during which each of the searchable questions was asked in the video in a search interface of the video editing interface.

2. The one or more computer storage media of claim 1, the parsing of the diarized transcript of the video comprising identifying the questions based on the sentences ending with a question mark.

3. The one or more computer storage media of claim 1, the searchable questions asked in the video further identified based on triggering:

further identifying the subset based on the questions asked by a particular diarized speaker and not answered by a different diarized speaker in the diarized transcript within a designated amount of time.

4. The one or more computer storage media of claim 1, the searchable questions asked in the video further identified based on filtering out short questions that are shorter than a designated duration of time.

5. The one or more computer storage media of claim 1, the operations further comprising causing the search interface to present within each of the plurality of tiles: a corresponding video thumbnail comprising a visual representation of a video frame of one of the corresponding video segments during which one of the searchable questions was asked in the video, a corresponding speaker thumbnail representing a diarized speaker detected from the one of the corresponding video segments, and corresponding transcript text of the one of the searchable questions asked in the one of the corresponding video segments from the diarized transcript of the video.

6. The one or more computer storage media of claim 1, wherein the search interface of the video editing interface is configured to navigate, responsive to selection of one of the plurality of tiles, to a corresponding portion of the diarized transcript of the video.

7. A method comprising:

receiving, via a video editing interface, a command to navigate a loaded video by searchable questions;

responsive to receiving the command to navigate the loaded video by the searchable questions, identifying the searchable questions asked in the loaded video based on triggering:

identifying questions asked in the loaded video by parsing a diarized transcript of the loaded video;

identifying a subset of the questions asked by a particular diarized speaker and not answered by a different diarized speaker in the diarized transcript within a designated amount of time;

encoding each question of the questions asked in the loaded video into a corresponding vector representation of each question; and filtering out the subset from the questions and logistical questions from the questions to output the searchable questions, wherein filtering out the logistical questions is based on comparing the corresponding vector representation of each question to a sentence embedding generated by combining an encoded representation of example logistical questions into a composite representation of the example logistical questions; and causing the video editing interface to present a plurality of tiles representing and configured to navigate the loaded video to corresponding video segments during which each of the searchable questions was asked in the loaded video in a search interface of the video editing interface.

8. The method of claim 7, the parsing the diarized transcript of the loaded video comprising identifying the questions based on the sentences ending with a question mark.

9. The method of claim 7, the searchable questions asked in the loaded video further identified based on triggering combining a group of consecutive questions of the searchable questions into a single question of the searchable questions based on a determination that the group of consecutive questions are within a threshold cosine similarity.

10. The method of claim 7, the searchable questions asked in the loaded video further identified based on triggering:

further identifying the subset based on the questions asked and answered by a common diarized speaker from the diarized transcript.

11. The method of claim 7, the searchable questions asked in the loaded video further identified based on filtering out short questions that are shorter than a designated duration of time.

12. The method of claim 7, further comprising causing the search interface to present within each of the plurality of tiles: a corresponding video thumbnail comprising a visual representation of a video frame of one of the corresponding video segments during which one of the searchable questions was asked in the loaded video, a corresponding speaker thumbnail representing a diarized speaker detected from the one of the corresponding video segments, and corresponding transcript text of the one of the searchable questions asked in the one of the corresponding video segments from the diarized transcript of the loaded video.

13. The method of claim 7, wherein the search interface of the video editing interface is configured to navigate, responsive to selection of one of the plurality of tiles, to a corresponding portion of the diarized transcript of the loaded video.

14. A computer system comprising one or more processors and memory configured to provide computer program instructions to the one or more processors, the computer program instructions comprising:

question identifier component configured to receive a command to navigate a loaded video by questions by identifying a plurality of questions asked in the loaded video based on triggering:

identifying an initial set of questions asked in the loaded video by parsing a transcript of the loaded video;

encoding each question of the initial set of questions asked in the loaded video into a corresponding vector representation of each question;

filtering out logistical questions from the initial set of questions asked in the loaded video based on comparing the corresponding vector representation of each question to a sentence embedding generated by combining an encoded representation of example logistical questions into a composite representation of the example logistical questions; and combining a group of consecutive questions of the filtered initial set of questions into a single question of the plurality of questions based on a determination that the group of consecutive questions are within a threshold cosine similarity; and a question navigator component configured to present a plurality of tiles representing and configured to navigate the loaded video to corresponding video segments during which each of the identified plurality of questions was asked in the loaded video.

15. The computer system of claim 14, the plurality of questions asked in the loaded video further identified based on triggering:

identifying a subset of questions of the initial set of questions asked and answered by a common diarized speaker from a diarized transcript; and filtering out the subset of questions from the initial set of questions.

16. The computer system of claim 14, the plurality of questions asked in the loaded video further identified based on triggering:

identifying a subset of questions of the initial set of questions asked by a particular diarized speaker and not answered by a different diarized speaker in a diarized transcript within a designated amount of time; and filtering out the subset of questions from the initial set of questions.

17. The computer system of claim 14, wherein the question navigator component is configured to navigate, responsive to selection of one of the plurality of tiles, to a corresponding portion of a diarized transcript of the loaded video.

* * * * *